(12) United States Patent
    Oh

(10) Patent No.: US 11,606,547 B2
(45) Date of Patent: Mar. 14, 2023

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/144,860

(22) Filed: Jan. 8, 2021

(65) Prior Publication Data

US 2021/0218947 A1    Jul. 15, 2021

Related U.S. Application Data

(60) Provisional application No. 62/959,130, filed on Jan. 9, 2020.

(51) Int. Cl.
   *H04N 13/161*    (2018.01)
   *H04N 13/178*    (2018.01)

(52) U.S. Cl.
   CPC ......... *H04N 13/178* (2018.05); *H04N 13/161* (2018.05)

(58) Field of Classification Search
   CPC ... G06T 9/00; H04L 65/1006; H04L 65/1069; H04L 65/607; H04L 65/608; H04L 65/80; H04L 67/38; H04N 19/597; H04N 19/70; H04N 13/178; H04N 13/161; H04N 21/6437
   See application file for complete search history.

(56) References Cited

U.S. PATENT DOCUMENTS

| | | | | |
|---|---|---|---|---|
| 8,731,313 | B2 * | 5/2014 | Thiyanaratnam | G06T 9/00 382/240 |
| 10,535,161 | B2 * | 1/2020 | Budagavi | G06T 17/00 |
| 10,853,974 | B2 * | 12/2020 | Budagavi | G06T 9/001 |
| 2015/0003749 | A1 * | 1/2015 | Kim | H04N 19/463 382/232 |
| 2018/0063505 | A1 * | 3/2018 | Lee | H04N 19/597 |
| 2018/0152721 | A1 * | 5/2018 | Rusanovskyy | H04N 19/18 |
| 2019/0087979 | A1 | 3/2019 | Mammou et al. | |

(Continued)

FOREIGN PATENT DOCUMENTS

| KR | 1020190139795 | 12/2019 |
|---|---|---|
| WO | WO2019078000 | 4/2019 |

(Continued)

OTHER PUBLICATIONS

Kim et al., U.S. Appl. No. 62/958,659—"Video-Based Point Cloud Compression With Variable Patch Scaling", published Jan. 8, 2020 (Year: 2020).*

(Continued)

*Primary Examiner* — Mekonen T Bekele
(74) *Attorney, Agent, or Firm* — Fish & Richardson P.C.

(57) ABSTRACT

Disclosed herein is a method for transmitting point cloud data. The transmission method may include encoding point cloud data, and transmitting the point cloud data. Disclosed herein is a method for receiving point cloud data. The reception method may include receiving point cloud data, decoding the point cloud data, and rendering the point cloud data.

9 Claims, 37 Drawing Sheets

(56) References Cited

U.S. PATENT DOCUMENTS

| | | | |
|---|---|---|---|
| 2019/0139266 A1* | 5/2019 | Budagavi | G06T 17/00 |
| 2019/0156518 A1* | 5/2019 | Mammou | G06T 7/0002 |
| 2019/0294177 A1* | 9/2019 | Kwon | G06N 20/00 |
| 2020/0202608 A1* | 6/2020 | Mekuria | H04L 65/80 |
| 2020/0302650 A1* | 9/2020 | Aksu | G06T 9/00 |
| 2021/0119701 A1* | 4/2021 | Tsukagoshi | G02B 6/4292 |
| 2021/0190936 A1* | 6/2021 | Sabripour | G01S 13/70 |
| 2021/0211724 A1* | 7/2021 | Kim | H04N 19/30 |

FOREIGN PATENT DOCUMENTS

| | | |
|---|---|---|
| WO | WO2019079032 | 4/2019 |
| WO | WO2020005365 | 1/2020 |
| WO | WO 2021/210513 | 10/2021 |

OTHER PUBLICATIONS

W18832, Revised Text of ISOIEC CD 23090-10 Carriage of Videobased Point Cloud Coding Data, Geneva, Switzerland, Oct. 2019, See p. 16.*

PCT International Search Report and Written Opinion in International Appln. No. PCT/KR2020/018156, dated Mar. 29, 2021, 20 pages (with English translation).

Aksu, "Technologies Under Consideration for Carriage of V-PCC Data," XP030225546, ISO/TEC JTC1/SC29/WG11 N18833, Geneva, CH, Oct. 7-11, 2019, available Nov. 9, 2019, 72 pages.

Chiariglione, "Report of the 127th Meeting," XP03 0206763, ISO/TEC JTC1/SC29/WG11 N18542, Gothenburg, SE, Jul. 8-12, 2019, available Sep. 23, 2019, 213 pages.

Extended Search Report in European Appln. No. 20911869.4, dated Dec. 20, 2022, 12 pages.

* cited by examiner

FIG. 2
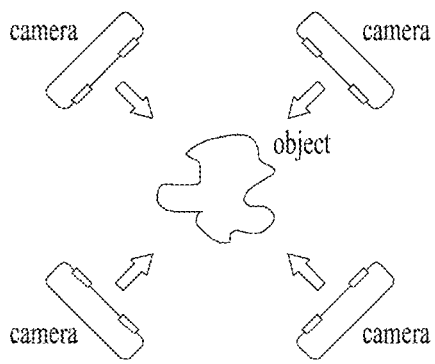
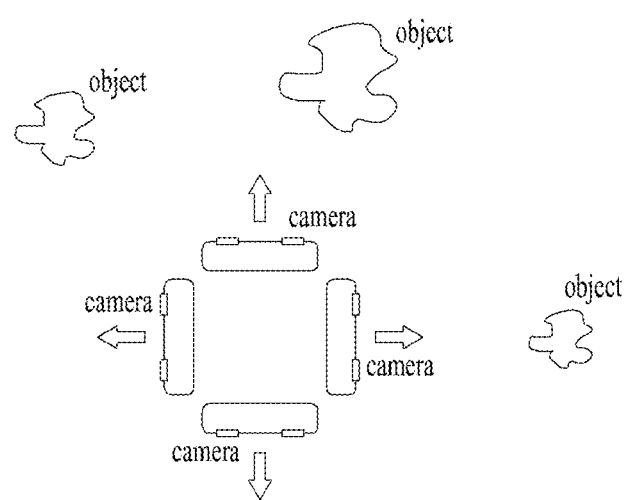

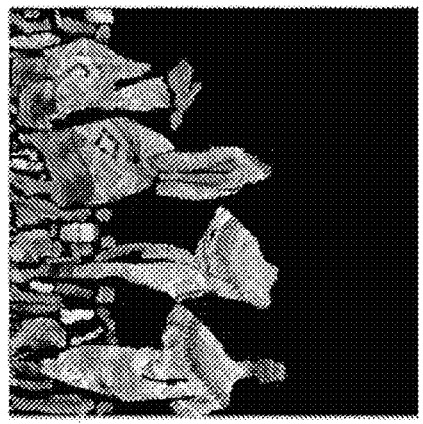
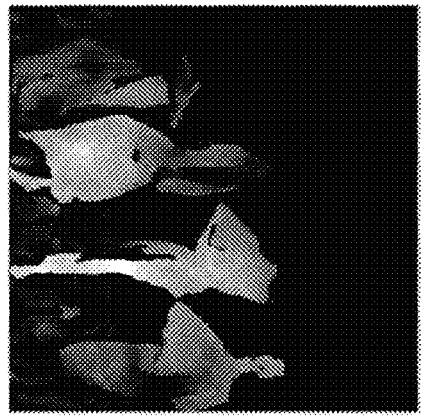
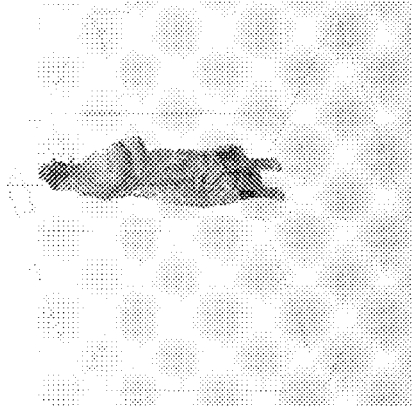
FIG. 3

FIG. 26

| vpcc_unit_header( ) { | Descriptor | |
|---|---|---|
|   vuh_unit_type | u(5) | |
|   if( vuh_unit_type == VPCC_AVD \|\| vuh_unit_type == VPCC_GVD \|\| | | |
|     vuh_unit_type == VPCC_OVD \|\| vuh_unit_type == VPCC_AD ) { | u(4) | |
|     vuh_vpcc_parameter_set_id | u(6) | |
|     vuh_atlas_id | | |
|   } | | |
|   if( vuh_unit_type == VPCC_AVD _ { | u(7) | |
|     vuh_attribute_index | u(5) | |
|     vuh_attribute_dimension_index | u(4) | ~ 26000 |
|     vuh_map_index | u(1) | |
|     vuh_raw_video_flag | | |
|   } else if( vuh_unit_type == VPCC_GVD) { | u(4) | |
|     vuh_map_index | u(1) | |
|     vuh_raw_video_flag | u(12) | |
|     ruh_reserved_zero_12bits | | |
|   } else if( vuh_unit_type == VPCC_GVD \|\| vuh_unit_type == VPCC_AD ) | u(17) | |
|     vuh_reserved_zero_17bits | | |
|   else | u(27) | |
|     vuh_reserved_zero_27bits | | |
| } | | |

| vpcc_unit_payload ( ) { | Descriptor | |
|---|---|---|
|   if( vuh_unit_type == VPCC_VPS ) | | |
|     vpcc_parameter_set( ) | | |
|   else if( vuh_unit_type == VPCC_AD) | | |
|     atlas_sub_bitstream( ) | | ~ 26001 |
|   else if( vuh_unit_type == VPCC_OVD \|\| | | |
|     vuh_unit_type == VPCC_GVD \|\| | | |
|     vuh_unit_type == VPCC_AVD) | | |
|     video_sub_bitstream( ) | | |
| } | | |

FIG. 31

```
aligned(8) class ViewInfoStruct(){
    unsigned int(16) view_pos_x;
    unsigned int(16) view_pos_y;
    unsigned int(16) view_pos_z;
    unsigned int(8) view_vfov;
    unsigned int(8) view_hfov;
    unsigned int(16) view_dir_x;
    unsigned int(16) view_dir_y;
    unsigned int(16) view_dir_z;
    unsigned int(16) view_up_x;
    unsigned int(16) view_up_y;
    unsigned int(16) view_up_z;
}
```

FIG. 32

| |
|---|
| aligned(8) class RenderingParamStruct(){ |
| unsigned int(16) point_size; |
| unsigned int(7) point_type; |
| unsigned int(2) duplicated_point; |
| } |

FIG. 34

```
aligned(8) class ObjectRenderingInfoStruct(){
    unsigned int(8) obj_id;
    unsigned int(4) obj_coord_type;
    bit(4) reserved = 1;
    unsigned int(16) obj_pos_x;
    unsigned int(16) obj_pos_y;
    unsigned int(16) obj_pos_z;
    unsigned int(16) obj_dir_x;
    unsigned int(16) obj_dir_y;
    unsigned int(16) obj_dir_z;
    unsigned int(16) obj_up_x;
    unsigned int(16) obj_up_y;
    unsigned int(16) obj_up_z;
    unsigned int(16) obj_scale_x;
    unsigned int(16) obj_scale_y;
    unsigned int(16) obj_scale_z;
}
```

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATION

This application claims the benefit of U.S. Provisional Application No. 62/959,130, filed on Jan. 9, 2020, which is hereby incorporated by reference as if fully set forth herein.

TECHNICAL FIELD

Embodiments provide a method for providing point cloud content to provide a user with various services such as virtual reality (VR), augmented reality (AR), mixed reality (MR), and self-driving services.

BACKGROUND

A point cloud is a set of points in a three-dimensional (3D) space. It is difficult to generate point cloud data because the number of points in the 3D space is large.

A large throughput is required to transmit and receive data of a point cloud.

SUMMARY

An object of the present disclosure is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Embodiments are not limited to the above-described objects, and the scope of the embodiments may be extended to other objects that can be inferred by those skilled in the art based on the entire contents of the present disclosure.

To achieve these objects and other advantages and in accordance with the purpose of the disclosure, as embodied and broadly described herein, a method for transmitting point cloud data may include encoding point cloud data, encapsulating the point cloud data, and/or transmitting the point cloud data.

Further, according to embodiments, the transmitting may include transmitting metadata about the point cloud data.

The metadata may contain information for volumetric data for the point cloud data. Further, the information for rendering the volumetric data may include position-related information used to render the volumetric data and/or direction-related information applied to the volumetric data.

Further, according to embodiments, the metadata may contain information on a style of a point of the point cloud data, wherein the information on the style of the point may include information indicating a shape of the point and/or information indicating a size of the point.

Further, according to embodiments, the metadata may contain camera information. The camera information may include information indicating a position of the camera, information indicating an orientation of the camera, information indicating a horizontal field of view (FOV) of a view-frustum, and/or information indicating a vertical FOV of the view-frustum.

In another aspect of the present disclosure, an apparatus for transmitting point cloud data may include one or more components configured to perform the method for transmitting point cloud data according to the embodiments.

In another aspect of the present disclosure, a method for receiving point cloud data may include receiving point cloud data, decapsulating the point cloud data, and/or decoding the point cloud data. According to embodiments, the receiving may include receiving metadata about the point cloud data, and the decoding may include reconstructing the point cloud data.

Further, the metadata may contain information for volumetric data in the point cloud data, wherein the reconstructing may include reconstructing the volumetric data based on the information for the volumetric data.

In addition, the information for the volumetric data may include position-related information used to reconstruct the volumetric data and/or direction-related information applied to the volumetric data.

Further, according to embodiments, the metadata may include information on a style of a point of the point cloud data, wherein the information on the style of the point may include information indicating a shape of the point and/or information indicating a size of the point.

Further, according to embodiments, the metadata may contain camera information. The camera information may include information indicating a position of the camera, information indicating an orientation of the camera, information indicating a horizontal field of view (FOV) of a view-frustum, and/or information indicating a vertical FOV of the view-frustum.

In another aspect of the present disclosure, an apparatus for receiving point cloud data may include one or more components configured to perform the method for receiving point cloud data according to the embodiments.

The point cloud data transmission method, the point cloud data transmission apparatus, the point cloud data reception method, and the point cloud data reception apparatus according to the embodiments may provide a good-quality point cloud service.

The point cloud data transmission method, the point cloud data transmission apparatus, the point cloud data reception method, and the point cloud data reception apparatus according to the embodiments may achieve various video codec methods.

The point cloud data transmission method, the point cloud data transmission apparatus, the point cloud data reception method, and the point cloud data reception apparatus according to the embodiments may provide universal point cloud content such as a self-driving service.

The reception apparatus may efficiently access and process a point cloud bitstream according to a user viewport.

The transmission apparatus according to the embodiments may allow a player or the like to perform spatial or partial access to a point cloud object and/or point cloud content according to a user viewport. According to embodiments, the transmission apparatus may provide the above-described view information, and the reception apparatus may perform rendering based on the view information. Accordingly, the reception apparatus may adaptively and efficiently access and process the point cloud bitstream according to a user viewport.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 illustrates capture of point cloud data according to embodiments;

FIG. 3 illustrates an exemplary point cloud, geometry, and texture image according to embodiments;

FIG. 26 shows an example of syntax of a V-PCC unit header and/or a V-PCC unit payload according to embodiments;

FIG. 31 shows an example of syntax of parameters for reconstructing or rendering point cloud data according to embodiments;

FIG. 32 shows an example of syntax of parameters for reconstructing or rendering point cloud data according to embodiments;

FIG. 34 shows an example of syntax of parameters for reconstructing or rendering an object of point cloud data according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
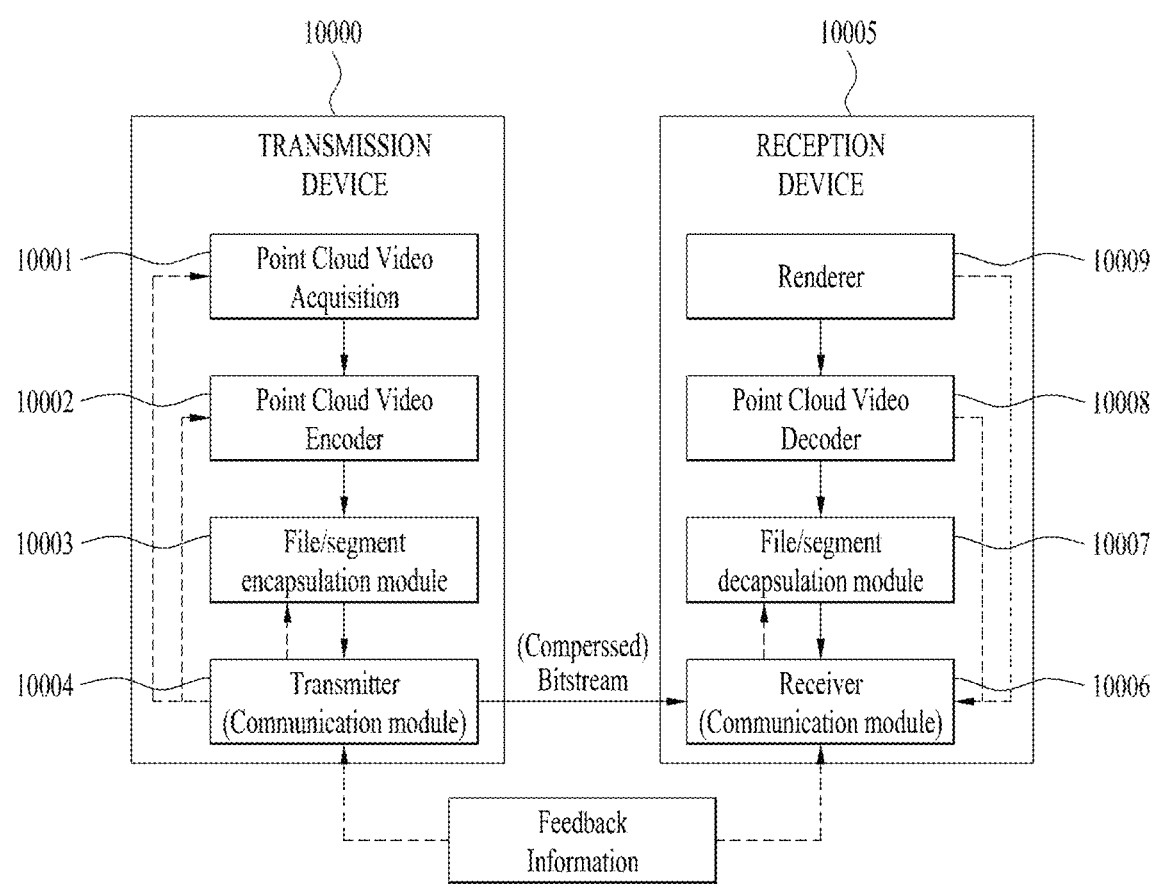
FIG. 1 illustrates an exemplary structure of a transmission/reception system for providing point cloud content according to embodiments.

FIG. 1 illustrates an exemplary structure of a transmission/reception system for providing point cloud content according to embodiments.

The present disclosure provides a method of providing point cloud content to provide a user with various services such as virtual reality (VR), augmented reality (AR), mixed reality (MR), and self-driving. The point cloud content according to the embodiments represent data representing objects as points, and may be referred to as a point cloud, point cloud data, point cloud video data, point cloud image data, or the like.

A point cloud data transmission device 10000 according to embodiment may include a point cloud video acquirer 10001, a point cloud video encoder 10002, a file/segment encapsulation module 10003, and/or a transmitter (or communication module) 10004. The transmission device according to the embodiments may secure and process point cloud video (or point cloud content) and transmit the same. According to embodiments, the transmission device may include a fixed station, a base transceiver system (BTS), a network, an artificial intelligence (AI) device and/or system, a robot, and an AR/VR/XR device and/or a server. According to embodiments, the transmission device 10000 may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquirer 10001 according to the embodiments acquires a point cloud video through a process of capturing, synthesizing, or generating a point cloud video.

The point cloud video encoder 10002 according to the embodiments encodes the point cloud video data. According to embodiments, the point cloud video encoder 10002 may be referred to as a point cloud encoder, a point cloud data encoder, an encoder, or the like. The point cloud compression coding (encoding) according to the embodiments is not limited to the above-described embodiment. The point cloud video encoder may output a bitstream containing the encoded point cloud video data. The bitstream may not only include encoded point cloud video data, but also include signaling information related to encoding of the point cloud video data.

The encoder according to the embodiments may support both the geometry-based point cloud compression (G-PCC) encoding scheme and/or the video-based point cloud compression (V-PCC) encoding scheme. In addition, the encoder may encode a point cloud (referring to either point cloud data or points) and/or signaling data related to the point cloud. The specific operation of encoding according to embodiments will be described below.

As used herein, the term V-PCC may stand for Video-based Point Cloud Compression (V-PCC). The term V-PCC may be the same as Visual Volumetric Video-based Coding (V3C). These terms may be complementarily used.

The file/segment encapsulation module 10003 according to the embodiments encapsulates the point cloud data in the form of a file and/or segment form. The point cloud data transmission method/device according to the embodiments may transmit the point cloud data in a file and/or segment form.

The transmitter (or communication module) 10004 according to the embodiments transmits the encoded point cloud video data in the form of a bitstream. According to embodiments, the file or segment may be transmitted to a reception device over a network, or stored in a digital storage medium (e.g., USB, SD, CD, DVD, Blu-ray, HDD, SSD, etc.). The transmitter according to the embodiments is capable of wired/wireless communication with the reception device (or the receiver) over a network of 4G, 5G, 6G, etc. In addition, the transmitter may perform necessary data processing operation according to the network system (e.g., a 4G, 5G or 6G communication network system). The transmission device may transmit the encapsulated data in an on-demand manner.

A point cloud data reception device 10005 according to the embodiments may include a receiver 10006, a file/segment decapsulation module 10007, a point cloud video decoder 10008, and/or a renderer 10009. According to embodiments, the reception device may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The receiver 10006 according to the embodiments receives a bitstream containing point cloud video data. According to embodiments, the receiver 10006 may transmit feedback information to the point cloud data transmission device 10000.

The file/segment decapsulation module 10007 decapsulates a file and/or a segment containing point cloud data. The decapsulation module according to the embodiments may perform a reverse process of the encapsulation process according to the embodiments.

The point cloud video decoder 10007 decodes the received point cloud video data. The decoder according to the embodiments may perform a reverse process of encoding according to the embodiments.

The renderer 10009 renders the decoded point cloud video data. According to embodiments, the renderer 10009 may transmit the feedback information obtained at the reception side to the point cloud video decoder 10008. The point cloud video data according to the embodiments may carry feedback information to the receiver. According to embodiments, the feedback information received by the point cloud transmission device may be provided to the point cloud video encoder.

The arrows indicated by dotted lines in the drawing represent a transmission path of feedback information acquired by the reception device 10005. The feedback information is information for reflecting interactivity with a user who consumes point cloud content, and includes user information (e.g., head orientation information), viewport information, and the like). In particular, when the point cloud content is content for a service (e.g., self-driving service, etc.) that requires interaction with a user, the feedback information may be provided to the content transmitting side (e.g., the transmission device 10000) and/or the service provider. According to embodiments, the feedback information may be used in the reception device 10005 as well as the transmission device 10000, and may not be provided.

The head orientation information according to embodiments is information about a user's head position, orientation, angle, motion, and the like. The reception device 10005 according to the embodiments may calculate viewport information based on the head orientation information. The viewport information may be information about a region of the point cloud video that the user is viewing. A viewpoint is a point where a user is viewing a point cloud video, and may refer to a center point of the viewport region. That is, the viewport is a region centered on the viewpoint, and the size and shape of the region may be determined by a field of view (FOV). Accordingly, the reception device 10005 may extract the viewport information based on a vertical or horizontal FOV supported by the device in addition to the head orientation information. In addition, the reception device 10005 performs gaze analysis to check how the user consumes a point cloud, a region that the user gazes at in the point cloud video, a gaze time, and the like. According to embodiments, the reception device 10005 may transmit feedback information including the result of the gaze analysis to the transmission device 10000. The feedback information according to the embodiments may be acquired in the rendering and/or display process. The feedback information according to the embodiments may be secured by one or more sensors included in the reception device 10005. In addition, according to embodiments, the feedback information may be secured by the renderer 10009 or a separate external element (or device, component, etc.). The dotted lines in FIG. 1 represent a process of transmitting the feedback information secured by the renderer 10009. The point cloud content providing system may process (encode/decode) point cloud data based on the feedback information. Accordingly, the point cloud video data decoder 10008 may perform a decoding operation based on the feedback information. The reception device 10005 may transmit the feedback information to the transmission device. The transmission device (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) all point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to point cloud data.

The elements of the point cloud content providing system illustrated in FIG. 1 may be implemented by hardware, software, a processor, and/or combinations thereof.

Embodiments may provide a method of providing point cloud content to provide a user with various services such as virtual reality (VR), augmented reality (AR), mixed reality (MR), and self-driving.

In order to provide a point cloud content service, a point cloud video may be acquired first. The acquired point cloud video may be transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a geometry-based point cloud compression process.

Each element of the point cloud data transmission device and the point cloud data reception device according to the embodiments may be hardware, software, a processor, and/or a combination thereof.

In order to provide a point cloud content service, a point cloud video may be acquired. The acquired point cloud video is transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service may include an acquisition process, an encoding process, a transmission process, a decoding process, a rendering process, and/or a feedback process.

The point cloud compression system may include a transmission device and a reception device. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquirer, a point cloud video encoder, a file/segment encapsulator, and a transmitter. The reception device may include a receiver, a file/segment decapsulator, a point cloud video decoder, and a renderer. The encoder may be referred to as a point cloud video/picture/picture/frame encoder, and the decoder may be referred to as a point cloud video/picture/picture/frame decoding device. The transmitter may be included in the point cloud video encoder. The receiver may be included in the point cloud video decoder. The renderer may include a display. The renderer and/or the display may be configured as separate devices or external components. The transmission device and the reception device may further include a separate internal or external module/unit/component for the feedback process.

According to embodiments, the operation of the reception device may be the reverse process of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the Stanford Triangle format) file may be generated. For a video having multiple frames, one or more files may be acquired. During the capture process, point cloud related metadata (e.g., capture related metadata) may be generated.

A point cloud data transmission device according to embodiments may include an encoder configured to encode point cloud data, and a transmitter configured to transmit the point cloud data. The data may be transmitted in the form of a bitstream containing a point cloud.

A point cloud data reception device according to embodiments may include a receiver configured to receive point cloud data, a decoder configured to decode the point cloud data, and a renderer configured to render the point cloud data.

The method/device according to the embodiments represents the point cloud data transmission device and/or the point cloud data reception device.

FIG. 2 illustrates capture of point cloud data according to embodiments.

Point cloud data according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces. According to embodiments, the point cloud content may include video/audio/an image of an object.

For capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as self-driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In this case, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder may encode the input point cloud video into one or more video streams. One video may include a plurality of frames, each of which may correspond to a still image/picture. In this specification, a point cloud video may include a point cloud image/frame/picture/video/audio. In addition, the term "point cloud video" may be used interchangeably with a point cloud image/frame/picture. The point cloud video encoder may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information, which will be described later. The geometry video may include a geometry image, the attribute video may include an attribute image, and the occupancy map video may include an occupancy map image. The auxiliary information may include auxiliary patch information. The attribute video/image may include a texture video/image.

The encapsulation processor (file/segment encapsulation module) 1003 may encapsulate the encoded point cloud video data and/or metadata related to the point cloud video in the form of, for example, a file. Here, the metadata related to the point cloud video may be received from the metadata processor. The metadata processor may be included in the point cloud video encoder or may be configured as a separate component/module. The encapsulation processor may encapsulate the data in a file format such as ISOBMFF or process the same in the form of a DASH segment or the like. According to an embodiment, the encapsulation processor may include the point cloud video-related metadata in the file format. The point cloud video metadata may be included, for example, in boxes at various levels on the ISOBMFF file format or as data in a separate track within the file. According to an embodiment, the encapsulation processor may encapsulate the point cloud video-related metadata into a file. The transmission processor may perform processing for transmission on the point cloud video data encapsulated according to the file format. The transmission processor may be included in the transmitter or may be configured as a separate component/module. The transmission processor may process the point cloud video data according to a transmission protocol. The processing for transmission may include processing for delivery over a broadcast network and processing for delivery through a broadband. According to an embodiment, the transmission processor may receive point cloud video-related metadata from the metadata processor along with the point cloud video data, and perform processing of the point cloud video data for transmission.

The transmitter 1004 may transmit the encoded video/image information or data that is output in the form of a bitstream to the receiver of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoding device.

The receiver 1003 may receive point cloud video data transmitted by the point cloud video transmission device according to the present disclosure. Depending on the transmission channel, the receiver may receive the point cloud video data over a broadcast network or through a broadband. Alternatively, the point cloud video data may be received through a digital storage medium.

The reception processor may process the received point cloud video data according to the transmission protocol. The reception processor may be included in the receiver or may be configured as a separate component/module. The reception processor may reversely perform the above-described process of the transmission processor such that the processing corresponds to the processing for transmission performed at the transmission side. The reception processor may deliver the acquired point cloud video data to the decapsulation processor, and the acquired point cloud video-related metadata to the metadata parser. The point cloud video-related metadata acquired by the reception processor may take the form of a signaling table.

The decapsulation processor (file/segment decapsulation module) 10007 may decapsulate the point cloud video data received in the form of a file from the reception processor. The decapsulation processor may decapsulate the files according to ISOBMFF or the like, and may acquire a point cloud video bitstream or point cloud video-related metadata (a metadata bitstream). The acquired point cloud video bitstream may be delivered to the point cloud video decoder, and the acquired point cloud video-related metadata (metadata bitstream) may be delivered to the metadata processor. The point cloud video bitstream may include the metadata (metadata bitstream). The metadata processor may be included in the point cloud video decoder or may be configured as a separate component/module. The point cloud video-related metadata acquired by the decapsulation processor may take the form of a box or a track in the file format. The decapsulation processor may receive metadata necessary for decapsulation from the metadata processor, when necessary. The point cloud video-related metadata may be delivered to the point cloud video decoder and used in a point cloud video decoding procedure, or may be transferred to the renderer and used in a point cloud video rendering procedure.

The point cloud video decoder may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer may render the reconstructed geometry and the color point cloud image/picture. The rendered video/image may be displayed through the display. The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. According to an embodiment, head orientation information, viewport information indicating a region currently viewed by a user, and the like may be delivered to the transmission side in the feedback process. According to an embodiment, the user may interact with things implemented in the VR/AR/MR/self-driving environment. In this case, information related to the interaction may be delivered to the transmission side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/direction of the user's head, vertical or horizontal FOV supported by the device, and the like.

According to an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by the user. A viewpoint is a point which is viewed by the user in the point cloud video and may represent a center point of the viewport region. That is, a viewport is a region around a viewpoint, and the size and form of the region may be determined by the field of view (FOV).

The present disclosure relates to point cloud video compression as described above. For example, the methods/embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value. It may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area in some cases. In a general case, an M×N block may include samples (or a sample array) or a set (or array) of transform coefficients configured in M columns and N rows.

FIG. 3 illustrates an example of a point cloud, a geometry image, and a texture image according to embodiments.

A point cloud according to the embodiments may be input to the V-PCC encoding process of FIG. 4, which will be described later, to generate a geometric image and a texture image. According to embodiments, a point cloud may have the same meaning as point cloud data.

As shown in the figure, the left part shows a point cloud, in which an object is positioned in a 3D space and may be represented by a bounding box or the like. The middle part shows the geometry, and the right part shows a texture image (non-padded image).

Video-based point cloud compression (V-PCC) according to embodiments may provide a method of compressing 3D point cloud data based on a 2D video codec such as HEVC or VVC. Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to ATLAS, and the values of the occupancy map may indicate whether each sample position in the atlas corresponds to a 3D point.

An atlas is a collection of 2D bounding boxes positioned in a rectangular frame that correspond to a 3D bounding box in a 3D space in which volumetric data is rendered and information related thereto.

The atlas bitstream is a bitstream for one or more atlas frames constituting an atlas and related data.

The atlas frame is a 2D rectangular array of atlas samples onto which patches are projected.

An atlas sample is a position of a rectangular frame onto which patches associated with the atlas are projected.

An atlas frame may be partitioned into tiles. A tile is a unit in which a 2D frame is partitioned. That is, a tile is a unit for partitioning signaling information of point cloud data called an atlas.

Patch: A set of points constituting a point cloud, which indicates that points belonging to the same patch are adjacent to each other in 3D space and are mapped in the same direction among 6-face bounding box planes in the process of mapping to a 2D image.

A patch is a unit in which a tile partitioned. The patch is signaling information on the configuration of point cloud data.

The reception device according to the embodiments may restore attribute video data, geometry video data, and occupancy video data, which are actual video data having the same presentation time, based on an atlas (tile, patch).

Geometry image: this is an image in the form of a depth map that presents position information (geometry) about each point constituting a point cloud on a patch-by-patch basis. The geometry image may be composed of pixel values of one channel. Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch info may include information about the position, size, and the like of a patch in a 2D/3D space.

Point cloud data according to the embodiments, for example, V-PCC components may include an atlas, an occupancy map, geometry, and attributes.

Atlas represents a set of 2D bounding boxes. It may be patches, for example, patches projected onto a rectangular frame. Atlas may correspond to a 3D bounding box in a 3D space, and may represent a subset of a point cloud.

An attribute may represent a scalar or vector associated with each point in the point cloud. For example, the attributes may include color, reflectance, surface normal, time stamps, material ID.

The point cloud data according to the embodiments represents PCC data according to video-based point cloud compression (V-PCC) scheme. The point cloud data may include a plurality of components. For example, it may include an occupancy map, a patch, geometry and/or texture.

Figure 4:
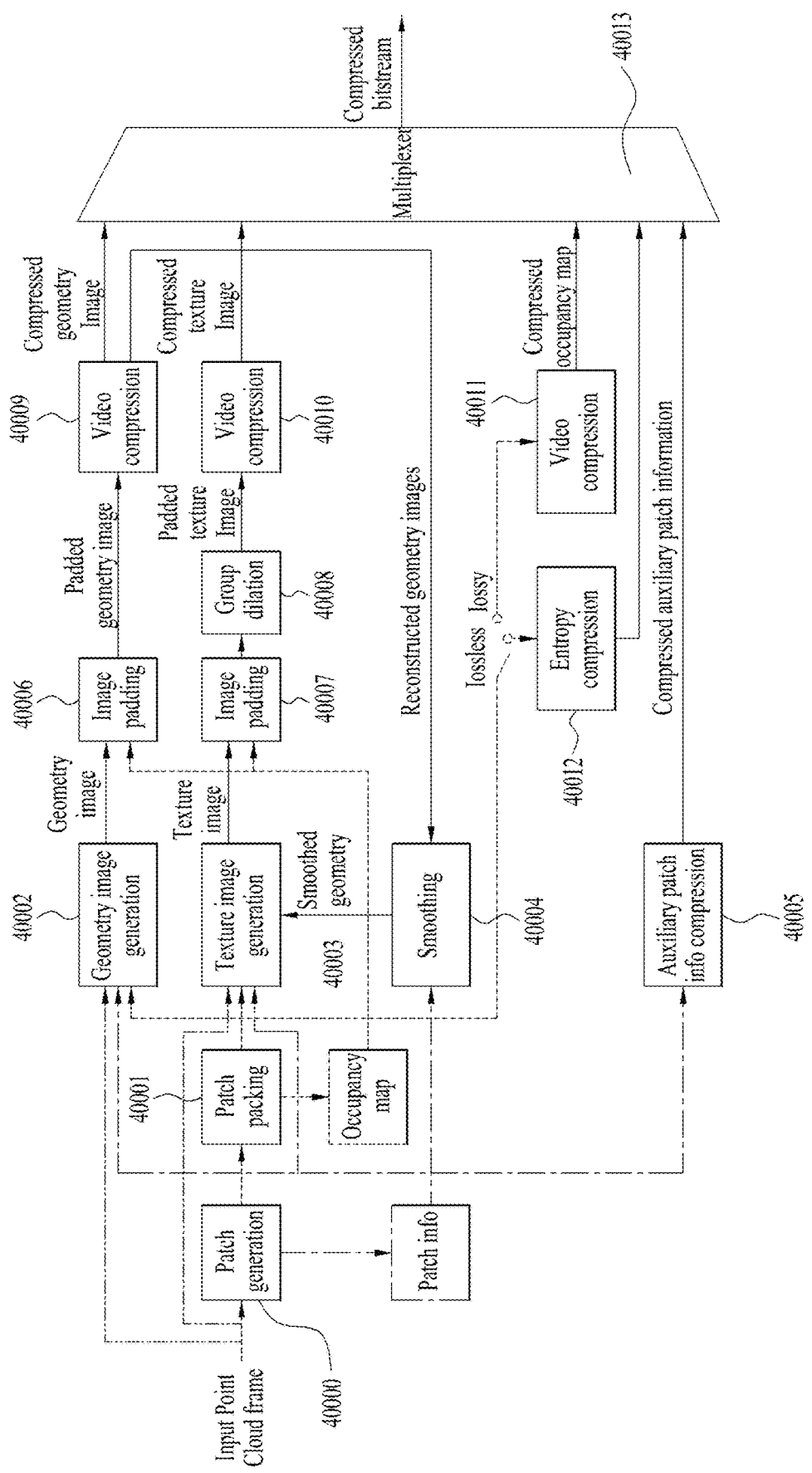
FIG. 4 illustrates an exemplary V-PCC encoding process according to embodiments.

FIG. 4 illustrates a V-PCC encoding process according to embodiments.

The figure illustrates a V-PCC encoding process for generating and compressing an occupancy map, a geometry image, a texture image, and auxiliary patch information. The V-PCC encoding process of FIG. 4 may be processed by the point cloud video encoder 10002 of FIG. 1. Each element of FIG. 4 may be performed by software, hardware, processor and/or a combination thereof.

The patch generation or patch generator 40000 receives a point cloud frame (which may be in the form of a bitstream containing point cloud data). The patch generator 40000 generates a patch from the point cloud data. In addition, patch information including information about patch generation is generated.

The patch packing or patch packer 40001 packs patches for point cloud data. For example, one or more patches may be packed. In addition, the patch packer generates an occupancy map containing information about patch packing.

The geometry image generation or geometry image generator 40002 generates a geometry image based on the point cloud data, patches, and/or packed patches. The geometry image refers to data containing geometry related to the point cloud data.

The texture image generation or texture image generator 40003 generates a texture image based on the point cloud data, patches, and/or packed patches. In addition, the texture image may be generated further based on smoothed geometry generated by smoothing processing of smoothing based on the patch information.

The smoothing or smoother 40004 may mitigate or eliminate errors contained in the image data. For example, based on the patched reconstructed geometry image, portions that may cause errors between data may be smoothly filtered out to generate smoothed geometry.

The auxiliary patch info compression or auxiliary patch info compressor 40005, auxiliary patch information related to the patch information generated in the patch generation is compressed. In addition, the compressed auxiliary patch information may be transmitted to the multiplexer. The auxiliary patch information may be used in the geometry image generation 40002.

The image padding or image padder 40006, 40007 may pad the geometry image and the texture image, respectively. The padding data may be padded to the geometry image and the texture image.

The group dilation or group dilator 40008 may add data to the texture image in a similar manner to image padding. The added data may be inserted into the texture image.

The video compression or video compressor 40009, 40010, 40011 may compress the padded geometry image, the padded texture image, and/or the occupancy map, respectively. The compression may encode geometry information, texture information, occupancy information, and the like.

The entropy compression or entropy compressor 40012 may compress (e.g., encode) the occupancy map based on an entropy scheme.

According to embodiments, the entropy compression and/or video compression may be performed, respectively depending on whether the point cloud data is lossless and/or lossy.

The multiplexer 40013 multiplexes the compressed geometry image, the compressed texture image, and the compressed occupancy map into a bitstream.

The specific operations in the respective processes of FIG. 4 are described below.

Patch generation 40000

The patch generation process refers to a process of dividing a point cloud into patches, which are mapping units, in order to map the point cloud to the 2D image. The patch generation process may be divided into three steps: normal value calculation, segmentation, and patch segmentation.

The normal value calculation process will be described in detail with reference to FIG. 5.

Figure 5:
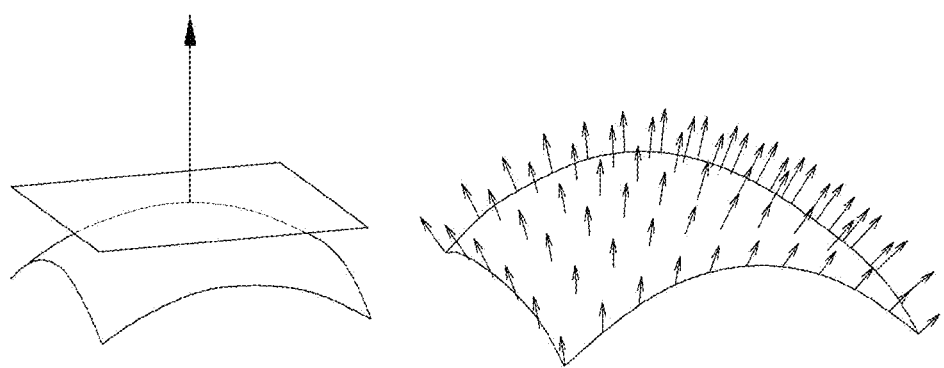
FIG. 5 illustrates an example of a tangent plane and a normal vector of a surface according to embodiments.

FIG. 5 illustrates an example of a tangent plane and a normal vector of a surface according to embodiments.

The surface of FIG. 5 is used in the patch generation process 40000 of the V-PCC encoding process of FIG. 4 as follows.

Normal calculation related to patch generation:

Each point of a point cloud has its own direction, which is represented by a 3D vector called a normal vector. Using the neighbors of each point obtained using a K-D tree or the like, a tangent plane and a normal vector of each point constituting the surface of the point cloud as shown in the figure may be obtained. The search range applied to the process of searching for neighbors may be defined by the user.

The tangent plane refers to a plane that passes through a point on the surface and completely includes a tangent line to the curve on the surface.

Figure 6:
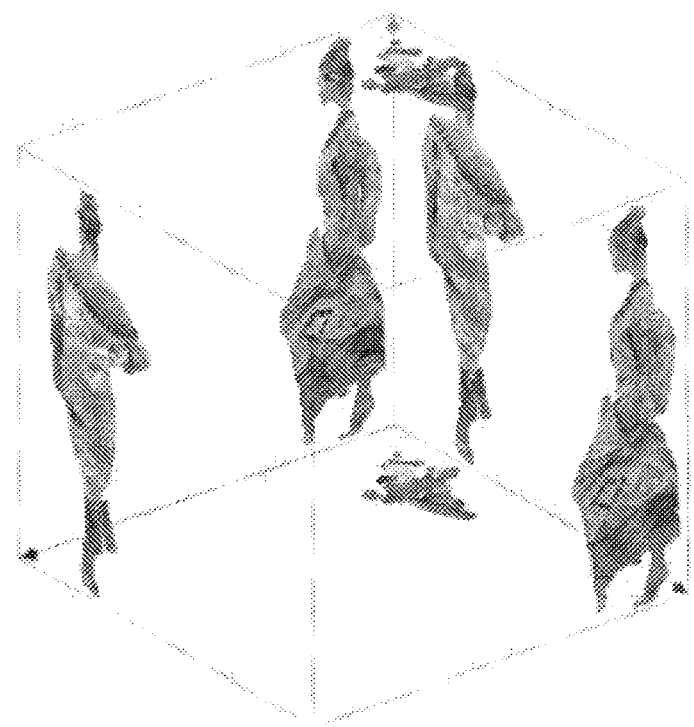
FIG. 6 illustrates an exemplary bounding box of a point cloud according to embodiments.

FIG. 6 illustrates an exemplary bounding box of a point cloud according to embodiments.

A method/device according to embodiments, for example, patch generation, may employ a bounding box in generating a patch from point cloud data.

The bounding box according to the embodiments refers to a box of a unit for dividing point cloud data based on a hexahedron in a 3D space.

The bounding box may be used in the process of projecting a target object of the point cloud data onto a plane of each planar face of a hexahedron in a 3D space. The bounding box may be generated and processed by the point cloud video acquirer 10000 and the point cloud video encoder 10002 of FIG. 1. Further, based on the bounding box, the patch generation 40000, patch packing 40001, geometry image generation 40002, and texture image generation 40003 of the V-PCC encoding process of FIG. 2 may be performed.

Segmentation related to patch generation

Segmentation is divided into two processes: initial segmentation and refine segmentation.

The point cloud encoder 10002 according to the embodiments projects a point onto one face of a bounding box. Specifically, each point constituting a point cloud is projected onto one of the six faces of a bounding box surrounding the point cloud as shown in the figure. Initial segmentation is a process of determining one of the planar faces of the bounding box onto which each point is to be projected.

$\vec{n}_{P_{idx}}$, which is a normal value corresponding to each of the six planar faces, is defined as follows:

(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{P_i}$ of each point, which is obtained in the normal value calculation process, and $\vec{n}_{P_{idx}}$ is determined as a projection plane of the corresponding point. That is, a plane whose normal vector is most similar to the direction of the normal vector of a point is determined as the projection plane of the point.

$$\max_{p_{idx}}\{\vec{n}_{p_i} \cdot \vec{n}_{p_{idx}}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In this case, the weight value may be defined by the user. The refine segmentation may be performed repeatedly, and the number of repetitions may also be defined by the user.

Patch segmentation related to patch generation

Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;

2) When the neighboring points are projected onto the same plane as the current point (when they have the same cluster index), extract the current point and the neighboring points as one patch;

3) Calculate geometry values of the extracted patch. The details are described below; and 4) Repeat operations 2) to 4) until there is no unextracted point.

The occupancy map, geometry image and texture image for each patch as well as the size of each patch are determined through the patch segmentation process.

Figure 7:
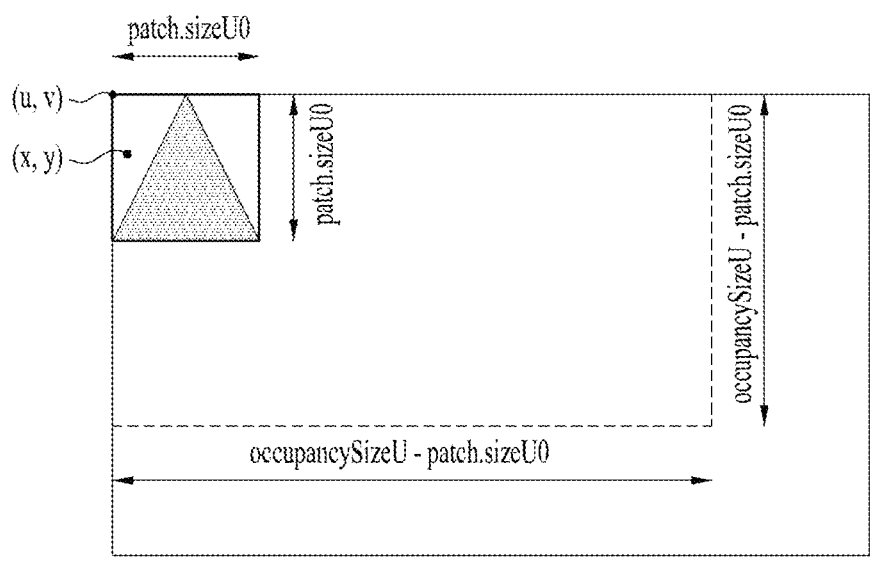
FIG. 7 illustrates an example of determination of individual patch positions on an occupancy map according to embodiments.

FIG. 7 illustrates an example of determination of individual patch positions on an occupancy map according to embodiments.

The point cloud encoder 10002 according to the embodiments may perform patch packing and generate an occupancy map.

Patch Packing & Occupancy Map Generation (40001)

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;

2) Place a patch at a point (u, v) having a horizontal coordinate within the range of (0, occupancySizeU—patch.sizeU0) and a vertical coordinate within the range of (0, occupancySizeV—patch.sizeV0) in the occupancy map plane;

3) Set a point (x, y) having a horizontal coordinate within the range of (0, patch.sizeU0) and a vertical coordinate within the range of (0, patch.sizeV0) in the patch plane as a current point;

4) Change the position of point (x, y) in raster order and repeat operations 3) and 4) if the value of coordinate (x, y) on the patch occupancy map is 1 (there is data at the point in the patch) and the value of coordinate (u+x, v+y) on the global occupancy map is 1 (the occupancy map is filled with the previous patch). Otherwise, proceed to operation 6);

5) Change the position of (u, v) in raster order and repeat operations 3) to 5);

6) Determine (u, v) as the position of the patch and copy the occupancy map data about the patch onto the corresponding portion on the global occupancy map; and 7) Repeat operations 2) to 7) for the next patch.

occupancySizeU: indicates the width of the occupancy map. The unit thereof is occupancy packing block size.

occupancySizeV: indicates the height of the occupancy map. The unit thereof is occupancy packing block size.

patch.sizeU0: indicates the width of the occupancy map. The unit thereof is occupancy packing block size.

patch.sizeV0: indicates the height of the occupancy map. The unit thereof is occupancy packing block size.

For example, as shown in FIG. 7, there is a box corresponding to a patch having a patch size in a box corresponding to an occupancy packing size block, and a point (x, y) may be located in the box.

Figure 8:
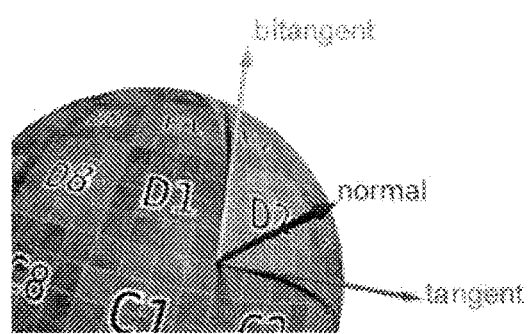
FIG. 8 shows an exemplary relationship among normal, tangent, and bitangent axes according to embodiments.

FIG. 8 shows an exemplary relationship among normal, tangent, and bitangent axes according to embodiments.

The point cloud encoder 10002 according to embodiments may generate a geometry image. The geometry image refers to image data including geometry information about a point cloud. The geometry image generation process may employ three axes (normal, tangent, and bitangent) of a patch in FIG. 8.

Geometry Image Generation (40002)

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in the figure.

Figure 9:
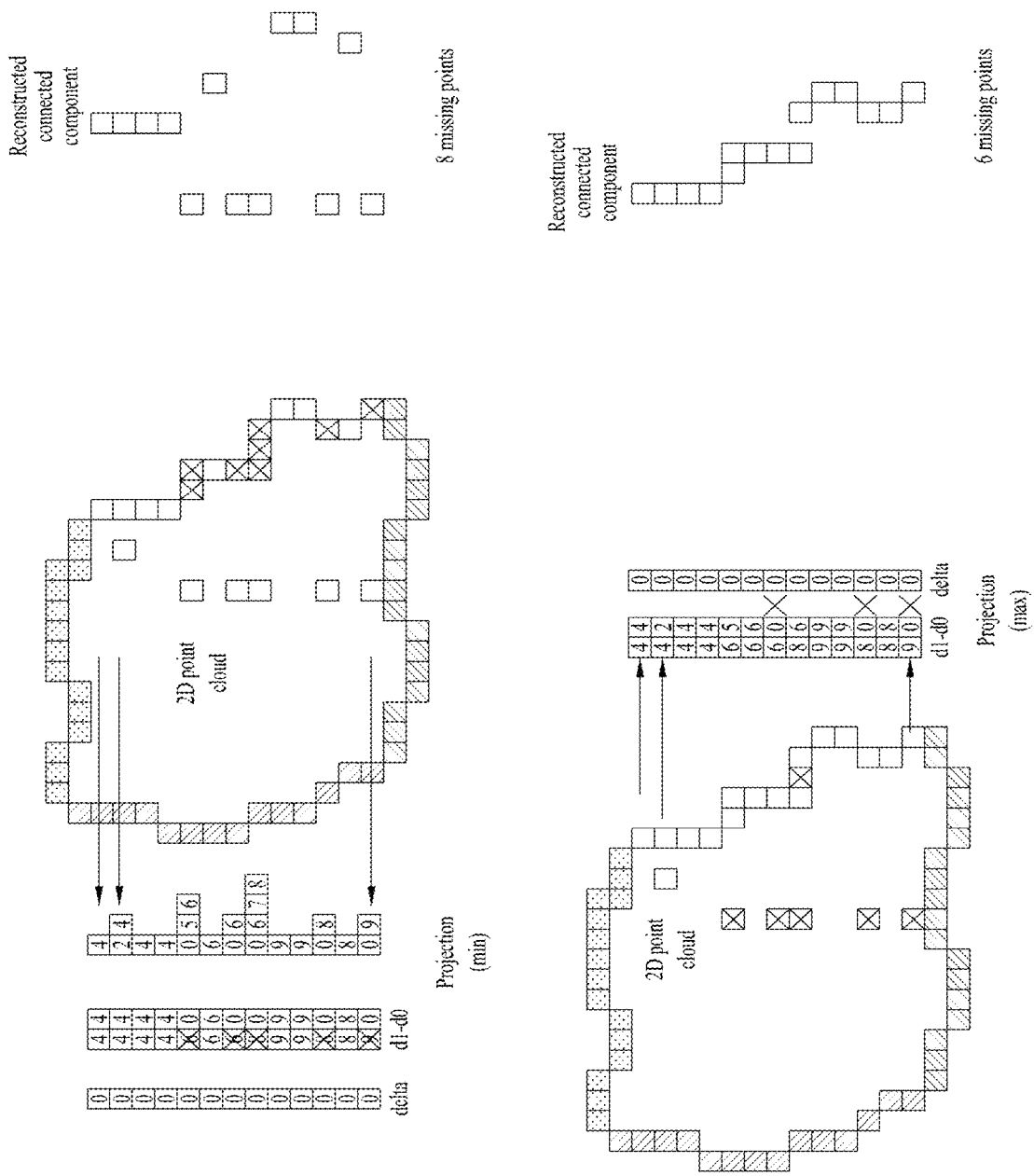
FIG. 9 shows an exemplary configuration of the minimum mode and maximum mode of a projection mode according to embodiments.

FIG. 9 shows an exemplary configuration of the minimum mode and maximum mode of a projection mode according to embodiments.

The point cloud encoder 10002 according to embodiments may perform patch-based projection to generate a geometry image, and the projection mode according to the embodiments includes a minimum mode and a maximum mode.

3D spatial coordinates of a patch may be calculated based on the bounding box of the minimum size surrounding the patch. For example, the 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for d0, and the maximum depth within the surface thickness from the minimum depth may be configured for d1, as shown in the figure.

For example, when a point cloud is located in 2D as illustrated in the figure, there may be a plurality of patches including a plurality of points. As shown in the figure, it is indicated that points marked with the same style of shadow may belong to the same patch. The figure illustrates the process of projecting a patch of points marked with blanks.

When projecting points marked with blanks to the left/right, the depth may be incremented by 1 as 0, 1, 2, . . . , 6, 7, 8, 9 with respect to the left side, and the number for calculating the depths of the points may be marked on the right side.

The same projection mode may be applied to all point clouds or different projection modes may be applied to respective frames or patches according to user definition. When different projection modes are applied to the respective frames or patches, a projection mode that may enhance compression efficiency or minimize missed points may be adaptively selected.

3) Calculate the depth values of the individual points.

In the min mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth0 and the surface thickness at the same position, this value is set to depth1. Otherwise, the value of depth0 is assigned to depth1. Image d1 is constructed with the value of depth1.

For example, a minimum value may be calculated in determining the depth of points of image d0 (4 2 4 4 0 6 0 0 9 9 0 8 0). In determining the depth of points of image d1, a greater value among two or more points may be calculated. When only one point is present, the value thereof may be calculated (4 4 4 4 6 6 6 8 9 9 8 8 9). In the process of encoding and reconstructing the points of the patch, some points may be lost (For example, in the figure, eight points are lost).

In the max mode, image d0 is constructed with depth0 which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth0 and the surface thickness at the same position, this value is set to depth1. Otherwise, the value of depth0 is assigned to depth1. Image d1 is constructed with the value of depth1.

For example, a maximum value may be calculated in determining the depth of points of d0 (4 4 4 4 6 6 6 8 9 9 8 8 9). In addition, in determining the depth of points of d1, a lower value among two or more points may be calculated. When only one point is present, the value thereof may be calculated (4 2 4 4 5 6 0 6 9 9 0 8 0). In the process of encoding and reconstructing the points of the patch, some points may be lost (For example, in the figure, six points are lost).

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 method) is to encode the depth values of the previously generated image d1. A second method (differential method) is to encode a difference between the depth values of previously generated image d1 and the depth values of image d0.

In the encoding method using the depth values of the two layers, d0 and d1 as described above, if there is another point between the two depths, the geometry information about the point is lost in the encoding process, and therefore an enhanced-delta-depth (EDD) code may be used for lossless coding.

Hereinafter, the EDD code will be described in detail with reference to FIG. 10.

Figure 10:
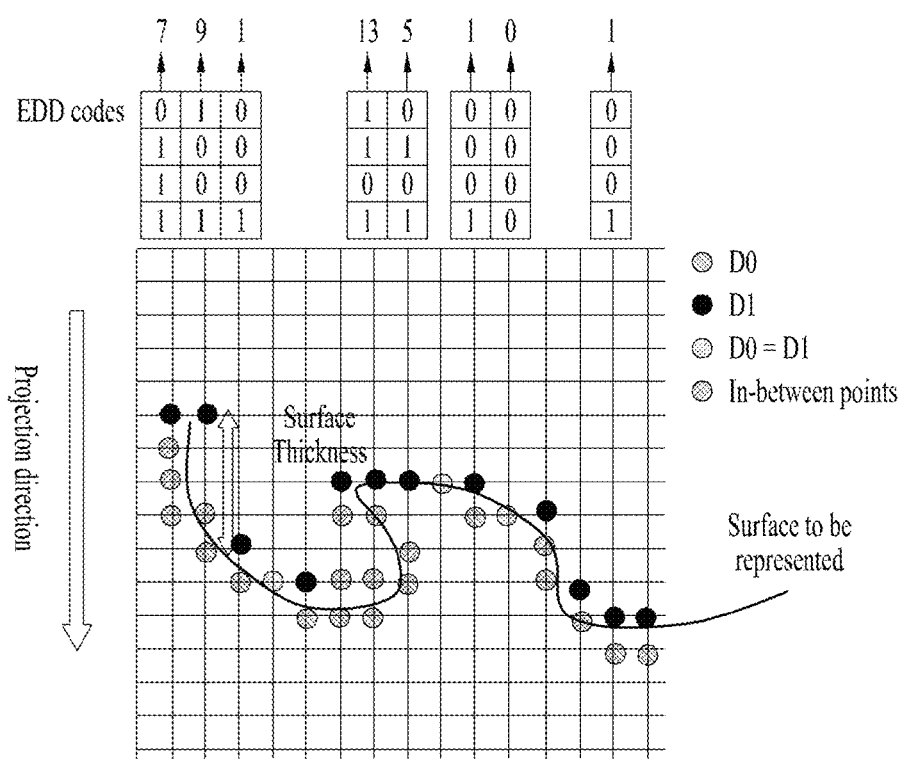
FIG. 10 illustrates an exemplary EDD code according to embodiments.

FIG. 10 illustrates an exemplary EDD code according to embodiments.

In some/all processes of the point cloud encoder 10002 and/or V-PCC encoding (e.g., video compression 40009), the geometry information about points may be encoded based on the EOD code.

As shown in the figure, the EDD code is used for binary encoding of the positions of all points within the range of surface thickness including d1. For example, in the figure, the points included in the second left column may be represented by an EDD code of 0b1001 (=9) because the points are present at the first and fourth positions over D0 and the second and third positions are empty. When the EDD code is encoded together with D0 and transmitted, a reception terminal may restore the geometry information about all points without loss.

For example, when there is a point present above a reference point, the value is 1. When there is no point, the value is 0. Thus, the code may be expressed based on 4 bits.

Smoothing (40004)

Smoothing is an operation for eliminating discontinuity that may occur on the patch boundary due to deterioration of the image quality occurring during the compression process. Smoothing may be performed by the point cloud encoder or smoother:

1) Reconstruct the point cloud from the geometry image. This operation may be the reverse of the geometry image generation described above. For example, the reverse process of encoding may be reconstructed;

2) Calculate neighboring points of each point constituting the reconstructed point cloud using the K-D tree or the like;

3) Determine whether each of the points is positioned on the patch boundary. For example, when there is a neighboring point having a different projection plane (cluster index) from the current point, it may be determined that the point is positioned on the patch boundary;

4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
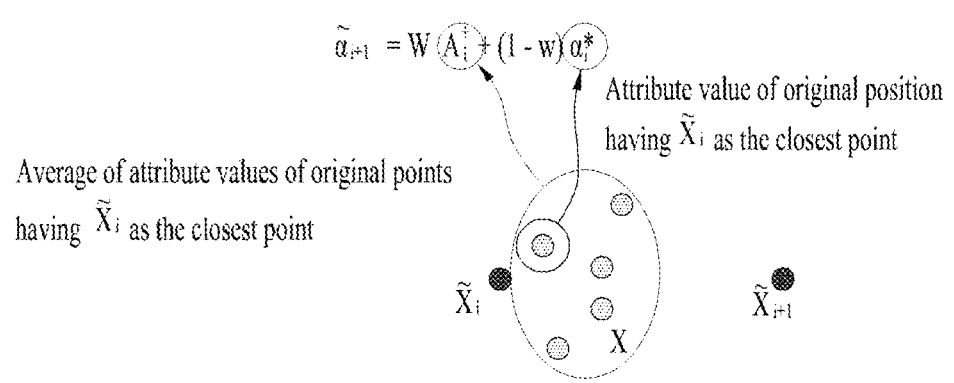
FIG. 11 illustrates an example of recoloring based on color values of neighboring points according to embodiments.

FIG. 11 illustrates an example of recoloring based on color values of neighboring points according to embodiments.

The point cloud encoder or the texture image generator 40003 according to the embodiments may generate a texture image based on recoloring.

Texture Image Generation (40003)

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in the figure, a new color value may be calculated in consideration of the color value of the nearest neighboring point and the color values of the neighboring points.

For example, referring to the figure, in the recoloring, a suitable color value for a changed position may be calculated based on the average of the attribute information about the closest original points to a point and/or the average of the attribute information about the closest original positions to the point.

Texture images may also be generated in two layers of t0 and t1, like the geometry images, which are generated in two layers of d0 and d1.

Auxiliary Patch Info Compression (40005)

The point cloud encoder or the auxiliary patch info compressor according to the embodiments may compress the auxiliary patch information (auxiliary information about the point cloud).

The auxiliary patch info compressor compresses the auxiliary patch information generated in the patch generation, patch packing, and geometry generation processes described above. The auxiliary patch information may include the following parameters:

Index (cluster index) for identifying the projection plane (normal plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d size v), the minimum horizontal value (patch 2d shift u), and the minimum vertical value (patch 2d shift u); and Mapping information about each block and patch, i.e., a candidate index (when patches are disposed in order based on the 2D spatial position and size information about the patches, multiple patches may be mapped to one block in an overlapping manner. In this case, the mapped patches constitute a candidate list, and the candidate index indicates the position in sequential order of a patch whose data is present in the block), and a local patch index (which is an index indicating one of the patches present in the frame). Table X shows a pseudo code representing the process of matching between blocks and patches based on the candidate list and the local patch indexes.

The maximum number of candidate lists may be defined by a user.

TABLE 1-1

Pseudo code for mapping a block to a patch

```
for( i = 0; i < BlockCount; i++ ) {
  if( candidatePatches[ i ].size( ) = = 1 ) {
    blockToPatch[ i ] = candidatePatches[ i ][ 0 ]
  } else {
    candidate_index
    if( candidate_index = = max_candidate_count) {
      blockToPatch[ i ] = local_patch_index
    } else {
      blockToPatch[ i ] =
candidatePatches[ i ][ candidate_index ]
    }
  }
}
```

Figure 12:
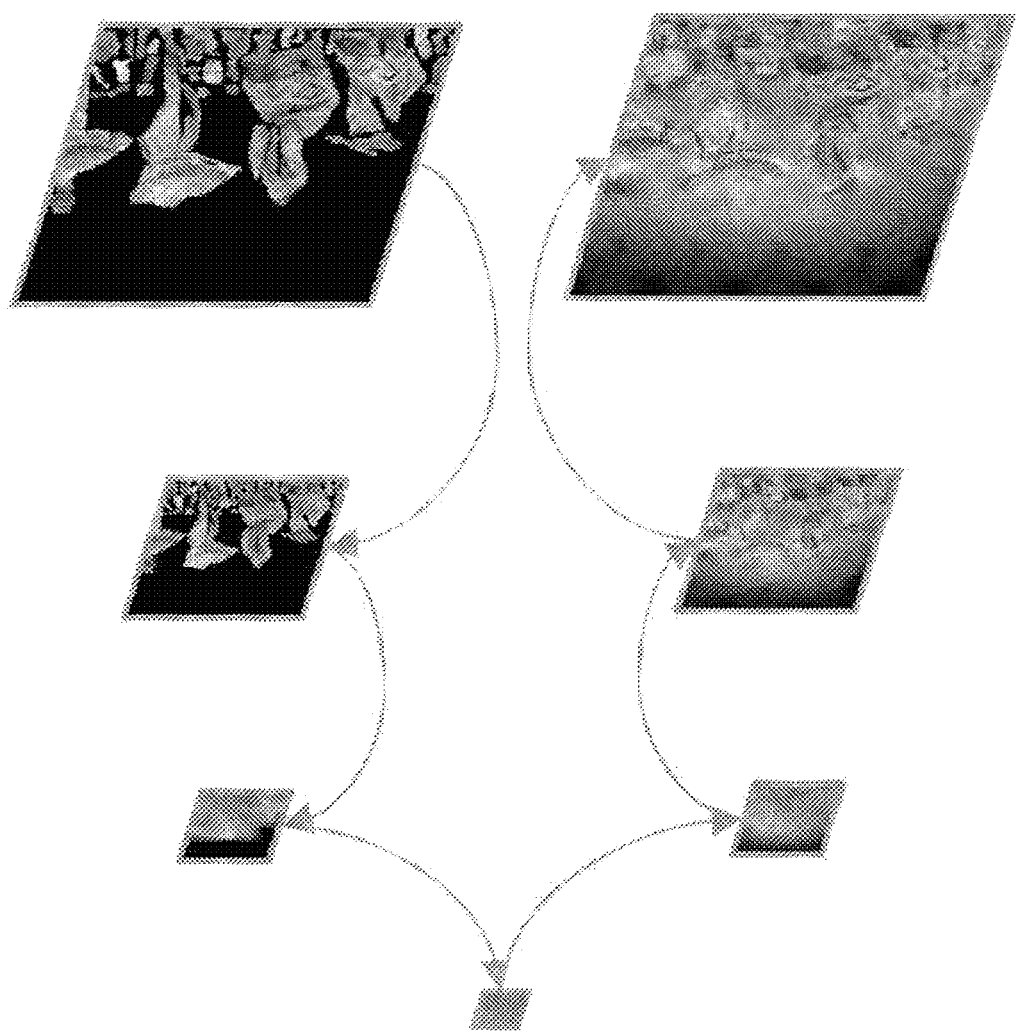
FIG. 12 illustrates an example of push-pull background filling according to embodiments.

FIG. 12 illustrates push-pull background filling according to embodiments.

Image Padding and Group Dilation (40006, 40007, 40008)

The image padder according to the embodiments may fill the space except the patch area with meaningless supplemental data based on the push-pull background filling technique.

Image padding is a process of filling the space other than the patch region with meaningless data to improve compression efficiency. For image padding, pixel values in columns or rows close to a boundary in the patch may be copied to fill the empty space. Alternatively, as shown in the figure, a push-pull background filling method may be used. According to this method, the empty space is filled with pixel values from a low resolution image in the process of gradually reducing the resolution of a non-padded image and increasing the resolution again.

Group dilation is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
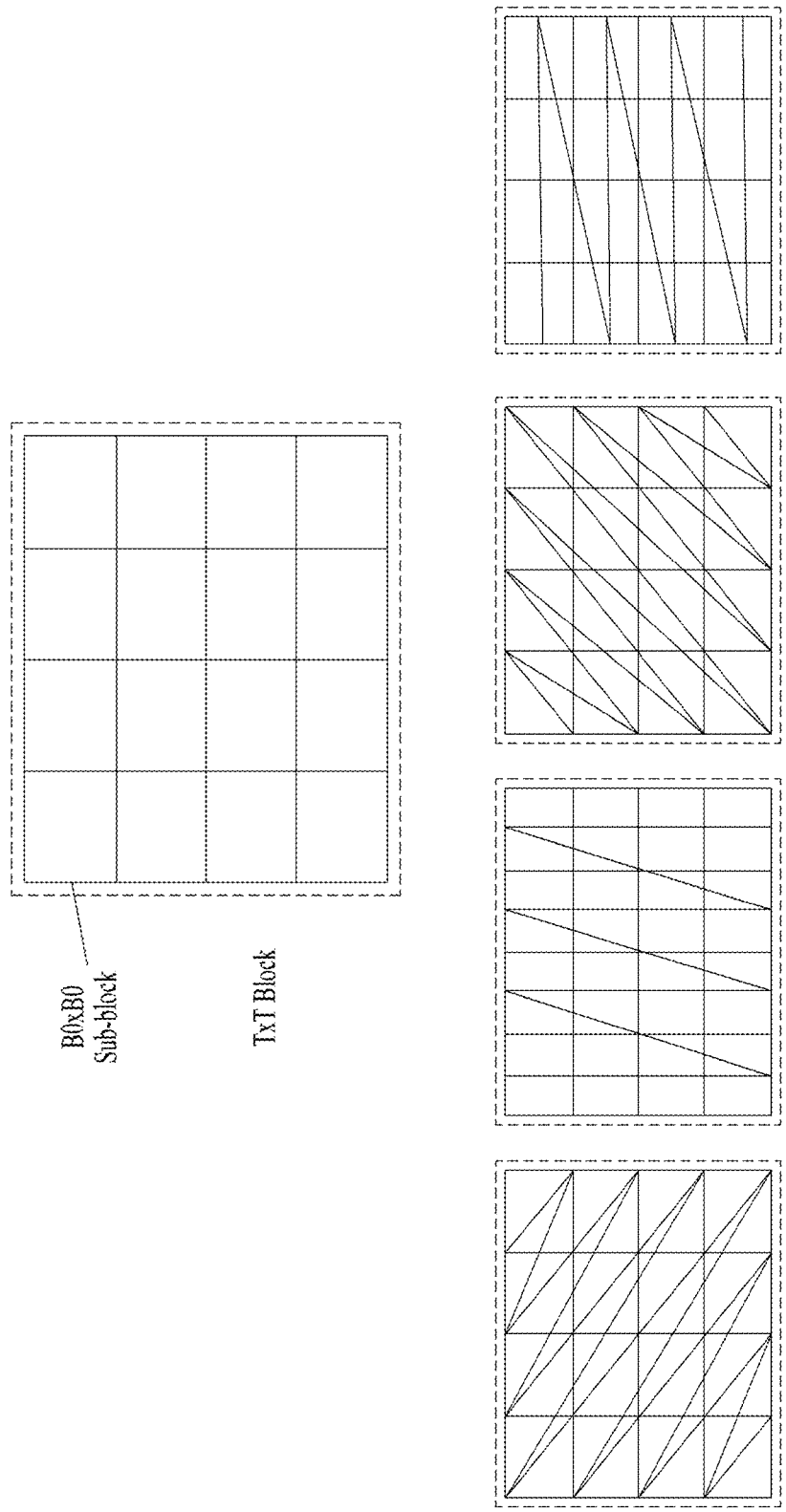
FIG. 13 shows an exemplary possible traversal order for a 4*4 block according to embodiments.

FIG. 13 shows an exemplary possible traversal order for a 4*4 block according to embodiments.

Occupancy Map Compression (40012, 40011)

The occupancy map compressor according to the embodiments may compress the previously generated occupancy map. Specifically, two methods, namely video compression for lossy compression and entropy compression for lossless compression, may be used. Video compression is described below.

The entropy compression may be performed through the following operations.

1) If a block constituting an occupancy map is fully occupied, encode 1 and repeat the same operation for the next block of the occupancy map. Otherwise, encode 0 and perform operations 2) to 5).

2) Determine the best traversal order to perform run-length coding on the occupied pixels of the block. The figure shows four possible traversal orders for a 4*4 block.

Figure 14:
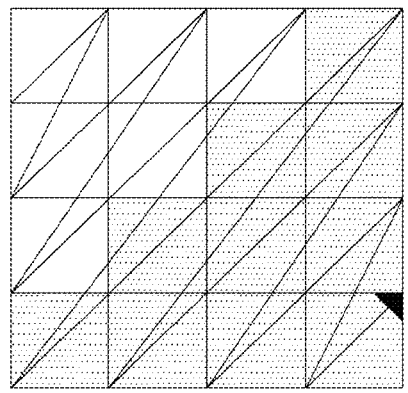
FIG. 14 illustrates an exemplary best traversal order according to embodiments.

FIG. 14 illustrates an exemplary best traversal order according to embodiments.

As described above, the entropy compressor according to the embodiments may code (encode) a block based on the traversal order scheme as described above.

For example, the best traversal order with the minimum number of runs is selected from among the possible traversal orders and the index thereof is encoded. The figure illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.

4) Encode the occupancy of the first run. In the example of FIG. 14, 0 is encoded because the first run corresponds to unoccupied pixels.

5) Encode lengths of the individual runs (as many as the number of runs). In the example of FIG. 14, the lengths of the first run and the second run, 6 and 10, are sequentially encoded.

Video Compression (40009, 40010, 40011)

The video compressor according to the embodiments encodes a sequence of a geometry image, a texture image, an occupancy map image, and the like generated in the above-described operations, using a 2D video codec such as HEVC or VVC.

Figure 15:
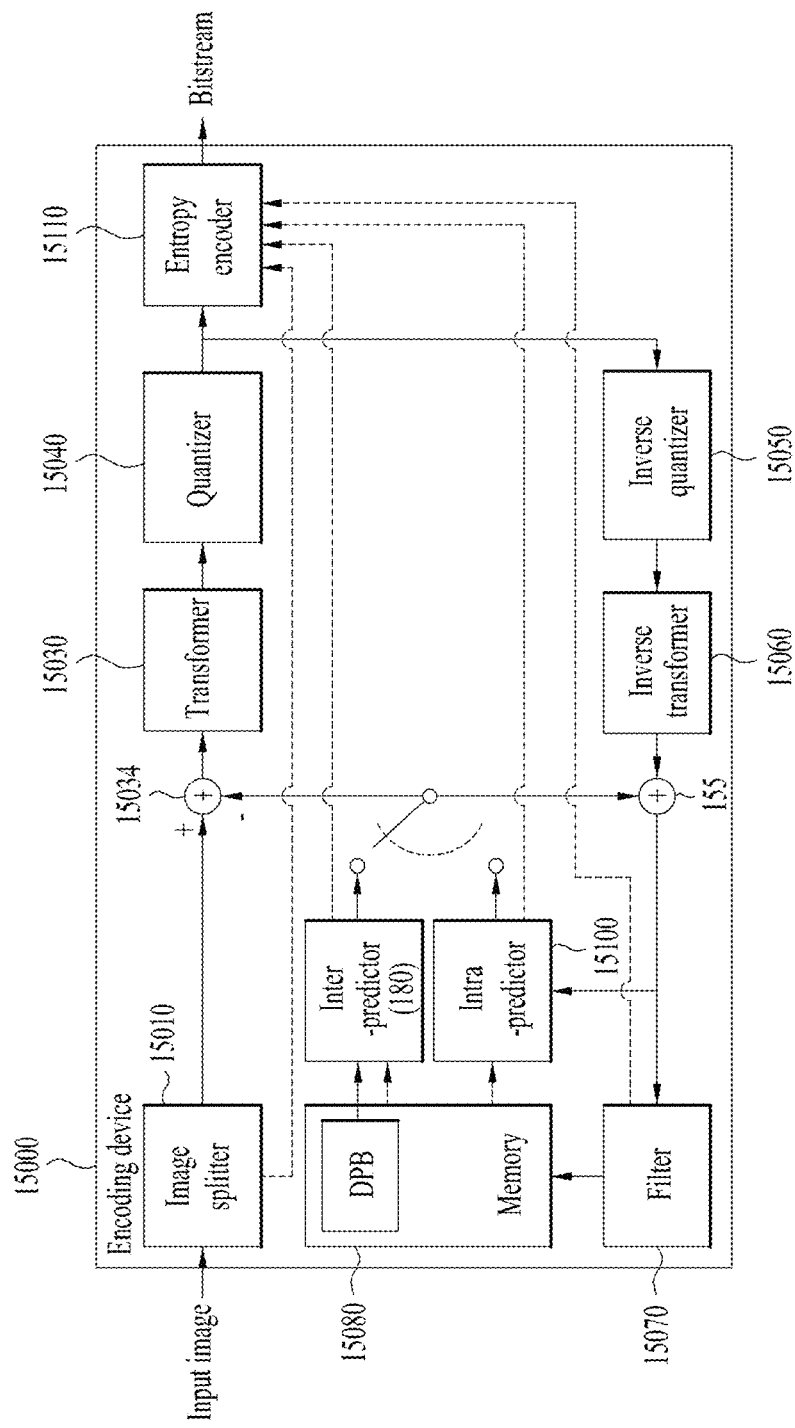
FIG. 15 illustrates an exemplary 2D video/image encoder according to embodiments.

FIG. 15 illustrates an exemplary 2D video/image encoder according to embodiments.

The figure, which represents an embodiment to which the video compression or video compressor 40009, 40010, and 40011 described above is applied, is a schematic block diagram of a 2D video/image encoder 15000 configured to encode a video/image signal. The 2D video/image encoder 15000 may be included in the point cloud video encoder described above or may be configured as an internal/external component. Each component of FIG. 15 may correspond to software, hardware, processor and/or a combination thereof.

Here, the input image may include the geometry image, the texture image (attribute(s) image), and the occupancy map image described above. The output bitstream (i.e., the point cloud video/image bitstream) of the point cloud video encoder may include output bitstreams for the respective input images (i.e., the geometry image, the texture image (attribute(s) image), the occupancy map image, etc.).

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be included in the residual processor. The residual processor may further include a subtractor 15020. According to an embodiment, the image splitter 15010, the subtractor 15020, the transformer 15030, the quantizer 15040, the inverse quantizer 15050, the inverse transformer 15060, the adder 155, the filter 15070, the inter-predictor 15090, the intra-predictor 15100, and the entropy encoder 15110 described above may be configured by one hardware component (e.g., an encoder or a processor). In addition, the memory 15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In this case, the CU may be recursively split from a coding tree unit (CTU) or a largest coding unit (LCU) according to a quad-tree binary-tree (QTBT) structure. For example, one CU may be split into a plurality of CUs of a lower depth based on a quad-tree structure and/or a binary-tree structure. In this case, for example, the quad-tree structure may be applied first and the binary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area. In a general case, an M×N block may represent a set of samples or transform coefficients configured in M columns and N rows. A sample may generally represent a pixel or a value of a pixel, and may indicate only a pixel/pixel value of a luma component, or only a pixel/ pixel value of a chroma component. "Sample" may be used as a term corresponding to a pixel or a pel in one picture (or image).

The encoder 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In this case, as shown in the figure, the unit that subtracts the prediction signal (predicted block or predicted sample array) from the input image signal (original block or original sample array) in the encoder 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loève transform (KLT), graph-based transform (GBT), or conditionally non-linear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector. The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis. The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 155 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 155 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering. As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture transmitted to the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse coding mode (PCM) is applied, the prediction, transform, and quantization procedures may be skipped, and the value of the original sample may be encoded and output in the form of a bitstream.

Figure 16:
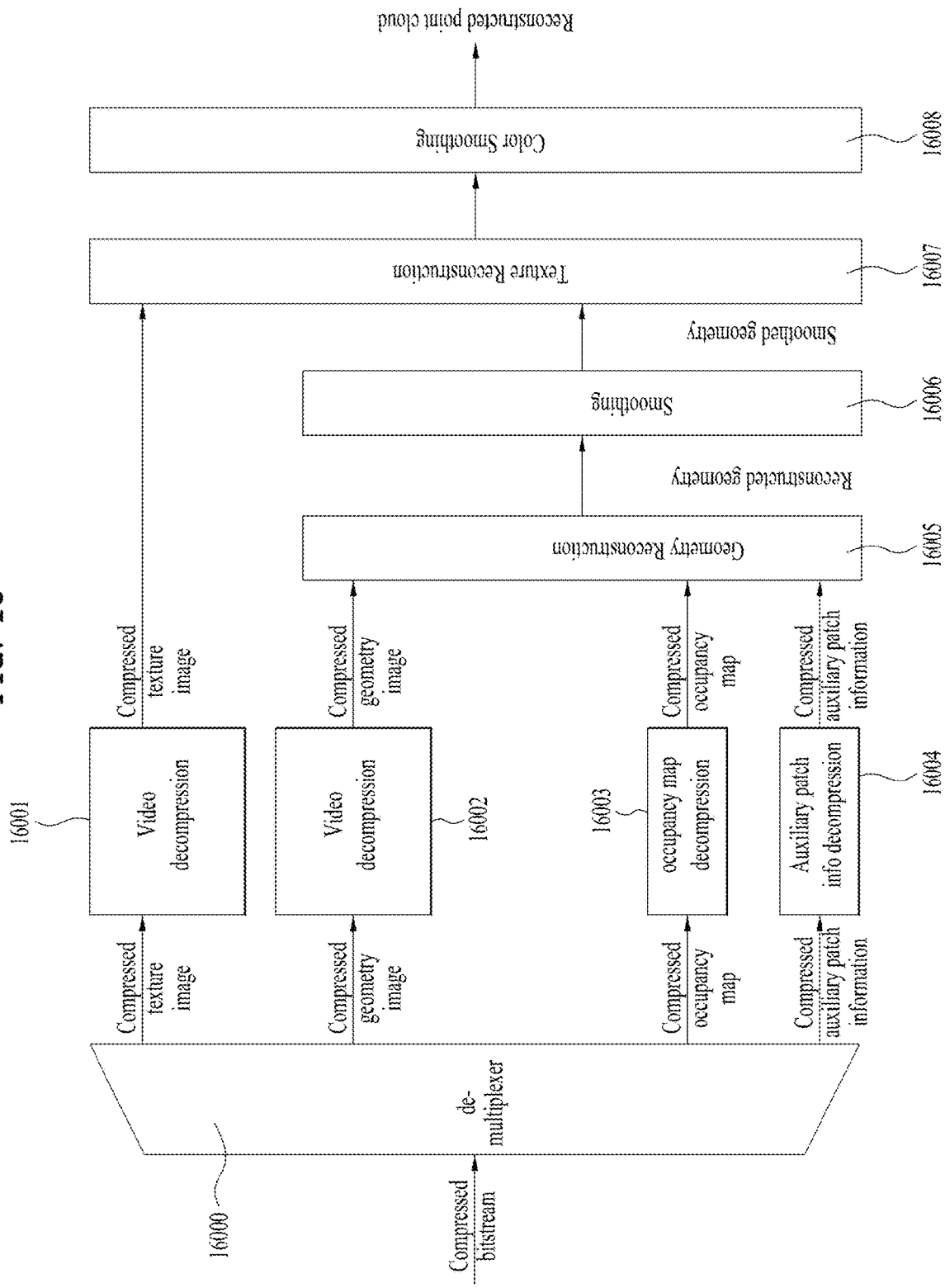
FIG. 16 illustrates an exemplary V-PCC decoding process according to embodiments.

FIG. 16 illustrates an exemplary V-PCC decoding process according to embodiments.

The V-PCC decoding process or V-PCC decoder may follow the reverse process of the V-PCC encoding process (or encoder) of FIG. 4. Each component in FIG. 16 may correspond to software, hardware, a processor, and/or a combination thereof.

The demultiplexer 16000 demultiplexes the compressed bitstream to output a compressed texture image, a compressed geometry image, a compressed occupancy map, and compressed auxiliary patch information.

The video decompression or video decompressor 16001, 16002 decompresses (or decodes) each of the compressed texture image and the compressed geometry image.

The occupancy map decompression or occupancy map decompressor 16003 decompresses the compressed occupancy map.

The auxiliary patch info decompression or auxiliary patch info decompressor 16004 decompresses auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed.

The smoothing or smoother 16006 may apply smoothing to the reconstructed geometry. For example, smoothing filtering may be applied.

The texture reconstruction or texture reconstructor 16007 reconstructs the texture from the decompressed texture image and/or the smoothed geometry.

The color smoothing or color smoother 16008 smoothes color values from the reconstructed texture. For example, smoothing filtering may be applied.

As a result, reconstructed point cloud data may be generated.

The figure illustrates a decoding process of the V-PCC for reconstructing a point cloud by decoding the compressed occupancy map, geometry image, texture image, and auxiliary path information. Each process according to the embodiments is operated as follows.

Video Decompression (1600, 16002)

Video decompression is a reverse process of the video compression described above. In video decompression, a 2D video codec such as HEVC or VVC is used to decode a compressed bitstream containing the geometry image, texture image, and occupancy map image generated in the above-described process.

Figure 17:
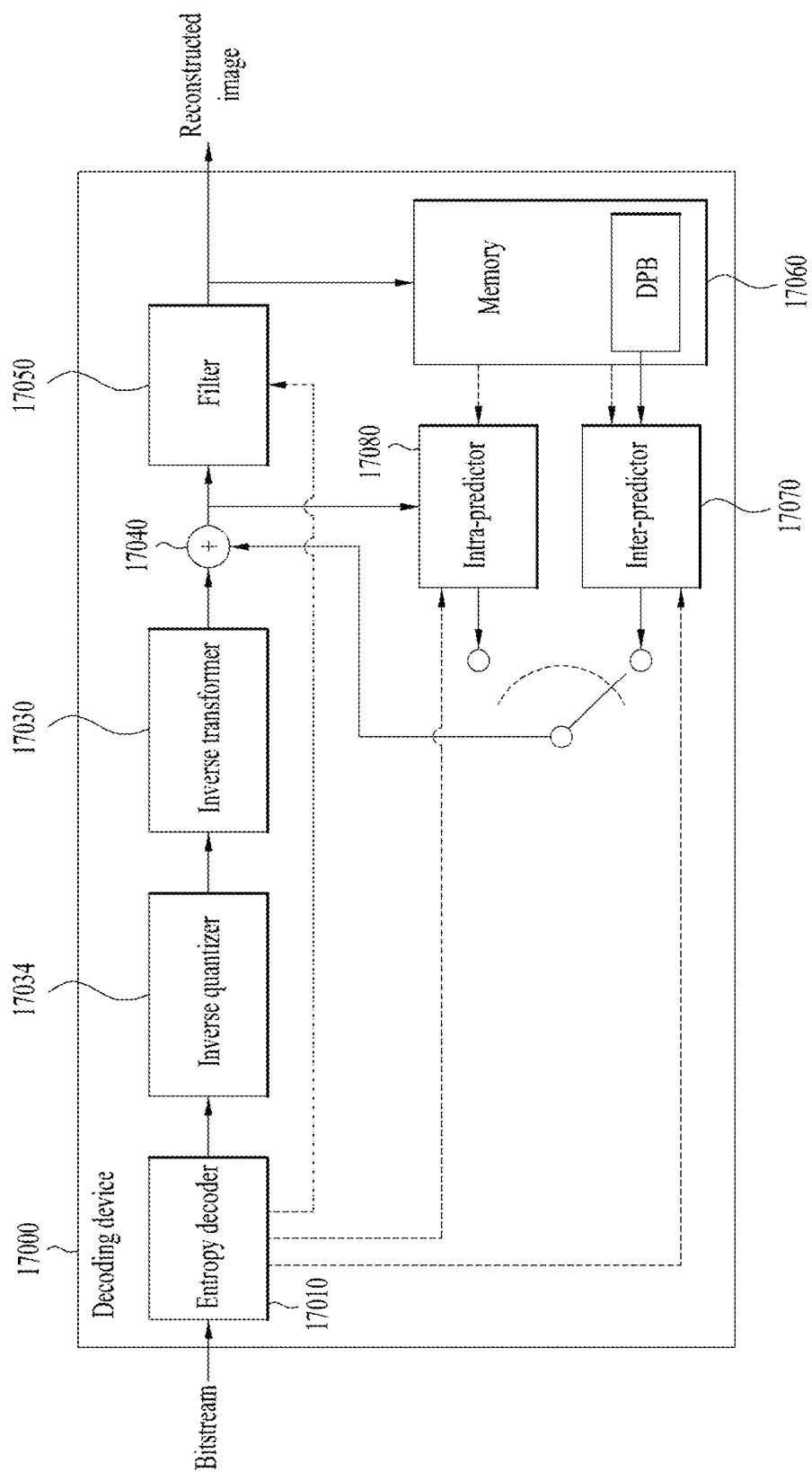
FIG. 17 shows an exemplary 2D video/image decoder according to embodiments.

FIG. 17 illustrates an exemplary 2D video/image decoder according to embodiments.

The 2D video/image decoder may follow the reverse process of the 2D video/image encoder of FIG. 15.

The 2D video/image decoder of FIG. 17 is an embodiment of the video decompression or video decompressor of FIG. 16. FIG. 17 is a schematic block diagram of a 2D video/image decoder 17000 by which decoding of a video/image signal is performed. The 2D video/image decoder 17000 may be included in the point cloud video decoder of FIG. 1, or may be configured as an internal/external component. Each component in FIG. 17 may correspond to software, hardware, a processor, and/or a combination thereof.

Here, the input bitstream may include bitstreams for the geometry image, texture image (attribute(s) image), and occupancy map image described above. The reconstructed image (or the output image or the decoded image) may represent a reconstructed image for the geometry image, texture image (attribute(s) image), and occupancy map image described above.

Referring to the figure, an inter-predictor 17070 and an intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 described above may be configured by one hardware component (e.g., a decoder or a processor) according to an embodiment. In addition, the memory 170 may include a decoded picture buffer (DPB) or may be configured by a digital storage medium.

When a bitstream containing video/image information is input, the decoder 17000 may reconstruct an image in a process corresponding to the process in which the video/image information is processed by the encoder of FIG. 1. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In this case, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 265 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal. For example, the filter 17050 may generate a modified reconstructed picture by applying various filtering techniques to the reconstructed picture, and may transmit the modified reconstructed picture to the memory 250, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, the embodiments described regarding the filter 160, the inter-predictor 180, and the intra-predictor 185 of the encoding device 100 may be applied to the filter 17050, the inter-predictor 17070 and the intra-predictor 17080 of the decoder 17000, respectively, in the same or corresponding manner.

At least one of the prediction, transform, and quantization procedures described above may be skipped. For example, for a block to which the pulse coding mode (PCM) is applied, the prediction, transform, and quantization procedures may be skipped, and the value of a decoded sample may be used as a sample of the reconstructed image.

Occupancy Map Decompression (16003)

This is a reverse process of the occupancy map compression described above. Occupancy map decompression is a process for reconstructing the occupancy map by decompressing the occupancy map bitstream.

Auxiliary Patch Info Decompression (16004)

The auxiliary patch information may be reconstructed by performing the reverse process of the aforementioned auxiliary patch info compression and decoding the compressed auxiliary patch info bitstream.

Geometry Reconstruction (16005)

This is a reverse process of the geometry image generation described above. Initially, a patch is extracted from the geometry image using the reconstructed occupancy map, the 2D position/size information about the patch included in the auxiliary patch info, and the information about mapping between a block and the patch. Then, a point cloud is reconstructed in a 3D space based on the geometry image of the extracted patch and the 3D position information about the patch included in the auxiliary patch info. When the geometry value corresponding to a point (u, v) within the patch is g(u, v), and the coordinates of the position of the patch on the normal, tangent and bitangent axes of the 3D space are (δ0, s0, r0), $\Box\delta(u, v)$, s(u, v), and r(u, v), which are the normal, tangent, and bitangent coordinates in the 3D space of a position mapped to point (u, v) may be expressed as follows:

$$\delta(u,v)=\delta 0+g(u,v);$$

$$s(u,v)=s0+u;$$

$$r(u,v)=r0+v.$$

Smoothing (16006)

Smoothing, which is the same as the smoothing in the encoding process described above, is a process for eliminating discontinuity that may occur on the patch boundary due to deterioration of the image quality occurring during the compression process.

Texture Reconstruction (16007)

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the mapping information about the geometry image and the point cloud in the geometry reconstruction process described above.

Color Smoothing (16008)

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described in section 2.5 may be used.

2) Determine whether each of the points is positioned on the patch boundary. These operations may be performed based on the boundary information calculated in the geometry smoothing process described above.

3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
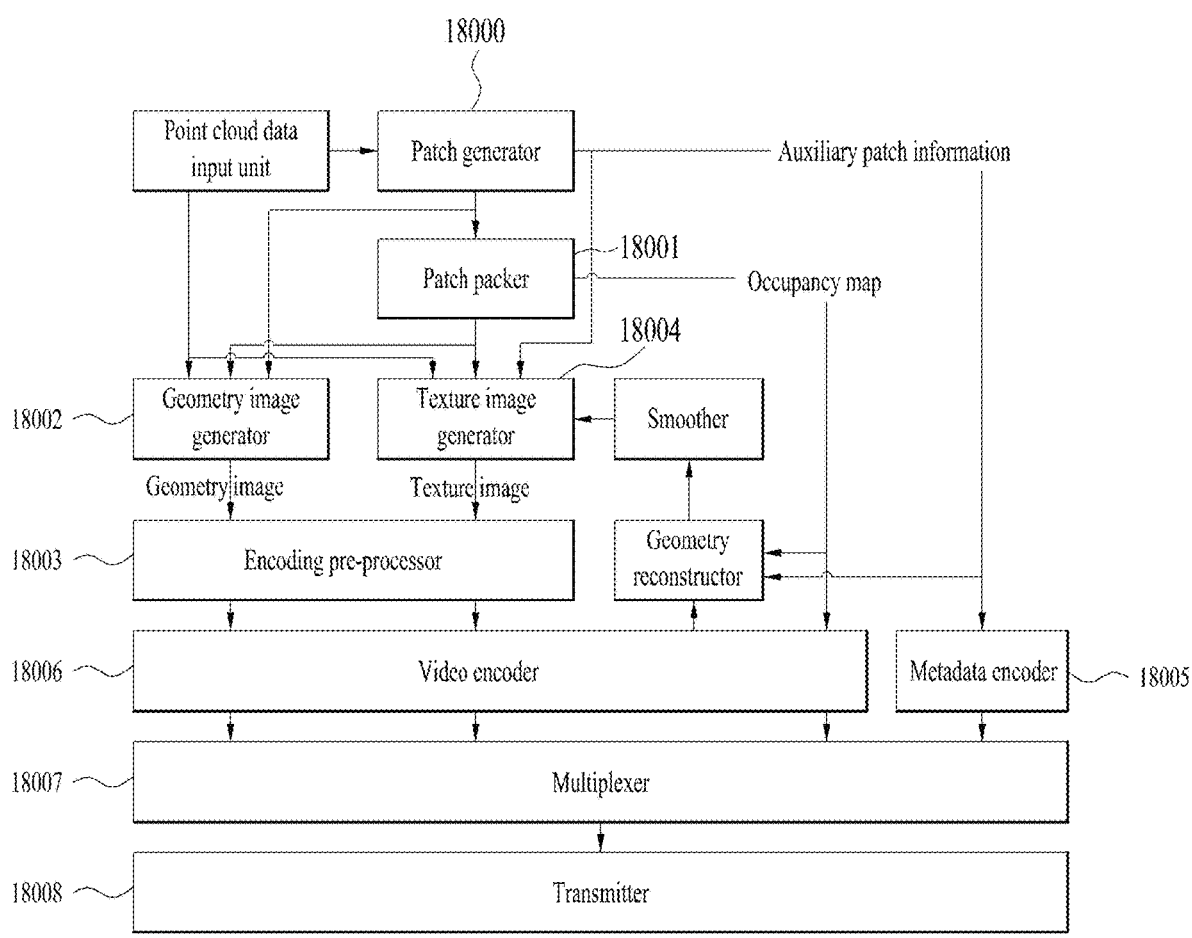
FIG. 18 is a flowchart illustrating operation of a transmission device according to embodiments of the present disclosure.

FIG. 18 is a flowchart illustrating operation of a transmission device according to embodiments of the present disclosure.

The transmission device according to the embodiments may correspond to the transmission device of FIG. 1, the encoding process of FIG. 4, and the 2D video/image encoder of FIG. 15, or perform some/all of the operations thereof. Each component of the transmission device may correspond to software, hardware, a processor and/or a combination thereof.

An operation process of the transmission terminal for compression and transmission of point cloud data using V-PCC may be performed as illustrated in the figure.

The point cloud data transmission device according to the embodiments may be referred to as a transmission device.

Regarding a patch generator 18000, a patch for 2D image mapping of a point cloud is generated. Auxiliary patch information is generated as a result of the patch generation. The generated information may be used in the processes of geometry image generation, texture image generation, and geometry reconstruction for smoothing.

Regarding a patch packer 18001, a patch packing process of mapping the generated patches into the 2D image is performed. As a result of patch packing, an occupancy map may be generated. The occupancy map may be used in the processes of geometry image generation, texture image generation, and geometry reconstruction for smoothing.

A geometry image generator 18002 generates a geometry image based on the auxiliary patch information and the occupancy map. The generated geometry image is encoded into one bitstream through video encoding.

An encoding preprocessor 18003 may include an image padding procedure. The geometry image regenerated by decoding the generated geometry image or the encoded geometry bitstream may be used for 3D geometry reconstruction and then be subjected to a smoothing process.

A texture image generator 18004 may generate a texture image based on the (smoothed) 3D geometry, the point cloud, the auxiliary patch information, and the occupancy map. The generated texture image may be encoded into one video bitstream.

A metadata encoder 18005 may encode the auxiliary patch information into one metadata bitstream.

A video encoder 18006 may encode the occupancy map into one video bitstream.

A multiplexer 18007 may multiplex the video bitstreams of the generated geometry image, texture image, and occupancy map and the metadata bitstream of the auxiliary patch information into one bitstream.

A transmitter 18008 may transmit the bitstream to the reception terminal. Alternatively, the video bitstreams of the generated geometry image, texture image, and the occupancy map and the metadata bitstream of the auxiliary patch information may be processed into a file of one or more track data or encapsulated into segments and may be transmitted to the reception terminal through the transmitter.

Figure 19:
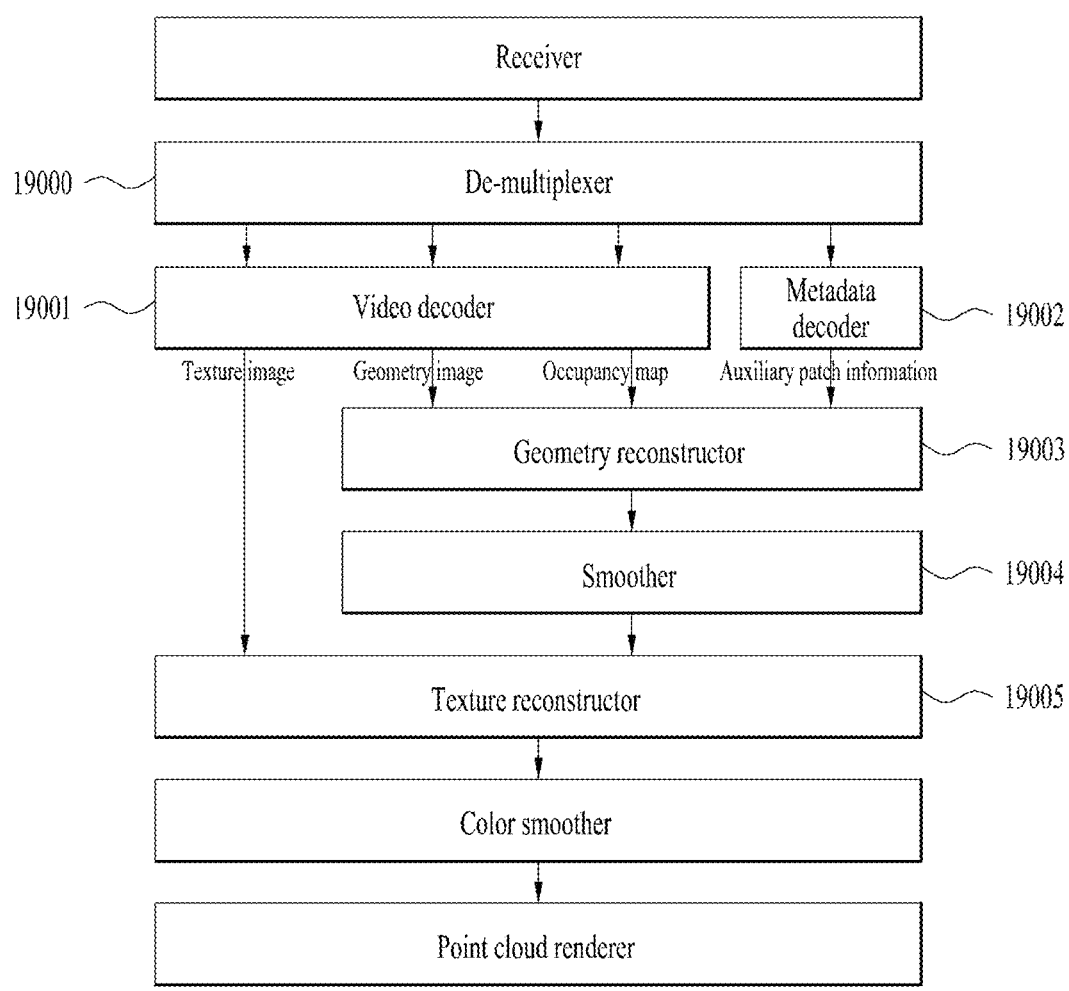
FIG. 19 is a flowchart illustrating operation of a reception device according to embodiments.

FIG. 19 is a flowchart illustrating operation of a reception device according to embodiments.

The reception device according to the embodiments may correspond to the reception device of FIG. 1, the decoding process of FIG. 16, and the 2D video/image encoder of FIG. 17, or perform some/all of the operations thereof. Each component of the reception device may correspond to software, hardware, a processor and/or a combination thereof.

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 18.

The point cloud data reception device according to the embodiments may be referred to as a reception device.

The bitstream of the received point cloud is demultiplexed into the video bitstreams of the compressed geometry image, texture image, occupancy map and the metadata bitstream of the auxiliary patch information by a demultiplexer 19000 after file/segment decapsulation. A video decoder 19001 and a metadata decoder 19002 decode the demultiplexed video bitstreams and metadata bitstream. 3D geometry is reconstructed by a geometry reconstructor 19003 based on the decoded geometry image, occupancy map, and auxiliary patch information, and is then subjected to a smoothing process performed by a smoother 19004. A color point cloud image/picture may be reconstructed by a texture reconstructor 19005 by assigning color values to the smoothed 3D geometry based on the texture image. Thereafter, a color smoothing process may be additionally performed to improve the objective/subjective visual quality, and a modified point cloud image/picture derived through the color smoothing process is shown to the user through the rendering process (through, for example, the point cloud renderer). In some cases, the color smoothing process may be skipped.

Figure 20:
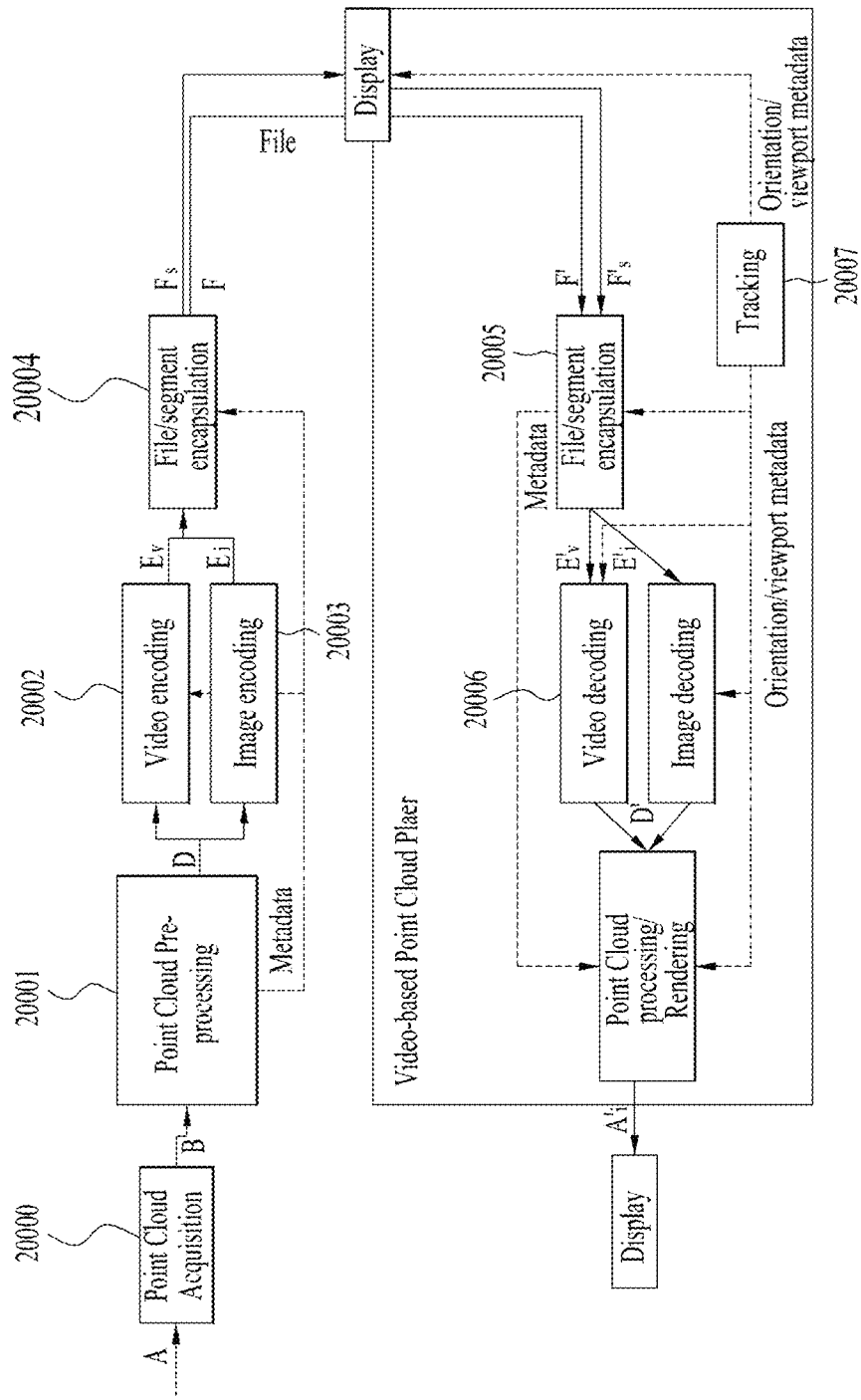
FIG. 20 illustrates an exemplary architecture for V-PCC based storage and streaming of point cloud data according to embodiments.

FIG. 20 illustrates an exemplary architecture for V-PCC based storage and streaming of point cloud data according to embodiments.

A part/the entirety of the system of FIG. 20 may include some or all of the transmission device and reception device of FIG. 1, the encoding process of FIG. 4, the 2D video/ image encoder of FIG. 15, the decoding process of FIG. 16, the transmission device of FIG. 18, and/or the reception device of FIG. 19. Each component in the figure may correspond to software, hardware, a processor and/or a combination thereof.

Figure 21:
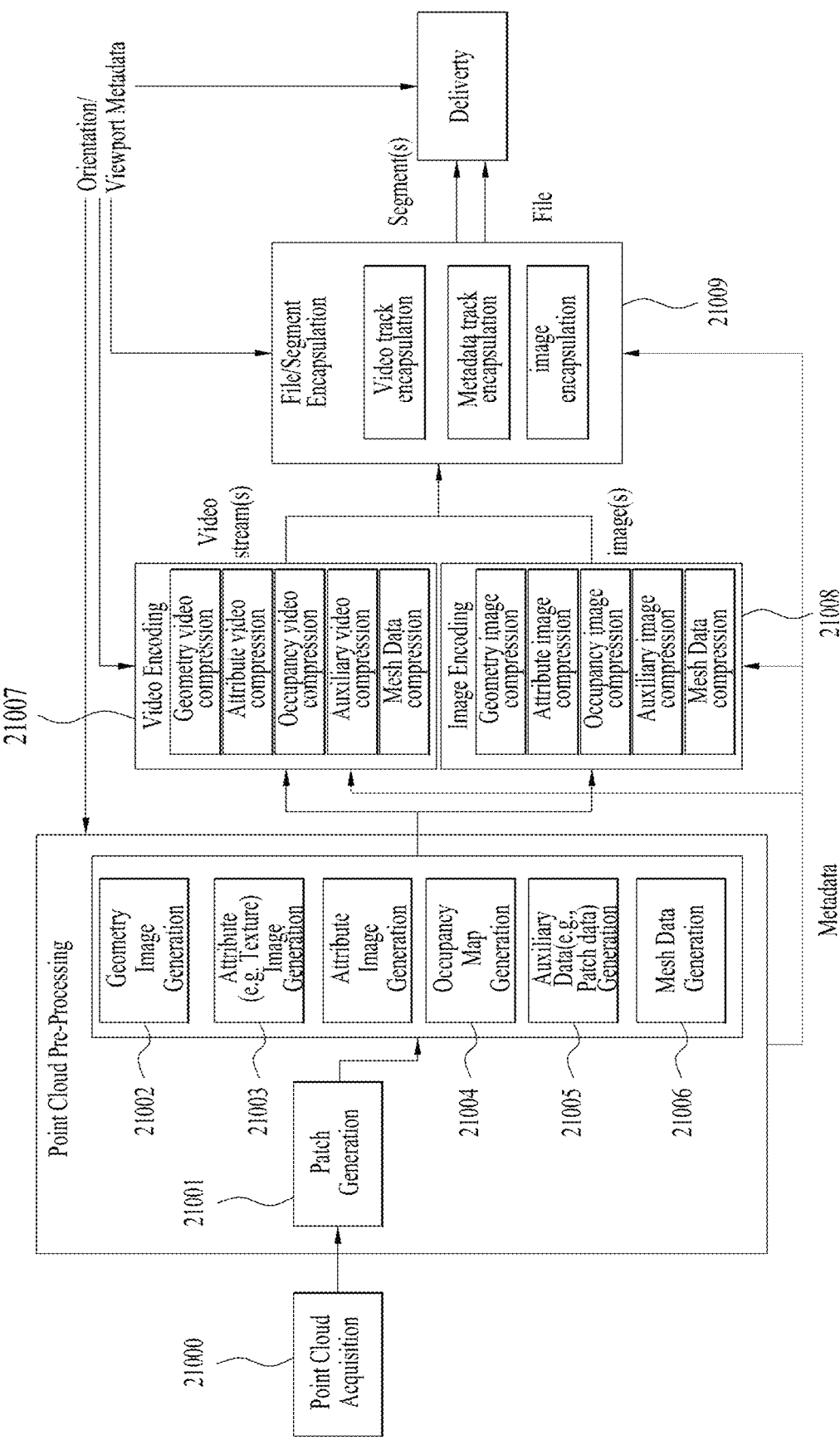
FIG. 21 is an exemplary block diagram of a device for storing and transmitting point cloud data according to embodiments.
Figure 22:
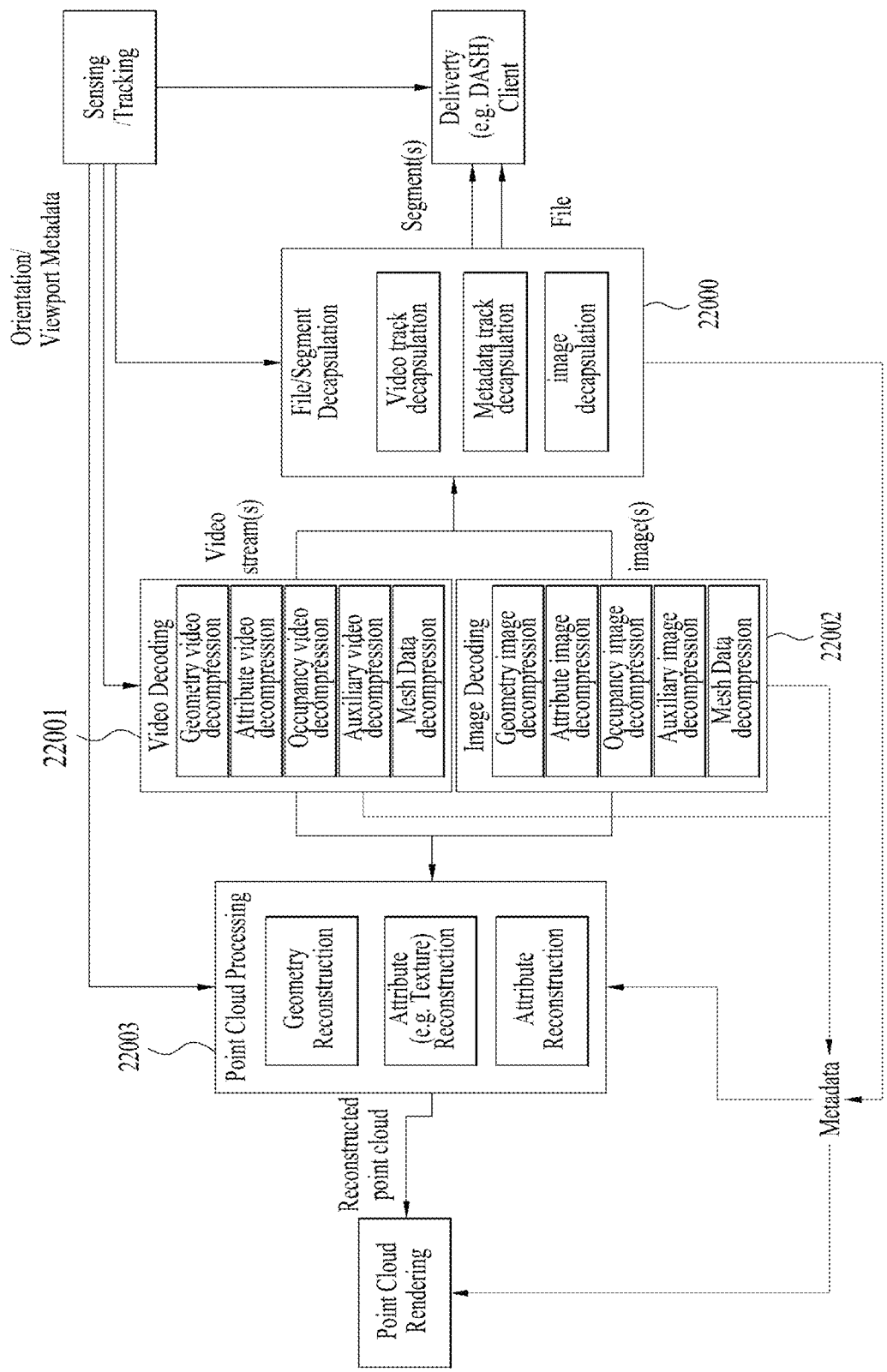
FIG. 22 is an exemplary block diagram of a point cloud data reception device according to embodiments.

FIGS. 20 to 22 are diagrams illustrating a structure in which a system is additionally connected to the transmission device and the reception device according to embodiments. The transmission device and the reception device the system according to embodiments may be referred to as a transmission/reception apparatus according to the embodiments.

In the apparatus according to the embodiments illustrated in FIGS. 20 to 22, the transmitting device corresponding to FIG. 18 or the like may generate a container suitable for a data format for transmission of a bitstream containing encoded point cloud data.

The V-PCC system according to the embodiments may create a container including point cloud data, and may further add additional data necessary for efficient transmission/reception to the container.

The reception device according to the embodiments may receive and parse the container based on the system shown in FIGS. 20 to 22. The reception device corresponding to FIG. 19 or the like may decode and restore point cloud data from the parsed bitstream.

The figure shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

The embodiments propose a method of effectively providing point cloud media/content/data.

In order to effectively provide point cloud media/content/data, a point cloud acquirer 20000 may acquire a point cloud video. For example, one or more cameras may acquire point cloud data through capture, composition or generation of a point cloud. Through this acquisition process, a point cloud video including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processor 20001 may generate one or more pictures/frames of the point cloud video. Here, a picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame of a binary map, which indicates presence or absence of data at the corresponding position in the 2D plane with a value of 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder may perform a video-based point cloud compression (V-PCC) procedure. The point cloud video encoder may perform a series of procedures such as prediction, transform, quantization, and entropy coding for compression and coding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder may perform a video-based point cloud compression (V-PCC) procedure. The point cloud image encoder may perform a series of procedures such as prediction, transform, quantization, and entropy coding for compression and coding efficiency. The encoded image may be output in the form of a bitstream. Based on the V-PCC procedure, the point cloud image encoder may encode the point cloud image by dividing the same into a geometry image, an attribute image, an occupancy map image, and metadata, for example, information about patches, as described below.

The point cloud video encoder and/or the point cloud image encoder according to the embodiments may generate a PCC bitstream (G-PCC and/or V-PCC bitstream) according to the embodiments.

According to embodiments, the video encoder 20002, the image encoder 20003, the video decoding 20006, and the image decoding may be performed by one encoder/decoder as described above, and may be performed along separate paths as shown in the figure.

In file/segment encapsulation 20004, the encoded point cloud data and/or point cloud-related metadata may be encapsulated into a file or a segment for streaming. Here, the point cloud-related metadata may be received from the metadata processor or the like. The metadata processor may be included in the point cloud video/image encoder or may be configured as a separate component/module. The encapsulation processor may encapsulate the corresponding video/image/metadata in a file format such as ISOBMFF or in the form of a DASH segment or the like. According to an embodiment, the encapsulation processor may include the point cloud metadata in the file format. The point cloud-related metadata may be included, for example, in boxes at various levels on the ISOBMFF file format or as data in a separate track within the file. According to an embodiment, the encapsulation processor may encapsulate the point cloud-related metadata into a file.

The encapsulation or encapsulator according to the embodiments may divide the G-PCC/V-PCC bitstream into one or multiple tracks and store the same in a file, and may also encapsulate signaling information for this operation. In addition, the atlas stream included on the G-PCC/V-PCC bitstream may be stored as a track in the file, and related signaling information may be stored. Furthermore, an SEI message present in the G-PCC/V-PCC bitstream may be stored in a track in the file and related signaling information may be stored.

A transmission processor may perform processing of the encapsulated point cloud data for transmission according to the file format. The transmission processor may be included in the transmitter or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver of the reception device over a digital storage medium or a network. For transmission, processing according to any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a decapsulation processor, and the acquired point cloud-related metadata to a metadata parser.

A decapsulation processor (file/segment decapsulation) 20005 may decapsulate the point cloud data received in the form of a file from the reception processor. The decapsulation processor may decapsulate files according to ISOBMFF or the like, and may acquire a point cloud bitstream or point cloud-related metadata (or a separate metadata bitstream). The acquired point cloud bitstream may be delivered to the point cloud decoder, and the acquired point cloud video-related metadata (metadata bitstream) may be delivered to the metadata processor. The point cloud bitstream may include the metadata (metadata bitstream). The metadata processor may be included in the point cloud decoder or may be configured as a separate component/module. The point cloud video-related metadata acquired by the decapsulation processor may take the form of a box or track in the file format. The decapsulation processor may receive metadata necessary for decapsulation from the metadata processor, when necessary. The point cloud-related metadata may be delivered to the point cloud decoder and used in a point cloud decoding procedure, or may be transferred to the renderer and used in a point cloud rendering procedure.

The point cloud video decoder 20006 may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. The color point cloud image/picture may be reconstructed by assigning a color value to the smoothed 3D geometry based on the texture image. The renderer may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker, the transmitter may efficiently encode only the media data of the specific area, that is, the area indicated by the orientation information and/or the viewport information, or generate and transmit a file therefor.

The renderer may render the decoded point cloud data in a 3D space. The rendered video/image may be displayed through the display. The user may view all or part of the rendered result through a VR/AR display or a typical display.

The feedback process may include transferring various kinds of feedback information that may be acquired in the rendering/displaying process to the transmitting side or the decoder of the receiving side. Through the feedback process, interactivity may be provided in consumption of point cloud data. According to an embodiment, head orientation information, viewport information indicating an area currently viewed by a user, and the like may be delivered to the transmitting side in the feedback process. According to an embodiment, the user may interact with what is implemented in the VR/AR/MR/self-driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

FIG. 21 is an exemplary block diagram of a device for storing and transmitting point cloud data according to embodiments.

FIG. 21 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20.

A point cloud data transmission device according to embodiments may be configured as shown in the figure. Each element of the transmission device may be a module/unit/component/hardware/software/a processor.

The geometry, attribute, auxiliary data, and mesh data of the point cloud may each be configured as a separate stream or stored in different tracks in a file. Furthermore, they may be included in a separate segment.

A point cloud acquirer (point cloud acquisition) 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated.

A patch generator (or patch generation) 21002 generates patches from the point cloud data. The patch generator generates point cloud data or point cloud video as one or more pictures/frames. A picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame in a binary map, which indicates presence or absence of data at the corresponding position in the 2D plane with 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

In addition, the patches may be used for 2D image mapping. For example, the point cloud data may be projected onto each face of a cube. After patch generation, a geometry image, one or more attribute images, an occupancy map, auxiliary data, and/or mesh data may be generated based on the generated patches.

Geometry image generation, attribute image generation, occupancy map generation, auxiliary data generation, and/or mesh data generation are performed by a pre-processor or a controller.

In geometry image generation 21002, a geometry image is generated based on the result of the patch generation. Geometry represents a point in a 3D space. The geometry image is generated using the occupancy map, which includes information related to 2D image packing of the patches, auxiliary data (patch data), and/or mesh data based on the patches. The geometry image is related to information such as a depth (e.g., near, far) of the patch generated after the patch generation.

In attribute image generation 21003, an attribute image is generated. For example, an attribute may represent a texture. The texture may be a color value that matches each point. According to embodiments, images of a plurality of attributes (such as color and reflectance) (N attributes) including a texture may be generated. The plurality of attributes may include material information and reflectance. According to an embodiment, the attributes may additionally include information indicating a color, which may vary depending on viewing angle and light even for the same texture.

In occupancy map generation 21004, an occupancy map is generated from the patches. The occupancy map includes information indicating presence or absence of data in the pixel, such as the corresponding geometry or attribute image.

In auxiliary data generation 21005, auxiliary data including information about the patches is generated. That is, the auxiliary data represents metadata about a patch of a point cloud object. For example, it may represent information such as normal vectors for the patches. Specifically, the auxiliary data may include information needed to reconstruct the point cloud from the patches (e.g., information about the positions, sizes, and the like of the patches in 2D/3D space, and projection (normal) plane identification information, patch mapping information, etc.)

In mesh data generation 21006, mesh data is generated from the patches. Mesh represents connection between neighboring points. For example, it may represent data of a triangular shape. For example, the mesh data refers to connectivity between the points.

A point cloud pre-processor or controller generates metadata related to patch generation, geometry image generation, attribute image generation, occupancy map generation, auxiliary data generation, and mesh data generation.

The point cloud transmission device performs video encoding and/or image encoding in response to the result generated by the pre-processor. The point cloud transmission device may generate point cloud image data as well as point cloud video data. According to embodiments, the point cloud data may have only video data, only image data, and/or both video data and image data.

A video encoder 21007 performs geometry video compression, attribute video compression, occupancy map compression, auxiliary data compression, and/or mesh data compression. The video encoder generates video stream(s) containing encoded video data.

Specifically, in the geometry video compression, point cloud geometry video data is encoded. In the attribute video compression, attribute video data of the point cloud is encoded. In the auxiliary data compression, auxiliary data associated with the point cloud video data is encoded. In the mesh data compression, mesh data of the point cloud video data is encoded. The respective operations of the point cloud video encoder may be performed in parallel.

An image encoder 21008 performs geometry image compression, attribute image compression, occupancy map compression, auxiliary data compression, and/or mesh data compression. The image encoder generates image(s) containing encoded image data.

Specifically, in the geometry image compression, the point cloud geometry image data is encoded. In the attribute image compression, the attribute image data of the point cloud is encoded. In the auxiliary data compression, the auxiliary data associated with the point cloud image data is encoded. In the mesh data compression, the mesh data associated with the point cloud image data is encoded. The respective operations of the point cloud image encoder may be performed in parallel.

The video encoder and/or the image encoder may receive metadata from the pre-processor. The video encoder and/or the image encoder may perform each encoding process based on the metadata.

A file/segment encapsulator (file/segment encapsulation) 21009 encapsulates the video stream(s) and/or image(s) in the form of a file and/or segment. The file/segment encapsulator performs video track encapsulation, metadata track encapsulation, and/or image encapsulation.

In the video track encapsulation, one or more video streams may be encapsulated into one or more tracks.

In the metadata track encapsulation, metadata related to a video stream and/or an image may be encapsulated in one or more tracks. The metadata includes data related to the content of the point cloud data. For example, it may include initial viewing orientation metadata. According to embodiments, the metadata may be encapsulated into a metadata track, or may be encapsulated together in a video track or an image track.

In the image encapsulation, one or more images may be encapsulated into one or more tracks or items.

For example, according to embodiments, when four video streams and two images are input to the encapsulator, the four video streams and two images may be encapsulated in one file.

The point cloud video encoder and/or the point cloud image encoder according to the embodiments may generate a G-PCC/V-PCC bitstream according to the embodiments.

The file/segment encapsulator may receive metadata from the pre-processor. The file/segment encapsulator may perform encapsulation based on the metadata.

A file and/or a segment generated by the file/segment encapsulation are transmitted by the point cloud transmission device or the transmitter. For example, the segment(s) may be delivered based on a DASH-based protocol.

The encapsulation or encapsulator according to the embodiments may divide the V-PCC bitstream into one or multiple tracks and store the same in a file, and may also encapsulate signaling information for this operation. In addition, the atlas stream included on the V-PCC bitstream may be stored as a track in the file, and related signaling information may be stored. Furthermore, an SEI message present in the V-PCC bitstream may be stored in a track in the file and related signaling information may be stored.

The transmitter may transmit a point cloud bitstream or a file/segment including the bitstream to the receiver of the reception device over a digital storage medium or a network. Processing according to any transmission protocol may be performed for transmission. The data that has been processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD. The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the pre-processor, the video encoder, the image encoder, the file/segment encapsulator, and/or the point cloud encoder.

Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

For example, the pre-processor may perform the above-described operation on all the point cloud data or on the point cloud data indicated by the orientation information and/or the viewport information. The video encoder and/or the image encoder may perform the above-described operation on all the point cloud data or on the point cloud data indicated by the orientation information and/or the viewport information. The file/segment encapsulator may perform the above-described operation on all the point cloud data or on the point cloud data indicated by the orientation information and/or the viewport information. The transmitter may perform the above-described operation on all the point cloud data or on the point cloud data indicated by the orientation information and/or the viewport information.

FIG. 22 is an exemplary block diagram of a point cloud data reception device according to embodiments.

FIG. 22 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIGS. 20 and 21.

Each component of the reception device may be a module/unit/component/hardware/software/processor. A delivery client may receive point cloud data, a point cloud bitstream, or a file/segment including the bitstream transmitted by the point cloud data transmission device according to the embodiments. The receiver may receive the point cloud data over a broadcast network or through a broadband depending on the channel used for the transmission. Alternatively, the point cloud video data may be received through a digital storage medium. The receiver may include a process of decoding the received data and rendering the received data according to the user viewport. The reception processor may perform processing on the received point cloud data according to a transmission protocol. A reception processor may be included in the receiver or configured as a separate component/module. The reception processor may reversely perform the process of the transmission processor described above so as to correspond to the processing for transmission performed at the transmitting side. The reception processor may deliver the acquired point cloud data to the decapsulation processor and the acquired point cloud related metadata to the metadata parser.

The sensor/tracker (sensing/tracking) acquires orientation information and/or viewport information. The sensor/tracker may deliver the acquired orientation information and/or viewport information to the delivery client, the file/segment decapsulator, and the point cloud decoder.

The delivery client may receive all point cloud data or the point cloud data indicated by the orientation information and/or the viewport information based on the orientation information and/or the viewport information. The file/segment decapsulator may decapsulate all point cloud data or the point cloud data indicated by the orientation information and/or the viewport information based on the orientation information and/or the viewport information. The point cloud decoder (the video decoder and/or the image decoder) may decode all point cloud data or the point cloud data indicated by the orientation information and/or the viewport information based on the orientation information and/or the viewport information. The point cloud processor may process all point cloud data or the point cloud data indicated by the orientation information and/or the viewport information based on the orientation information and/or the viewport information.

A file/segment decapsulator (file/segment decapsulation) 22000 performs video track decapsulation, metadata track decapsulation, and/or image decapsulation. The decapsulation processor (file/segment decapsulation) may decapsulate the point cloud data in the form of a file received from the reception processor. The decapsulation processor (file/segment decapsulation) may decapsulate files or segments according to ISOBMFF, etc., to acquire a point cloud bitstream or point cloud-related metadata (or a separate metadata bitstream). The acquired point cloud bitstream may be delivered to the point cloud decoder, and the acquired point cloud-related metadata (or metadata bitstream) may be delivered to the metadata processor. The point cloud bitstream may include the metadata (metadata bitstream). The metadata processor may be included in the point cloud video decoder or may be configured as a separate component/module. The point cloud-related metadata acquired by the decapsulation processor may take the form of a box or track in a file format. The decapsulation processor may receive metadata necessary for decapsulation from the metadata processor, when necessary. The point cloud-related metadata may be delivered to the point cloud decoder and used in a point cloud decoding procedure, or may be delivered to the renderer and used in a point cloud rendering procedure. The file/segment decapsulator may generate metadata related to the point cloud data.

In the video track decapsulation, a video track contained in the file and/or segment is decapsulated. Video stream(s) including a geometry video, an attribute video, an occupancy map, auxiliary data, and/or mesh data are decapsulated.

In the metadata track decapsulation, a bitstream containing metadata related to the point cloud data and/or auxiliary data is decapsulated.

In the image decapsulation, image(s) including a geometry image, an attribute image, an occupancy map, auxiliary data and/or mesh data are decapsulated.

The decapsulation or decapsulator according to the embodiments may divide and parse (decapsulate) the G-PCC/V-PCC bitstream based on one or more tracks in a file, and may also decapsulate signaling information therefor. In addition, the atlas stream included in the G-PCC/V-PCC bitstream may be decapsulated based on a track in the file, and related signaling information may be parsed. Furthermore, an SEI message present in the G-PCC/V-PCC bitstream may be decapsulated based on a track in the file, and related signaling information may be also acquired.

The video decoding or video decoder 22001 performs geometry video decompression, attribute video decompression, occupancy map decompression, auxiliary data decompression, and/or mesh data decompression. The video decoder decodes the geometry video, the attribute video, the auxiliary data, and/or the mesh data in a process corresponding to the process performed by the video encoder of the point cloud transmission device according to the embodiments.

The image decoding or image decoder 22002 performs geometry image decompression, attribute image decompression, occupancy map decompression, auxiliary data decompression, and/or mesh data decompression. The image decoder decodes the geometry image, the attribute image, the auxiliary data, and/or the mesh data in a process corresponding to the process performed by the image encoder of the point cloud transmission device according to the embodiments.

The video decoding and the image decoding according to the embodiments may be processed by one video/image decoder as described above, and may be performed along separate paths as illustrated in the figure.

The video decoding and/or the image decoding may generate metadata related to the video data and/or the image data.

The point cloud video encoder and/or the point cloud image encoder according to the embodiments may decode the G-PCC/V-PCC bitstream according to the embodiments.

In point cloud processing 22003, geometry reconstruction and/or attribute reconstruction are performed.

In the geometry reconstruction, the geometry video and/or geometry image are reconstructed from the decoded video data and/or decoded image data based on the occupancy map, auxiliary data and/or mesh data.

In the attribute reconstruction, the attribute video and/or the attribute image are reconstructed from the decoded attribute video and/or the decoded attribute image based on the occupancy map, auxiliary data, and/or mesh data. According to embodiments, for example, the attribute may be a texture. According to embodiments, an attribute may represent a plurality of pieces of attribute information. When there is a plurality of attributes, the point cloud processor according to the embodiments performs a plurality of attribute reconstructions.

The point cloud processor may receive metadata from the video decoder, the image decoder, and/or the file/segment decapsulator, and process the point cloud based on the metadata.

The point cloud rendering or point cloud renderer renders the reconstructed point cloud. The point cloud renderer may receive metadata from the video decoder, the image decoder, and/or the file/segment decapsulator, and render the point cloud based on the metadata.

The display actually displays the result of rendering on the display.

As shown in FIGS. 15 to 19, after encoding/decoding, the method/device according to the embodiments the point cloud data as shown in 15 to 19, the bitstream containing the point cloud data may be encapsulated and/or decapsulated in the form of a file and/or a segment.

For example, a point cloud data device according to the embodiments may encapsulate point cloud data based on a file. The file may include a V-PCC track containing parameters for a point cloud, a geometry track containing geometry, an attribute track containing an attribute, and an occupancy track containing an occupancy map.

In addition, a point cloud data reception device according to embodiments decapsulates the point cloud data based on a file. The file may include a V-PCC track containing parameters for a point cloud, a geometry track containing geometry, an attribute track containing an attribute, and an occupancy track containing an occupancy map.

The operation described above may be performed by the file/segment encapsulator 20004, 20005 of FIG. 20, the file/segment encapsulator 21009 of FIG. 21, and the file/segment encapsulator 22000 of FIG. 22.

Figure 23:
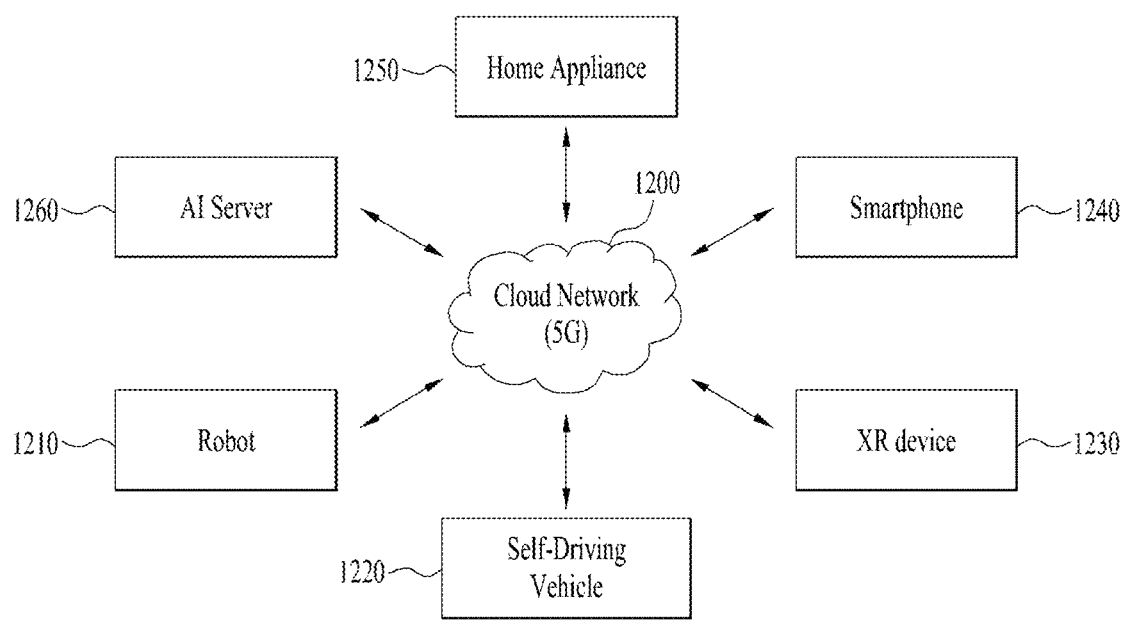
FIG. 23 illustrates an exemplary structure operable in connection with point cloud data transmission/reception methods/devices according to embodiments.

FIG. 23 illustrates an exemplary structure operable in connection with point cloud data transmission/reception methods/devices according to embodiments.

In the structure according to the embodiments, at least one of a server 2360, a robot 2310, a self-driving vehicle 2320, an XR device 2330, a smartphone 2340, a home appliance 2350 and/or a head-mount display (HMD) 2370 is connected to a cloud network 2300. Here, the robot 2310, the self-driving vehicle 2320, the XR device 2330, the smartphone 2340, or the home appliance 2350 may be referred to as a device. In addition, the XR device 1730 may correspond to a point cloud data (PCC) device according to embodiments or may be operatively connected to the PCC device.

The cloud network 2300 may represent a network that constitutes part of the cloud computing infrastructure or is present in the cloud computing infrastructure. Here, the cloud network 2300 may be configured using a 3G network, 4G or Long Term Evolution (LTE) network, or a 5G network.

The server 2360 may be connected to at least one of the robot 2310, the self-driving vehicle 2320, the XR device 2330, the smartphone 2340, the home appliance 2350, and/or the HMD 2370 over the cloud network 2300 and may assist at least a part of the processing of the connected devices 2310 to 2370.

The HMD 2370 represents one of the implementation types of the XR device and/or the PCC device according to the embodiments. An HMD type device according to embodiments includes a communication unit, a control unit, a memory, an I/O unit, a sensor unit, and a power supply unit.

Hereinafter, various embodiments of the devices 2310 to 2350 to which the above-described technology is applied will be described. The devices 2310 to 2350 illustrated in FIG. 23 may be operatively connected/coupled to a point cloud data transmission and reception device according to the above-described embodiments.

<PCC+XR>

The XR/PCC device 2330 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 2330 may analyze 3D point cloud data or image data acquired through various sensors or from an external device and generate position data and attribute data about 3D points. Thereby, the XR/PCC device 2330 may acquire information about the surrounding space or a real object, and render and output an XR object. For example, the XR/PCC device 2330 may match an XR object including auxiliary information about a recognized object with the recognized object and output the matched XR object.

<PCC+XR+Mobile Phone>

The XR/PCC device 2330 may be implemented as a mobile phone 2340 by applying PCC technology.

The mobile phone 2340 may decode and display point cloud content based on the PCC technology.

<PCC+Self-Driving+XR>

The self-driving vehicle 2320 may be implemented as a mobile robot, a vehicle, an unmanned aerial vehicle, or the like by applying the PCC technology and the XR technology.

The self-driving vehicle 2320 to which the XR/PCC technology is applied may represent an autonomous vehicle provided with means for providing an XR image, or an autonomous vehicle that is a target of control/interaction in the XR image. In particular, the self-driving vehicle 2320, which is a target of control/interaction in the XR image, may be distinguished from the XR device 2330 and may be operatively connected thereto.

The self-driving vehicle 2320 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to a vehicle that provides a self-driving service.

A vehicle that provides the self-driving service is connected to a PCC device for wired/wireless communication.

When the point cloud data transmission and reception device (PCC device) according to the embodiments is connected to a vehicle for wired/wireless communication, the device may receive and process content data related to an AR/VR/PCC service that may be provided together with the self-driving service and transmit the processed content data to the vehicle. In the case where the point cloud data transmission and reception device is mounted on a vehicle, the point cloud transmitting and reception device may receive and process content data related to the AR/VR/PCC service according to a user input signal input through a user interface device and provide the processed content data to the user. The vehicle or the user interface device according to the embodiments may receive a user input signal. The user input signal according to the embodiments may include a signal indicating the self-driving service.

Point cloud data according to embodiments may be referred to as PCC data, V-PCC data, visual volumetric video-based data, V3C data, or the like.

Figure 24:
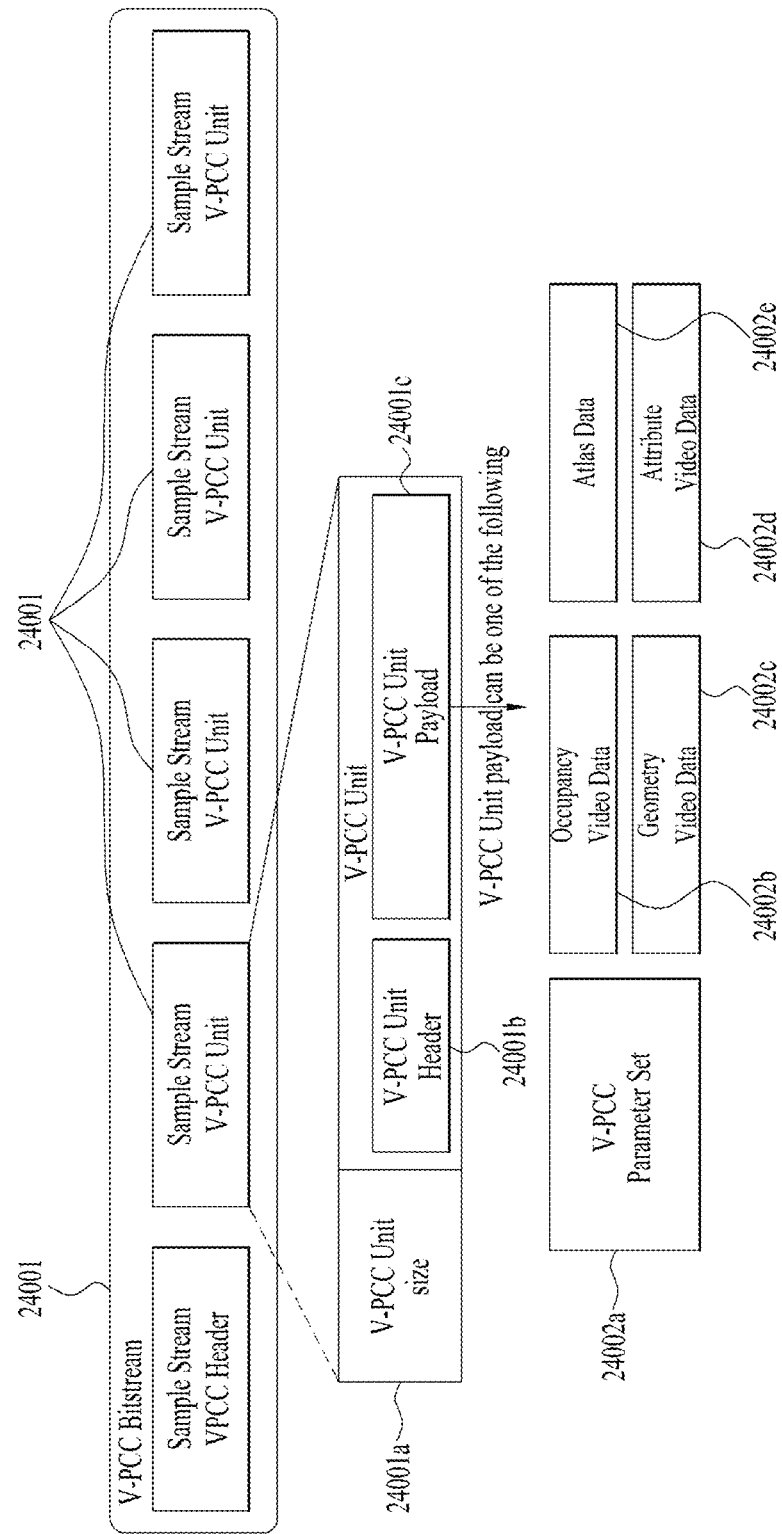
FIG. 24 illustrates a multi-track V-PCC bitstream according to embodiments.

FIG. 24 illustrates a V-PCC bitstream according to embodiments.

The V-PCC bitstream 24000 represents a form (i.e., a bitstream form) in which point cloud data according to embodiments is transmitted. The V-PCC bitstream 24000 shown in FIG. 24 may represent the compressed bitstream of FIG. 4, the bitstream of FIG. 15, the compressed bitstream received in FIG. 16, and the bitstream of FIG. 17, a bitstream generated by the multiplexer 18007 in FIG. 18, and a bitstream generated by the demultiplexer in FIG. 19.

The V-PCC bitstream shown in FIG. 24 may be generated by the XR device 1230, the self-driving vehicle 1220, the robot 1210, the AI server 1260, the home appliance 1250, and the smartphone 1240 according to the embodiments shown in FIG. 23, and may be transmitted to or transmitted/received between the devices over the cloud network (5G) 1200.

The V-PCC bitstream 24000 shown in FIG. 24 may be a bitstream to be received by the file/segment encapsulator 20004 of FIG. 20. That is, the V-PCC bitstream may be a bitstream directly transmitted by the point cloud data transmission device/method according to the embodiments, or may represent a bitstream before being encapsulated in the ISOBMFF scheme.

The V-PCC bitstream 24000 shown in FIG. 24 may be video streams and/or image streams of FIG. 21, or output from the file/segment insulation unit 21009. It may be a bitstream constituting segments (or files).

The V-PCC bitstream 24000 according to embodiments may include one or more sample stream V-PCC units 24001. The one or more sample stream V-PCC units 24001 may include a V-PCC unit and a V-PCC unit size indicating the size of the V-PCC unit.

The V-PCC bitstream 24000 includes a coded point cloud sequence (CPCS).

The V-PCC unit includes a V-PCC unit header 24001*b* and/or a V-PCC unit payload 24001*c*.

The V-PCC unit header 24001*b* includes signaling information about data contained in the V-PCC unit payload according to the embodiments. The V-PCC unit header according to the embodiments may indicate, for example, the type of data (e.g., V-PCC parameter set 24002*a*, occupancy video data 24002*b*, geometry video data 24002*c*, atlas data 24002*e*, and/or attribute video data 24002*d*, or the like) contained in the V-PCC unit according to the embodiments. In addition, the V-PCC unit header 24001*b* according to the embodiments may further include signaling information necessary for data contained in the V-PCC unit.

The V-PCC unit payload 24001*c* contains point cloud data according to embodiments or information needed to render or reconstruct the point cloud data.

The V-PCC unit payload 24001*c* may include, for example, a V-PCC parameter set 24002*a*, occupancy video data 24002*b*, geometry video data 24002*c*, atlas data 24002*e*, and/or attribute video data 24002*d*. The V-PCC unit payload 24001*c* may carry occupancy video, attribute video, or geometry video. The V-PCC unit payload 24001*c* may be composed of one or more NAL units.

The V-PCC unit payload 24002 according to the embodiments contains point cloud data according to the embodiments. The point cloud data may include one of occupancy video data, geometry video data, and/or attribute video data of the point cloud data. The point cloud data may include geometry video data encoded using the scheme of pulse coding modulation (PCM) and/or attribute video data encoded using the PCM.

The V-PCC parameter set 24002*a* according to the embodiments represents a parameter set including parameters or signaling information (e.g., metadata) for the point cloud data according to the embodiments. For example, the V-PCC parameter set may include signaling information about a sequence constituting point cloud data.

The occupancy video data 24002*b* is data including occupancy map data according to embodiments. The geometry video data 24002*c* includes geometry video data according to embodiments. The attribute video data 24002*d* includes attribute video data according to embodiments.

The atlas data 24002*e* represents data composed of an attribute (e.g., texture (patch)) and/or depth of point cloud data.

For example, the syntax of the V-PCC unit according to the embodiments may be configured as follows.

| | Descriptor |
|---|---|
| vpcc_unit( numBytesInVPCCUnit) { | |
|   vpcc_unit_header( ) | |
|   vpcc_unit_payload( ) | |
|   while( more_data_in_vpcc_unit ) | |
|     trailing_zero_8bits /* equal to 0x00 */ | f(8) |
| } | |

Figure 25:
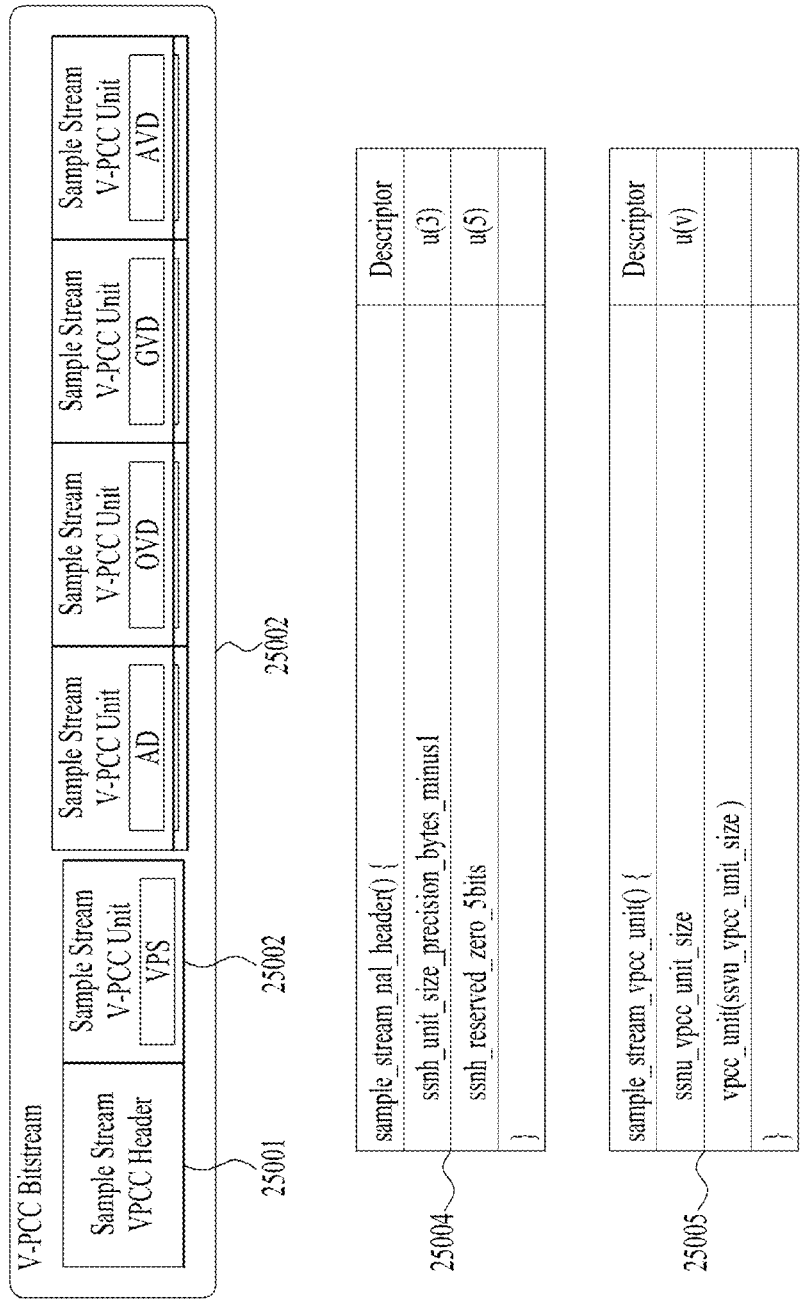
FIG. 25 illustrates an example of a V-PCC bitstream according to embodiments.

FIG. 25 illustrates an example of a V-PCC bitstream according to embodiments.

The V-PCC bitstream according to the embodiments illustrated in FIG. 25 represents the V-PCC bitstream 24000 of FIG. 24.

The V-PCC bitstream shown in FIG. 25 may be generated by the XR device 1230, the self-driving vehicle 1220, the robot 1210, the AI server 1260, the home appliance 1250, and the smartphone 1240 according to the embodiments shown in FIG. 23, and may be transmitted to or transmitted/received between the devices over the cloud network (5G) 1200.

The V-PCC bitstream 25000 according to the embodiments includes one or more sample stream V-PCC units 25002. The sample stream V-PCC units may represent the sample stream V-PCC units 24001 of FIG. 24. The sample stream V-PCC unit may be referred to as a V-PCC unit.

The V-PCC bitstream 25000 according to the embodiments may further include a sample stream V-PCC header 25001 containing information about sample stream V-PCC units.

The sample stream V-PCC unit 25002 has several types. Examples of the sample stream V-PCC unit 25002 include a V-PCC unit including a V-PCC parameter set (VPS), and a V-PCC unit including attribute data (AD), a V-PCC unit including occupancy video data (OVD), a V-PCC unit including geometry video data (GVD), and/or a V-PCC unit including attribute video data (AVD).

The V-PCC bitstream 25000 according to the embodiments includes the sample stream V-PCC unit 25002 including a VPS according to the embodiments. The V-PCC bitstream 25000 according to the embodiments may include one or more ore sample stream V-PCC units including one of AD, OVD, GVD, and/or AVD.

25004 shows an example of the syntax of the sample stream V-PCC header 25001 according to the embodiments. The sample stream V-PCC header 25004 may contain information of ssvh_unit_sizeprecision_bytes_minus1. Each sample stream V-PCC unit contains one type of V-PCC unit among VPS, AD, OVD, GVD, and AVD.

ssvh_unit_size_precision_bytes_minus1 plus 1 specifies the precision, in bytes, of the ssvu_vpcc_unit_size element in all sample stream V-PCC units. ssvh_unit_size_precision_bytes_minus1 may be in the range of 0 to 7.

25005 shows an example of the syntax of the sample stream V-PCC unit 25002 according to the embodiments. The content of each sample stream V PCC unit is associated with the same access unit as the V-PCC unit contained in the sample stream V-PCC unit. The V-PCC unit 25002 may include, for example, ssvu_vpcc_unit_size.

ssvu_vpcc_unit_size specifies the size, in bytes, of the subsequent vpcc_unit. The number of bits used to represent ssvu_vpcc_unit_size may be equal to (ssvh_unit_size_precision_bytes_minus1+1)*8.

vpcc_unit( ), that is, vpcc_unit(ssvu_vpcc_unit_size) represents a V-PCC unit having a size of ssvu_vpcc_unit_size according to embodiments. vpcc_unit(ssvu_vpcc_unit_size) according to the embodiments includes a V-PCC unit header (vpcc_unit header( )) and/or a V-PCC unit payload (vpcc_unit_payload( )). The V-PCC unit header shown in FIG. 25 may represent the V-PCC unit header 24001*b* shown in FIG. 24.

vpcc_unit( ) according to the embodiments may have, for example, the following syntax.

| | Descriptor |
|---|---|
| vpcc_unit( numBytesInVPCCUnit) { | |
|   vpcc_unit_header( ) | |
|   vpcc_unit_payload( ) | |
|   while( more_data_in_vpcc_unit ) | |
|     trailing_zero_8bits /* equal to 0x00 */ | f(8) |
| } | | vpcc_unit header( ) represents a V-PCC unit header according to embodiments. vpcc_unit_payload( ) represents a V-PCC unit payload according to embodiments.

FIG. 26 shows an example of syntax of a V-PCC unit header and/or a V-PCC unit payload according to embodiments.

The V-PCC unit header 26000 shown in FIG. 26 may represent the V-PCC unit header 24001*b* of FIG. 24. The V-PCC unit header 26000 shown in FIG. 26 may represent a V-PCC unit header included in the V-PCC unit (vpcc_unit) in the sample stream V-PCC unit of FIG. 25. The V-PCC unit may be referred to as a sample stream V-PCC unit.

The V-PCC bitstream shown in FIG. 26 may be generated by the XR device 1230, the self-driving vehicle 1220, the robot 1210, the AI server 1260, the home appliance 1250, and the smartphone 1240 according to the embodiments shown in FIG. 23, and may be transmitted to or transmitted/received between the devices over the cloud network (5G) 1200.

The vuh_unit_type indicates the V-PCC unit type. For example, the V-PCC unit type may be given as shown in the table below.

| vuh_unit_type | Identifier | V-PCC Unit Type | Description |
|---|---|---|---|
| 0 | VPCC_VPS | V-PCC parameter set | V-PCC level parameters |
| 1 | VPCC_AD | Atlas data | Atlas information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5 . . . 31 | VPCC_RSVD | Reserved | — |

Different signaling information may be contained in the V-PCC unit header according to the V-PCC unit type (vuh_unit_type) according to the embodiments.

For example, when the value of vuh_unit_type is 0, the V-PCC unit according to the embodiments is a V-PCC unit of a type including a V-PCC parameter set, and accordingly the V-PCC unit header may contain information related to the VPS.

For example, when the value of vuh_unit_type is 1 (i.e., VPCC_AD), the V-PCC unit is a V-PCC unit of a type including atlas data, and accordingly the V-PCC unit header may contain information related to the atlas data (e.g., vuh_vpcc_parameter_set_id and/or vuh_atlas_id).

For example, when the value of vuh_unit_type is 2 (i.e., VPCC_GVD), the V-PCC unit according to the embodiments is a V-PCC unit of a type including geometry video data, and accordingly the V-PCC unit header may contain information related to the geometry video data (e.g., vuh_map_index, vuh_raw_video_flag).

For example, when the value of vuh_unit_type is 3 (i.e., VPCC_AVD), the V-PCC unit according to the embodiments is a V-PCC unit of a type including attribute video data, and accordingly the PCC unit header may contain information related to the attribute video data (e.g., vuh_attribute_index, vuh_attribute_dimension_index, vuh_map_index, and/or vuh_raw_video_flag).

For example, when the value of vuh_unit_type is 4 (i.e., VPCC_OVD), the V-PCC unit is a V-PCC unit of a type including occupancy video data, and accordingly the V-PCC unit header may contain information related to the occupancy video data (e.g., vuh_vpcc_parameter_set_id and/or vuh_atlas_id).

The vuh_vpcc_parameter_set_id specifies the value of vps_vpcc_parameter_set_id for the active V-PCC VPS.

The vuh_atlas_id specifies the index of the atlas that corresponds to the current V-PCC unit.

The vuh_attribute_index indicates the index of the attribute data carried in the Attribute Video Data unit.

The vuh_attribute_dimension_index indicates the index of the attribute dimension group carried in the Attribute Video Data unit.

The vuh_map_index, when present, indicates the map index of the current geometry or attribute stream.

vuh_raw_video_flag equal to 1 indicates that the associated geometry or attribute video data unit is a RAW (or PCM) coded points video only. vuh_raw_video_flag equal to 0 indicates that the associated geometry or attribute video data unit may contain RAW (or PCM) coded points. When vuh_raw_video_flag is not present, its value may be inferred to be equal to 0.

The V-PCC unit payload 26001 shown in FIG. 26 may represent the V-PCC unit payload 24001c of FIG. 24. The V-PCC unit payload 26001 shown in FIG. 26 may represent a V-PCC unit payload (vpcc_unit_payload) included in the V-PCC unit (vpcc_unit) in the sample stream V-PCC unit of FIG. 25.

The V-PCC unit payload according to the embodiments may contain different data according to the value of vuh_unit_type described above.

For example, when the value of vuh_unit_type is 0, the type of the V-PCC unit according to the embodiments is V-PCC parameter set, and accordingly the V-PCC unit payload 26001 may contain vpcc_parameter_set( ).

For example, when the value of vuh_unit_type is 1 (i.e., VPCC_AD), the type of the V-PCC unit according to the embodiments is atlas data, and accordingly the V-PCC unit payload 26001 may contain atlas data (or an atlas sub-bitstream (atlas sub bitstream( )).

For example, when the value of vuh_unit_type is 2 (i.e., VPCC_GVD), 3 (i.e., VPCC_AVD) or 4 (i.e., VPCC_OVD), the type of the V-PCC unit according to the embodiments is geometry video data, and accordingly the V-PCC unit payload 26001 may contain a video sub-bitstream containing attribute video data and/or occupancy time video data.

Figure 27:
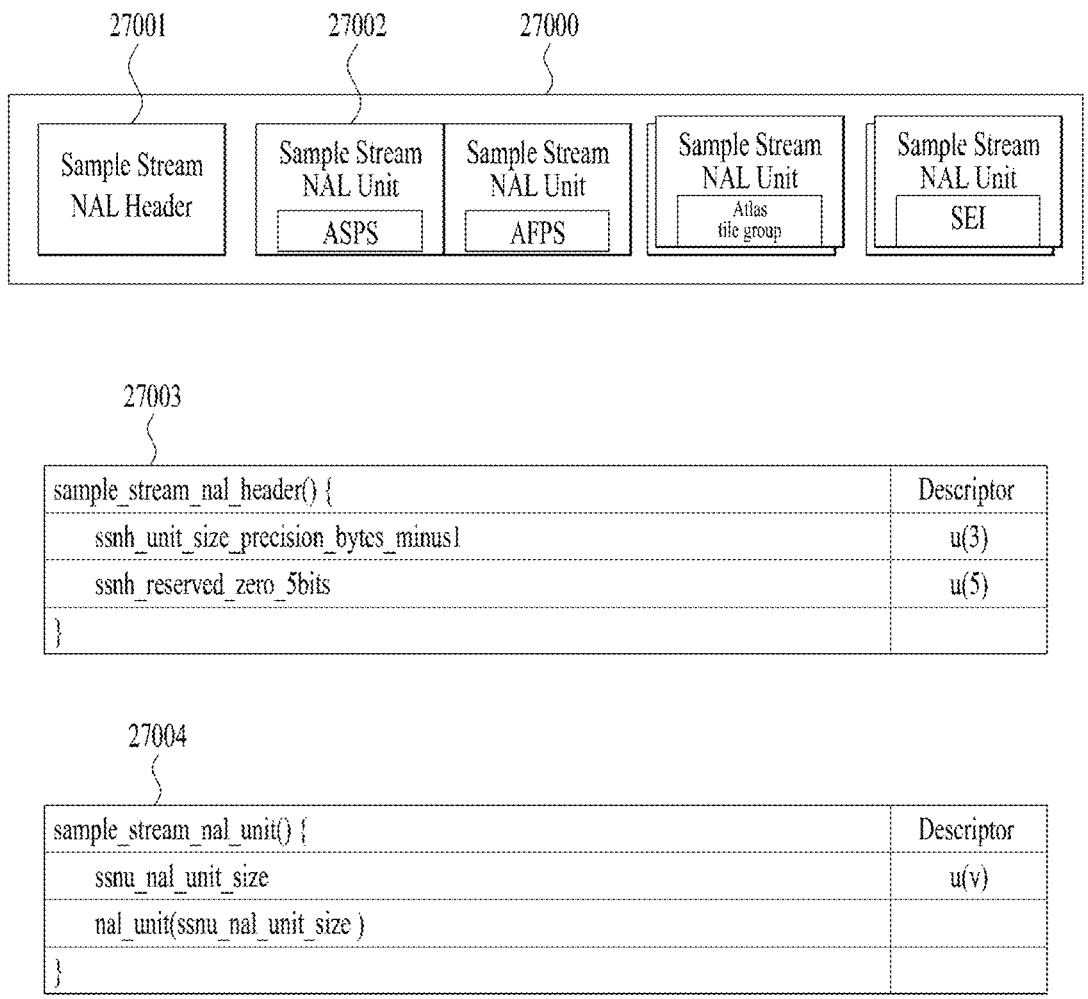
FIG. 27 illustrates an example of an atlas substream according to embodiments.

FIG. 27 illustrates an example of an atlas substream according to embodiments.

The V-PCC unit payload 27000 of the V-PCC unit according to the embodiments may contain an atlas sub-bitstream (or atlas substream) shown in FIG. 27, and the atlas sub-bitstream may contain one or more sample stream NAL units. (A V-PCC unit payload of V-PCC unit carrying atlas substream may be composed of one or more sample stream NAL units)

The atlas sub-bitstream according to the embodiments shown in FIG. 27 may be composed of one or more network abstraction layer (NAL) units or sample stream NAL units for point cloud data according to the embodiments.

The atlas sub-bitstream according to the embodiments includes a V-PCC sample stream NAL header 27001. A V-PCC unit 27000 according to the embodiments includes one or more sample stream NAL units 27002.

There are various types of NAL units (or sample stream NAL units) 27002 according to embodiments. Examples of the NAL unit include a sample stream NAL unit including an atlas sequence parameter set (ASPS), a sample stream NAL unit including an atlas frame parameter set (AFPS), and an a sample stream NAL unit including an atlas tile group (ATP), and/or a NAL unit including SEI (or SEI message).

The sample stream NAL header 27001 contains signaling information about the one or more sample stream NAL units 27002. For example, the sample stream NAL header 27001 may contain ssvh_unit_size_precision_bytes_minus1.

27003 shows an example of the syntax of the sample stream NAL header according to embodiments.

ssvh_unit_size_precision_bytes_minus1 plus 1 may specify, for example, the precision, in bytes, of the ssnu_nal_unit_size element in all sample stream NAL units. ssnh_unit_size_precision_bytes_minus1 may be in the range of 0 to 7.

27004 shows an example of the syntax of the sample stream NAL unit according to embodiments.

ssvu_nal_unit_size specifies the size, in bytes, of the subsequent NAL_unit. The number of bits used to represent ssnu_nal_unit_size may be equal to (ssnh_unit_size_precision_bytes_minus1+1)*8.

NAL_unit( ), that is, nal_unit(ssvu_vpcc_unit_size) indicates a NAL_unit having a size of ssvu_nal_unit_size according to the embodiments.

Each sample stream NAL unit contains atlas sequence parameter set (ASPS), atlas frame parameter set (AFPS), atlas tile group information, or SEI (supplemental enhancement information).

The SEI message contains information necessary for an operation related to decoding, reconstruction, display, or other purposes. The SEI message according to the embodiments contains an SEI payload (sei_payload).

The SEI payload according to embodiments may have the following syntax.

```
sei_payload( payloadType, payloadSize ) {
    if( psd_unit_type = = PSD_PREFIX_SEI ) {
        if( payloadType = = 0 )
            buffering_period( payloadSize )
        else if( payloadType = = 1 )
            pic_timing( payloadSize )
        else if( payloadType = = 2 )
            filler_payload( payloadSize )
        else if( payloadType = = 10 )
            sei_prefix_indication( payloadSize )
        else if( payloadType = = 13 )
            3d_region_mapping( payloadSize )
        else
            reserved_sei_message( payloadSize )
    }
    else { /* psd_unit_type = = PSD_SUFFIX_SEI */
        if( payloadType = = 2 )
            filler_payload( payloadSize )
        else if( payloadType = = 3 )
            user_data_registered_itu_t-t35( payloadSize )
        else if( payloadType = = 4 )
            user_data_unregistered( payloadSize )
        else if( payloadType = = 11 )
            decoded_pcc_hash( payloadSize )
        else
            reserved_sei_message( payloadSize )
    }
    if( more_data_in_payload( ) ) {
        if( payload_extension_present( ) )
            sp_reserved_payload_extension_data
        byte_alignment( )
    }
}
```

Figure 28:
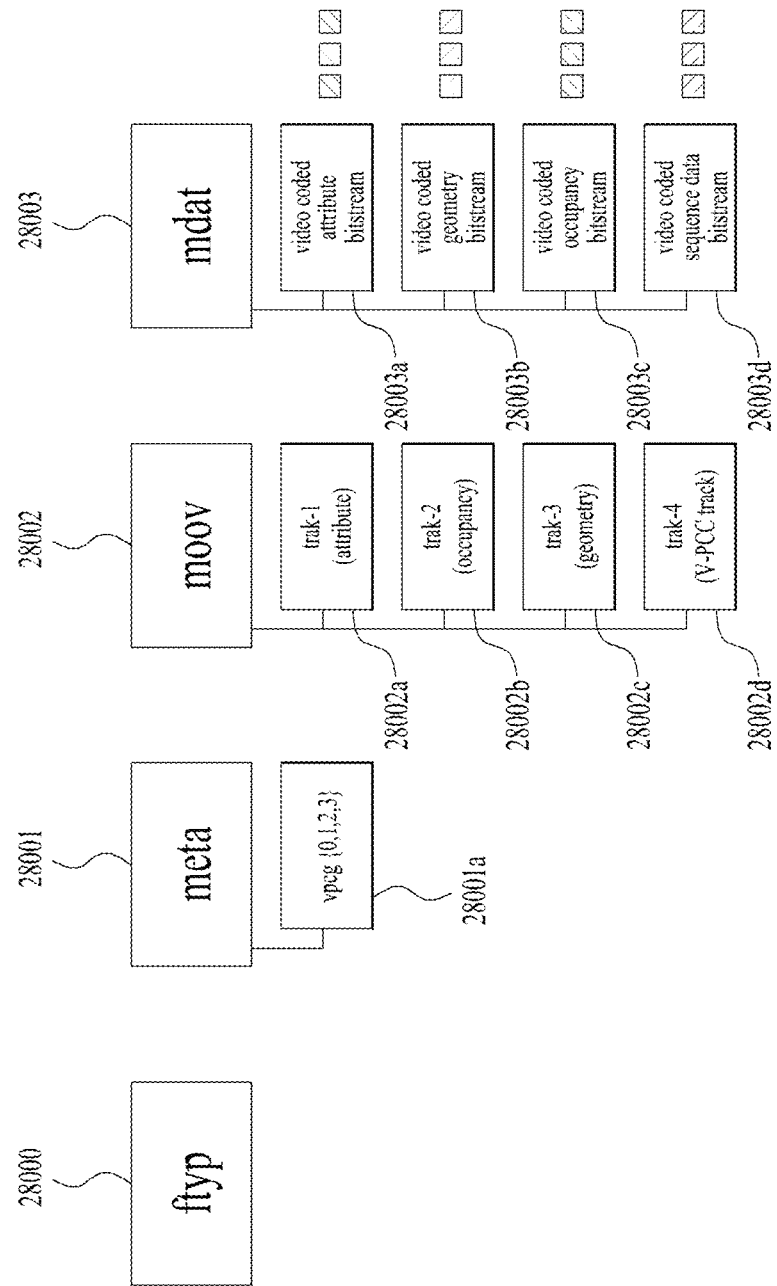
FIG. 28 illustrates point cloud data in a format of an ISOBMFF file according to embodiments.

FIG. 28 illustrates point cloud data in a format of an ISOBMFF file according to embodiments.

Point cloud data according to embodiments may be in a format of an ISOBMFF file. The ISOBMFF file may be composed of objects called boxes. That is, all data may be included in one or more boxes.

The file format of FIG. 28 may be generated or encapsulated by the file/segment encapsulator 20004, 21009 or the like according to the embodiments of FIGS. 20 and 21, and may be received and decapsulated by the file/segment decapsulator 20005, 22000 or the like of FIG. 22.

A box may include a box header, which may include a size and a type of the box. The point cloud data according to the embodiments may include an ftyp box 28000 whose box type is 'ftyp', a meta box 28001 whose box type is 'meta', a moov box 28002 whose box type is 'moov', and an mdat box 28003 whose box type is 'mdat'.

The ftyp box 28000 may contain information indicating the type of the ISOBMFF file according to embodiments.

The meta box 28001 may contain metadata information about the point cloud data according to embodiments.

The moov box 28002 may contain information about one or more tracks in which the point cloud data according to the embodiments is transmitted.

The moov box 28002 according to the embodiments may include a box 28002a containing information about a track for transmitting attribute information of the point cloud data, a box 28002b containing information about a track for transmitting occupancy information of the point cloud data, a box 28002c containing information about a track for transmitting geometry information of the point cloud data, and/or a box 28002d containing information about a track for transmitting V-PCC information of the point cloud data.

The mdat box 28003 may include a point cloud bitstream containing the point cloud data according to embodiments. The point cloud bitstream according to the embodiments may include a video coded attribute bitstream 28003a, a video coded occupancy bitstream 28003b, a video coded geometry bitstream 28003c, and/or a patch sequence data bitstream 28003d.

The patch sequence data bitstream 28003d may be referred to as an atlas bitstream, a patch data bitstream, or the like.

The video coded attribute bitstream 28003a, the video coded occupancy bitstream 28003b, the video coded geometry bitstream 28003c, and/or the patch sequence data bitstream 28003d according to the embodiments may be carried by one or more video frames.

The video coded attribute bitstream 28003a refers to attribute information of the point cloud data, encoded by the V-PCC encoder according to the embodiments.

The video coded occupancy bitstream 28003b refers to occupancy information of the point cloud data, encoded by the V-PCC encoder according to the embodiments.

The video coded geometry bitstream 28003c refers to geometry information of the point cloud data, encoded by the V-PCC encoder according to the embodiments.

The patch sequence data bitstream 28003d refers to patch sequence data of the point cloud data according to the embodiments.

The 2D video tracks are encoded according to a video encoder according to embodiments.

In the sample entry, an extra box may be inserted which may document the role of the video stream contained in this track, in the V-PCC system.

A track reference may be inserted from the V-PCC patch data track to the video track, to establish the membership of the video track in the specific point cloud based on the patch track.

The track-header flags may be set to 0 to indicate that the track does not contribute directly to the overall layup of the movie, but contributes to the V-PCC system.

Tracks belonging to the same V-PCC sequence are time-aligned. Samples that contribute to the same point cloud frame across the different video-encoded component tracks and the V-PCC track may have the same presentation time.

A V-PCC track may contain sequence parameter sets and samples carrying the payloads of non-video encoded information V-PCC units. Here, the non-video encoded information V-PCC units may mean units whose V-PCC unit types are, for example, VPCC_SPS and VPCC_PDG.

The V-PCC track may be referred to as a visual volumetric track, a V3C track, or the like.

This track may also provide track references to other tracks containing samples carrying the payloads of a video compressed V-PCC unit. Here, the other tracks may represent units whose V-PCC unit types are, for example, VPCC_GVD, VPCC_AVD, and VPCC_OVD.

The samples containing video-coded elementary streams for geometry data, which are payloads of V-PCC units of type VPCC_GVD, may be included in one or more video streams.

The samples containing video-coded elementary streams for attribute data, which are payloads of V-PCC units of type VPCC_AVD, may be included in one or more video streams.

The samples containing a video-coded elementary stream for occupancy map data, which are payloads of V-PCC units of type VPCC_OVD, may be included in one or more video streams.

Synchronization between the elementary streams in the component tracks may be handled by the ISO BMFF track timing structures (ctts and cslg, or equivalent mechanisms in movie fragments).

Samples that contribute to the same point cloud frame across different video encoded component tracks and the V-PCC track may have the same composition time. The V-PCC parameter sets used for such samples have a decoding time equal or prior to the composition time of the frame.

Point cloud data and/or a bitstream for delivering point cloud data according to embodiments, and the V-PCC units according to the embodiments may be encapsulated based on the file format shown in FIG. 28. For example, the encapsulator of the transmission device according to the embodiments may encapsulate the V-PCC bitstream (or V-PCC units) 25000, the V-PCC bitstream 26000 and 26001, and/or the atlas substream 27000 according to the embodiments described with reference to FIGS. 24 to 27 in the file format shown in FIG. 28.

Point cloud data and metadata encoded by the file/segment encapsulator 20004 of FIG. 20 and the file/segment encapsulator 21009 of FIG. 21 are encapsulated in the file format shown in FIG. 28. The encapsulated point cloud data and metadata are decapsulated in the file format shown in FIG. 28 by the file/segment decapsulator 20005 of FIG. 20 and the file/segment decapsulator 22000 of FIG. 22 to output the encoded point cloud data and metadata.

For example, FIG. 28 shows the structure of an encapsulated file in the case where the file/segment encapsulators 20004 and 21009 and/or the file/segment decapsulator 22000 according to the embodiments of FIGS. 20 to 22 deliver video data (e.g., multi-track).

A bitstream including the point cloud data of FIGS. 24 to 27 may be generated and encoded by the point cloud video encoder 10002 of FIG. 1, the elements shown in FIG. 4, the encoding device 100 shown in FIG. 15, the video encoder 18006 shown in FIG. 18, and the like. The point cloud bitstream according to the embodiments may be encapsulated by the file/segment encapsulator 10003 of FIG. 1, the file/segment encapsulator 20004 of FIG. 20, and the file/segment encapsulation 21009 of FIG. 21, and the like based on a single track and/or multiple tracks in a file as shown in FIG. 28.

The point cloud bitstream in the single track and/or multiple tracks in the file is decapsulated by the file/segment decapsulator 10007 of the reception device 10005 of FIG. 1 and the file/segment decapsulators 20005 and 22000 of FIGS. 20 and 22. A bitstream containing the point cloud data of FIGS. 24 to 27 may be received and decoded by the point cloud video decoder 10008 of the reception device 10005 of FIG. 1, the elements shown in FIG. 16, the decoding device 200 shown in FIG. 17, the video decoding unit 19001 shown in FIG. 19, and the like.

The V-PCC track 28002d according to the embodiments may be referred to as a volumetric visual track, a visual volumetric track, a volumetric data track, a V3C track, or the like.

Each volumetric visual scene, that is, point cloud data according to embodiments, may be represented by a unique volumetric visual track. An ISOBMFF file may contain multiple scenes and therefore multiple volumetric visual tracks (multi-track) may be present in the file. A volumetric visual track may be identified by the volumetric visual media handler type 'vole' in the HandlerBox of the MediaBox, and a volumetric visual media header.

An embodiment of the volumetric visual media header will be described.

Box type: 'vvhd'
Container: MediaInformationBox
Mandatory: Yes
Quantity: Only one The volumetric visual tracks must use VolumetricVisualMediaHeaderBox in MediaInformationBox. VolumetricVisualMediaHeaderBox have syntax as follows.

```
aligned(8) class VolumetricVisualMediaHeaderBox
    extends FullBox('vvhd', version=0, 1) {
}
```

An embodiment of a volumetric visual sample entry will be described.

The volumetric visual tracks must use VolumetricVisualSampleEntry.

```
class VolumetricVisualSampleEntry(codingname)
    extends SampleEntry (codingname){
    unsigned int(8)[32] compressor_name;
}
```

An embodiment of volumetric visual samples will be described.

The format of volumetric visual samples is defined by the coding system.

An embodiment of a V-PCC unit header box will be described.

This box is present in the V-PCC track (in the sample entry) and all video-coded V-PCC component tracks. This box contains a V-PCC unit header according to embodiments for the data carried by each track.

```
aligned(8) class VPCCUnitHeaderBox
    extends FullBox('vunt', version=0, 0) {
    vpcc_unit_header( ) unit_header;
}
```

This box may contain the V-PCC unit header described with reference to FIGS. 25 to 27.

An embodiment of a V-PCC decoder configuration record will be described.

The V-PCC decoder configuration record includes a version field.

The VPCCParameterSet array includes vpcc_parameter_set( ) described with reference to FIGS. 25 to 27.

atlas_setupUnit arrays includes atlas parameter sets according to embodiments that are constant for the stream referred to by the sample entry in which the decoder configuration record is present as well as atlas stream SEI messages.

An example of the syntax of the V-PCC decoder configuration record is shown below.

```
aligned(8) class VPCCDecodenConfigunationRecord {
    unsigned int(8) configurationVension=1;
    unsigned int(3) sampleStreamSizeMinusOne;
```

```
unsigned int(5) numOfVPCCParameterSets;
for (1=0; i<numOfVPCCPanameterSets; i++) {
    sample_stream_vpcc_unit VPCCParameterSet;
}
unsigned int(8) numOfAtlasSetupUnits;
for (i=0; i<numOfAtiasSetupUnits; i++) {
    sample_stream_vpcc_unit atlas_setupUnit;
}
}
``` configurationVersion is a version field.

sampleStreamSizeMinusOne plus 1 indicates the precision, in bytes, of the ssvu_vpcc_unit_size element in all sample stream V-PCC units according to embodiments in either this configuration record or a V-PCC sample in the stream to which this configuration record applies.

numOfVPCCParameterSets specifies the number of V-PCC parameter sets (VPS) signaled in the decoder configuration record.

VPCCParameterSet is a sample stream vpcc_unit( ) instance for a V-PCC unit of type VPCC_VPS. This V-PCC unit may include the vpcc_parameter_set( ) described with reference to FIGS. 25 to 27.

numOfAtlasSetupUnits indicates the number of setup arrays for an atlas stream signaled in this configuration record.

Atlas_setupUnit represents a sample stream vpcc_unit( ) instance including an atlas sequence parameter set (ASPS), an atlas frame parameter set (AFPS), or an SEI atlas NAL unit according to embodiments.

VPCCDecoderConfigurationRecord according to the embodiments may have the following syntax.

```
aligned(8) class VPCCDecoderConfigurationRecord {
    unsigned int(8) configurationVersion=1;
    unsigned int(3) sampleStreamSizeMinusOne;
    bit(2) reserved=1;
    unsigned int(3) lengthSizeMinusOne;
    unsigned int(5) numOVPCCParameterSets;
    for (1=0; i<numOVPCCParameterSets; i++) {
        sample_stream_Vpcc_unit VPCCParameterSet;
    }
    unsigned int(8) numOfSetupUnitArrays;
    for (j=0; j<numOfSetupUnitArrays; j++) {
        bit(1) annay_completeness;
        bit(1) reserved=0;
        unsigned int(6) NAL_unit_type;
        unsigned int(8) numNALUnits;
        for (i=0; i<numNALUnit; i++) {sample_stream_nal_unit setupUnit;
        }
    }
}
``` configurationVersion is a version field.

lengthSizeMinusOne plus 1 indicates the precision, in bytes, of the ssnu_nal_unit_size element in all sample stream NAL units in either this configuration record or a V-PCC sample in the stream to which this configuration record applies.

sampleStreamSizeMinusOne plus 1 indicates the precision, in bytes, of the ssvu_vpcc_unit_size element in all sample stream V-PCC units signaled in this configuration record.

numOfVPCCParameterSets specifies the number of V-PCC parameter sets (VPS) signalled in this configuration record.

VPCCParameterSet is a sample stream vpcc_unit( ) instance for a V-PCC unit of type VPCC_VPS.

numOfSetupUnitArrays indicates the number of arrays of atlas NAL units of the indicated type(s).

NAL_unit_type indicates the type of the atlas NAL units in the following array. The value of the NAL_unit_type information may be for example, one of NAL_ASPS, NAL_PREFIX_SEI or NAL_SUFFIX_SEI atlas NAL unit.

numNALUnits indicates the number of atlas NAL units according to the embodiments of the indicated type included in the configuration record for the stream to which this configuration record applies. The SEI array shall only contain SEI messages of a 'declarative' nature, that is, those that provide information about the stream as a whole. An example of such SEI may be user-data SEI.

setupUnit is a sample_stream_nal_unit( ) instance containing an atlas sequence parameter set, or an atlas frame parameter set, or a declarative SEI atlas NAL unit.

An embodiment of a multi-track container of a V-PCC bitstream is described below.

The general layout of a multi-track ISOBMFF V-PCC container is specified, where V-PCC units in a V-PCC elementary stream are mapped to individual tracks within the container file based on their types. There are two types of tracks in a multi-track ISOBMFF V-PCC container: V-PCC track and V-PCC component track.

The V-PCC track is a track carrying the volumetric visual information in the V-PCC bitstream. The V-PCC track includes the atlas sub-bitstream and the sequence parameter sets.

V-PCC component tracks are restricted video scheme tracks which carry 2D video encoded data for the occupancy map, geometry, and attribute sub-bitstreams of the V-PCC bitstream. In addition, the following conditions are satisfied for V-PCC component tracks:

a) in the sample entry, a new box is inserted which documents the role of the video stream contained in this track, in the V-PCC system;

b) a track reference may be introduced from the V-PCC track to the V-PCC component track to establish the membership of the V-PCC component track in the specific point-cloud represented by the V-PCC track; and c) the track-header flags are set to 0, to indicate that this track does not contribute directly to the overall layup of the movie but contributes to the V-PCC system.

Tracks belonging to the same V-PCC sequence are time-aligned. Samples that contribute to the same point cloud frame across the different video-encoded V-PCC component tracks and the V-PCC track have the same presentation time. The V-PCC atlas sequence parameter sets and atlas frame parameter sets used for such samples may have a decoding time equal or prior to the composition time of the point cloud frame. In addition, all tracks belonging to the same V-PCC sequence may have the same implied or explicit edit lists.

Based on this layout, a V-PCC ISOBMFF container shall include the following:

1) A V-PCC track which contains V-PCC parameter sets (in the sample entry) and samples carrying the payloads of the V-PCC parameter set V-PCC unit (of unit type VPCC_VPS) and atlas V-PCC units (of unit type VPCC_AD). This track also includes track references to other tracks carrying the payloads of video compressed V-PCC units (i.e., unit types VPCC_OVD, VPCC_GVD, and VPCC_AVD);

2) A restricted video scheme track where the samples contain access units of a video-coded elementary stream for occupancy map data (i.e., payloads of V-PCC units of type VPCC_OVD);

3) One or more restricted video scheme tracks where the samples contain access units of video-coded elementary streams for geometry data.

4) Zero or more restricted video scheme tracks where the samples contain access units of video-coded elementary streams for attribute data (i.e., payloads of V-PCC units of type VPCC_AVD).

The V-PCC track sample entry will be described.

Sample entry type: 'vpcl', 'vpcg'

Container: SampleDescriptionBox

Mandatory: A 'vpcl' or 'vpcg' sample entry is mandatory.

Quantity: One or more sample entries may be present.

V-PCC tracks may use VPCCSampleEntry which extends VolumetricVisualSampleEntry with a sample entry type of 'vpcl' or 'vpcg'.

A VPCC sample entry may contain a VPCCConfigurationBox, as described below. This may include a VPCCDecoderConfigurationRecord.

Under the 'vpcl' sample entry, all atlas sequence parameter sets (ASPSs), atlas frame parameter sets (AFPSs), and/or V-PCC SEIs may be in the setupUnit array. Under the 'vpcg' sample entry, the ASPSs, AFPSs, and/or V-PCC SEIs may be present in this array, or in the stream.

An optional BitRateBox may be present in the VPCC volumetric sample entry to signal the bit rate information of the V-PCC track.

```
// Volumetric Sequences
class VPCCConfigurationBox extends Box('vpcC') {
    VPCCDecoderConfigurationRecord( ) VPCCConfig;
}
aligned(8) class VPCCSampleEntry( ) extends VolumetricVisualSampleEntry ('vpcl') {
    VPCCConfigurationBox config;
    VPCCUnitHeaderBox unit_header;
    VPCCBoundingInformationBox ( );
}
```

The V-PCC track sample format will be described.

Each sample in the V-PCC track corresponds to a single point cloud frame. Samples corresponding to this frame in the various component tracks have the same composition time as the V-PCC track sample. Each V-PCC sample may include one or more atlas NAL units.

V-PCC samples according to the embodiments may have the following syntax.

VPCCDecoderConfigurationRecord indicates the decoder configuration record according to embodiments in the matching V-PCC sample entry.

nalUnit contains a single atlas NAL unit in the sample stream NAL unit format according to the embodiments.

NALUnitLength indicates the size of a subsequent NAL unit in bytes.

NALUnit contains a single atlas NAL unit.

A V-PCC track sync sample will be described.

A sync sample (random access point) in a V-PCC track is a V-PCC IRAP coded patch data access unit. Atlas parameter sets may be repeated, if needed, at a sync sample to allow for random access.

Video-encoded V-PCC component tracks according to embodiments will be described.

Carriage of coded video tracks specific to MPEG is disclosed in the ISOBMFF standard document. For example, carriage of AVC and HEVC coded videos may comply with the ISO/IEC 14496-15 standard document.

Since it is not meaningful to display the decoded frames from attribute, geometry, or occupancy map tracks without reconstructing the point cloud at the player side, a restricted video scheme type may be defined for these video-coded tracks.

Restricted Video Scheme

V-PCC component video tracks may be represented in the file as restricted video, and identified by 'pccv' in the scheme_type field of the SchemeTypeBox of the RestrictedSchemeInfoBox of their restricted video sample entries.

It should be noted that there is no restriction on the video codec used for encoding the attribute, geometry, and occupancy map V-PCC components. Moreover, these components may be encoded using different video codecs.

Scheme Information

The SchemeInformationBox may be present and contain a VPCCUnitHeaderBox.

Referencing V-PCC component tracks

To link a V-PCC track to component video tracks, three TrackReferenceTypeBoxes may be added to a TrackReferenceBox within the TrackBox of the V-PCC track, one for each component. The TrackReferenceTypeBox may contain an array of track IDs designating the video tracks which the V-PCC track references. The reference type of a TrackRef-

```
aligned(8) class VPCCSample {
    unsigned int PointCloudPictureLength = sample_size; // size of sample
    (e.g., from SampleSizeBox)
    for (i=0; i<PointCloudPictureLength; ) {
        sample_stream_nal_unit_nalUnit
            i += (VPCCDecoderConfigurationRecord.lengthSizeMinusOne+1) +
        nalUnit.ssnu_nal_unit_size;
        }
    }
}
aligned(8) class VPCCSample
{
    unsigned int PictureLength = sample_size; //Size of Sample from SampleSizeBox
    for (i=0; i<PictureLength; )        // to end of the picture
    {
        unsigned int((VPCCDecoderConfigurationRecord.LengthSizeMinusOne+1)*8)
            NALUnitLength;
        bit(NALUnitLength * 8) NALUnit;
        i += (VPCCDecoderConfigurationRecord.LengthSizeMinusOne+1) +
    NALUnitLength;
    }
}
``` erenceTypeBox identifies the type of the component (i.e., occupancy map, geometry, or attribute). The 4CCs of these track reference types are:

1) 'pcco': the referenced track(s) contain the video-coded occupancy map V-PCC component 2) 'pccg': the referenced track(s) contain the video-coded geometry V-PCC component 3) 'pcca': the referenced track(s) contain the video-coded attribute V-PCC component The type of the V-PCC component carried by the referenced restricted video track and signaled in the RestrictedSchemeInfoBox of the track shall match the reference type of the track reference from the V-PCC track.

Single track container of V-PCC bitstream

Single-track encapsulation of V-PCC data (i.e., encapsulating point cloud data according to embodiments into one track) requires the V-PCC encoded elementary bitstream to be represented by a single-track declaration.

Single-track encapsulation of PCC data may be utilized in the case of simple ISOBMFF encapsulation of a V-PCC encoded bitstream. Such a bitstream may be directly stored as a single track without further processing. V-PCC unit header data structures may be kept in the bitstream. A single track container for V-PCC data may be provided to media workflows for further processing (e.g., multi-track file generation, transcoding, DASH segmentation, etc.).

An ISOBMFF file which contains single-track encapsulated V-PCC data according to embodiments may contain 'pest' in the compatible brands[ ] list of its FileTypeBox.

V-PCC elementary stream track

Sample entry type: 'vpe1', 'vpeg'

Container: SampleDescriptionBox

Mandatory: A 'vpe1' or 'vpeg' sample entry is mandatory

Quantity: There may be one or more sample entries.

V-PCC elementary stream tracks may use VolumetricVisualSampleEntry with a sample entry type of 'vpe1' or 'vpeg'.

A VPCC elementary stream sample entry may contain a VPCCConfigurationBox, as defined below.

Under the 'vpe1' sample entry, all atlas sequence parameter sets (ASPSs), atlas frame parameter sets (AFPSs), and SEIs may be in the setupUnit array. Under the 'vpeg' sample entry, ASPSs, AFPSs, and SEIs may be present in this array or in the stream.

// Volumetric Sequences class VPCCConfigurationBox extends Box('vpcC') {
VPCCDecoderConfigurationRecord( ) VPCCConfig;
} aligned(8) class VPCCElementaryStreamSampleEntry( ) extends VolumetricVisualSampleEntry ('vpe1') {
VPCCConfigurationBox config;
VPCCBoundingInformationBox 3d_bb;
}

V-PCC elementary stream sample format

A V-PCC elementary stream sample according to the embodiments may include one or more V-PCC units according to one or more embodiments which belong to the same presentation time. Each sample has a unique presentation time, size, and duration. A sample may be self-contained (e.g., a sync sample) or decoding-wise dependent on other V-PCC elementary stream samples.

A V-PCC elementary stream sync sample will be described.

A V-PCC elementary stream sync sample shall satisfy all the following conditions:

1) It is independently decodable;

2) None of the samples that come after the sync sample (in decoding order) have any decoding dependency on any sample prior to the sync sample; and 3) All samples that come after the sync sample (in decoding order) are successfully decodable.

A V-PCC elementary stream sub-sample according to embodiments will be described.

A V-PCC elementary stream sub-sample according to the embodiments is a V-PCC unit which is contained in a V-PCC elementary stream sample.

A V-PCC elementary stream track may contain one SubSampleInformationBox in its SampleTableBox, or in the TrackFragmentBox of each of its MovieFragmentBoxes, which lists the V-PCC elementary stream sub-samples.

The 32-bit unit header of the V-PCC unit which represents the sub-sample shall be copied to the 32-bit codec specific parameters field of the sub-sample entry in the Sub SampleInformationBox. The V-PCC unit type of each sub-sample is identified by parsing the codec specific parameters field of the sub-sample entry in the SubSampleInformationBox.

Figure 29:
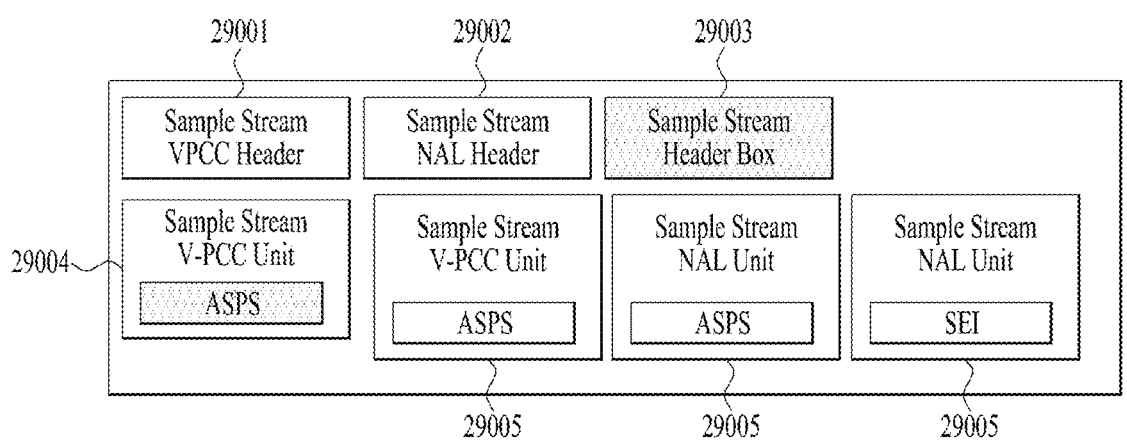
FIG. 29 shows a V-PCC sample entry according to embodiments.

FIG. 29 shows a V-PCC sample entry according to embodiments.

The sample entry according to the embodiments shown in FIG. 29 is included in the ISOBMFF file shown in FIG. 28. The V-PCC sample entry according to the embodiments may include a V-PCC unit (or NAL unit) including a V-PCC parameter set 29004, a NAL unit including an ASPS, an NAL unit including an AFPS, and/or SEI (an SEI message) according to the embodiments.

As shown in FIG. 29, the sample entry according to the embodiments may contain one or both of the sample stream V-PCC unit described with reference to FIGS. 24 to 26 and/or the sample stream NAL unit described with reference to FIG. 27.

A sample stream VPCC header 29001 represents the sample stream VPCC header of FIG. 24 or the sample stream VPCC headers 25001 and 25004 of FIG. 25.

A sample stream NAL header 29002 represents the sample stream NAL header 27001 according to the embodiments of FIG. 27.

VPCCUnitHeaderBox may represent, for example, the V-PCC unit header 24001b and/or the V-PCC unit size 24001a shown in FIG. 24, the V-PCC unit header 26000 of FIG. 26, the NAL unit header included in the sample stream NAL units 27002 and 27004 of FIG. 27.

A sample stream V-PCC unit 29004 may represent, for example, the V-PCC units 24001b and 24001c shown in FIG. 24 or the V-PCC unit payload 24001c.

Sample stream NAL units 29005 may represent, for example, the sample stream NAL units 27002 shown in FIG. 27.

Figure 30:
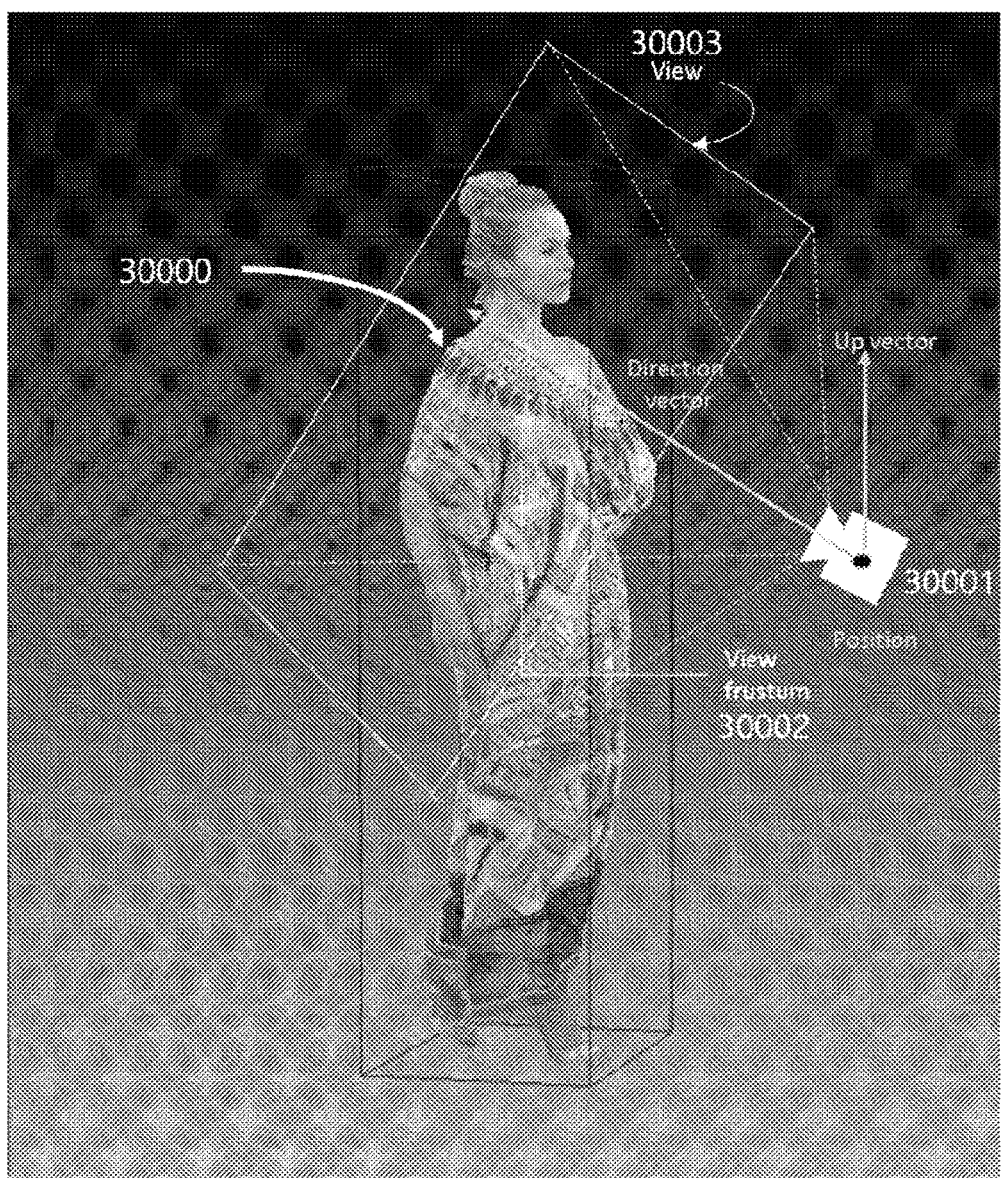
FIG. 30 illustrates the roles of parameters for reconstructing or rendering point cloud data according to embodiments.

FIG. 30 illustrates the roles of parameters for reconstructing or rendering point cloud data according to the embodiments.

FIG. 30 illustrates point cloud data 30000 according to embodiments, a real camera or virtual camera 30001 oriented toward the point cloud data, a region 30002 (view frustum) in a three-dimensional (3D) space toward which the real camera and/or virtual camera 30001 according to the embodiments is oriented, a region 30003 (view) obtained by projecting the region in the 3D space toward which the real camera and/or virtual camera 30001 is oriented onto a 2D plane.

The point cloud data transmission device according to the embodiments may provide 3D region information about V-PCC content for supporting spatial access of the V-PCC content according to a user viewport and metadata related to a 2D region in a video or atlas frame associated therewith.

The virtual camera 30001 may be a concept representing the user's gaze (or eye), that is, the user's view of a partial 3D region.

The view frustum 30002 represents a region in a 3D space including all or part of point cloud data that is actually rendered and displayed to a user by the point cloud data reception device according to embodiments.

The view frustum need not be configured in a three-dimensional shape as shown in FIG. 30. The view frustum may be configured in a cone shape (or a truncated cone shape) such as, for example, a visibility cone.

The view 30003 may represent a 2D image/video frame that is actually displayed.

The V-PCC bitstream according to the embodiments may contain information (e.g., ViewInfoStruct, etc.) for generating a view provided to a user by rendering point cloud data according to the embodiments.

For example, the V-PCC bitstream according to the embodiments may contain position information indicating the position in a 3D space of a real or virtual camera for generating a view according to the embodiments, a horizontal field of view (FOV) and a vertical FOV of the real or virtual camera in the 3D space, information (direction vector) indicating the direction in which the real or virtual camera views, and up vector information indicating the upward direction of the real or virtual camera.

The point cloud data reception device according to the embodiments may determine the position of the user's eyes based on the position information, and reconstruct or create the view 30003 or the view frustum 30002 that is to be seen to the user, based on the determined position.

The point cloud data reception device according to embodiments may determine the direction of the user's gaze based on the direction vector, reconstruct or create the view 30003 or the view frustum 30002 that is to be seen to the user, based on the determined direction.

The point cloud data reception device according to the embodiments may determine the degree of rotation of the user's eyes based on the up vector (e.g., the degree of rotation with respect to the direction vector according to the embodiments), and reconstruct or create the view 30003 or the view frustum 30002 that is to be seen to the user, based on the determined degree of rotation.

The point cloud data reception device according to the embodiments may infer and generate a view frustum for a user based on the information corresponding to the above in the V-PCC bitstream.

The point cloud data reception device according to the embodiments may generate a view that is actually displayed to the user based on the view frustum. For example, the reception device may generate a view by projecting the view frustum in the form of a 2D frame.

In order to perform the operations of the transmission device according to the embodiments shown in FIG. 30, the encoder of the transmission device according to the embodiments generates position information indicating the above-described position information, and the above-described horizontal FOV and vertical FOV, the above-described direction vector, and/or the above-described up vector information, and the encapsulator of the transmission device according to the embodiments encapsulates the generated information.

In order to perform the operations of the transmission device according to the embodiments shown in FIG. 30, the encapsulator of the transmission device according to the embodiments may generate and encapsulate position information indicating the above-described position information, and the above-described horizontal FOV and vertical FOV, the above-described direction vector, and/or the above-described up vector information.

A method of transmitting the view information (e.g., ViewInfoStruct) according to the embodiments in the form of an encapsulated file (e.g., ISOBMFF file) by the transmission device according to the embodiments will be described in detail with reference to FIG. 31.

In order to perform the operations of the reception device according to the embodiments shown in FIG. 30, the encoder 10002 of the transmission device 10000 according to the embodiments, the encoding device 100 of FIGS. 4 and 15, and the video encoder 18006 of FIG. 18, the video encoder 20002 and the video/image encoder 20003 of FIG. 20, and the video/image encoder 21007 and 21008 of FIG. 21 generate the information described with reference to FIG. 30, and generate point cloud data. The encoded data may be configured in a bitstream 24000 as shown in FIG. 24.

Specifically, the information described with reference to FIG. 30 may be contained in the atlas data 24002e of the point cloud bitstream 24000 according to the embodiments. The atlas data 24002e may be referred to as an atlas sequence parameter set.

When the point cloud data (or the atlas data 24002e) is encapsulated in a single track by the encapsulator (e.g., the encapsulators 10003, 20004, 21009 of FIGS. 1 and 20, and 21) according to the embodiments, the point cloud bitstream 24000 containing the information described with reference to FIG. 30 may be contained in a sample entry, sample(s) or sub-sample(s) of the track (V3C bitstream track or V3C bitstream track). When encapsulated in a multi-track, the data may be carried in a V3C track (e.g., the V-PCC track 28002d of FIG. 28) among multiple tracks, and the point cloud bitstream 24000 containing a the information described with reference to FIG. 30 may be included in a patch sequence data bitstream 28003d.

In addition, the encoded data (for example, the data carried in the V-PCC bitstream shown in FIG. 24) may be encapsulated and transmitted in the form of a single file (e.g., ISOBMFF file) by the file/segment encapsulator 10003 of FIG. 1, the file/segment encapsulator 20004, 21009 of FIGS. 20 and 21, or the like.

The transmission device according to the embodiments may enable a player or the like to perform spatial access or partial to a point cloud object and/or content according to a user viewport. The transmission device according to the embodiments provides the above-described view information, and the reception device performs rendering based on the view information. Accordingly, the reception device may adaptively and efficiently access and process the point cloud bitstream according to the user viewport.

FIG. 31 shows an example of syntax of parameters for reconstructing or rendering point cloud data according to the embodiments.

Parameters for reconstructing or rendering point cloud data according to the embodiments shown in FIG. 31 may be contained in a V-PCC bitstream (or a file generated by encapsulating the bitstream) according to the embodiments.

The parameters for reconstructing or rendering the point cloud data may include view_pos_x, view_pos_y, view_pos_z, view_vfov, view_hfov, view_dir_x, view_dir_y, view_dir_z, view_up_x, view_up_y, and/or view_up_z.

Specifically, the parameters for reconstructing or rendering the point cloud data may be generated and encoded by the encoder according to the embodiments (e.g., the encoder 10002 of FIG. 1, the encoding device 100 of FIGS. 4 and 15, the video encoder 18006 of FIG. 18, the video encoder 20002 and the image encoder 20003 of FIG. 20, and the video/image encodes 21007 and 21008 of FIG. 21, or the like), and be included in the atlas data 24002e or the V-PCC parameter set 24002a of FIG. 24, or in the atlas tile group in the sample stream NAL unit of FIG. 27. They may be encapsulated by the encapsulator (e.g., the file/segment encapsulator 10003 of FIG. 1, the file/segment encapsulator 20004, 21009 of FIGS. 20 and 21) and be included in one or more tracks in the file.

For example, the parameters for reconstructing or rendering the point cloud data may be carried by the V-PCC track 28002d of FIG. 28, and may be encapsulated to be contained in the patch sequence data bitstream 28803d. For example, the parameters for reconstructing or rendering the point cloud data may be encapsulated to be contained in the atlas data 24002e shown in FIG. 24 or the atlas tile group in the sample stream NAL unit shown in FIG. 27 in the patch sequence data bitstream 28003d of FIG. 28.

When the point cloud data (or the atlas data 24002e) is encapsulated in a single track by the encapsulator (e.g., the encapsulators 10003, 20004, and 21009 of FIGS. 1 and 20, and 21) according to the embodiments, the point cloud bitstream 24000 containing the information described with reference to FIG. 31 may be contained in a sample entry, sample(s) or sub-sample(s) of the track (V3C bitstream track or V3C bitstream track). When encapsulated in multi-track, the data may be carried in a V3C track (e.g., the V-PCC track 28002d of FIG. 28) among multiple tracks, and the point cloud bitstream 24000 containing a the information described with reference to FIG. 31 may be included in a patch sequence data bitstream 28003d.

The parameters for reconstructing or rendering point cloud data according to the embodiments may be referred to as, for example, ViewInfoStruct and view information. The parameters for reconstructing or rendering point cloud data according to the embodiments may be parameters needed to perform the operations described with reference to FIG. 31.

view_pos_x, view_pos_y, and view_pos_z indicate x, y, and z coordinate values in a 3D space of a real or virtual camera for generating a user view according to the embodiments, respectively.

view_vfov and view_hfov indicate the vertical FOV and horizontal FOV of a real or virtual camera configured to generate a user's view.

view_dir_x, view_dir_y, and view_dir_z may indicate x, y, and z coordinate values in a 3D space to represent a direction vector indicating a view orientation of the real or virtual camera. For example, view_dir_x, view_dir_y, and view_dir_z may represent a direction vector for a visibility cone toward which the real or virtual camera is oriented.

view_up_x, view_up_y, and view_up_z may indicate x, y, and z coordinate values in a 3D space to represent an up vector indicating an upward direction of the real or virtual camera. For example, view_up_x, view_up_y, and view_up_z may represent an up vector for a visibility cone toward which the real or virtual camera is oriented.

The upward direction of the real or virtual camera according to the embodiments may be orthogonal to a front direction or viewing direction (e.g., a view direction) of the real or virtual camera according to the embodiments.

The parameters (e.g., ViewInfoStruct) for reconstructing or rendering point cloud data according to the embodiments may be included in an SEI message (or SEI) in a bitstream according to embodiments and transmitted to a receiver. For example, some or all of the parameters for reconstructing or rendering the point cloud data may be included in an scene object information SEI message, and may be stored and carried in a file by the encapsulator according to the embodiments.

The parameters for reconstructing or rendering point cloud data according to the embodiments may be encapsulated by the transmission device so as to be included in, for example, a V-PCC view information box.

For example, the parameters for reconstructing or rendering point cloud data according to the embodiments may be encapsulated according to the following syntax so as to be included in the V-PCC view information box.

aligned(8) class VPCCViewInfoBox extends FullBox ('vpvi',0,0) {
  ViewInfoStruct( );
}

The V-PCC view information box according to the embodiments contains parameters (e.g., ViewInfoStruct, view information) for reconstructing or rendering point cloud data.

The view information according to the embodiments may not change within a sequence of point cloud data. For example, the view information according to the embodiments may be static information that does not change over time.

A sample entry of a V-PCC track may contain VPCCViewInfoBox (namely, the view information according to the embodiments). For example, the sample entry of the V-PCC track may have the following syntax.

aligned(8) class VPCCElementaryStreamSampleEntry( ) extends VolumetricVisualSampleEntry ('vpel') {
  VPCCConfigurationBox config;
  VPCCViewInfoBox view_info;
}

The VPCCViewInfoBox contains detailed information for generating a view according to embodiments in which point cloud data related to an atlas frame included in a sample in a V-PCC track is rendered and provided. The VPCC ViewInfoBox may represent the V-PCC view information box according to the embodiments. The VPCCViewInfoBox may contain parameters for reconstructing or rendering point cloud data according to the embodiments.

A sample entry of a V-PCC elementary stream track according to embodiments may contain VPCCViewInfoBox (namely, it may contain the view information according to the embodiments). For example, the sample entry of the V-PCC elementary stream track may have the following syntax.

aligned(8) class VPCCElementaryStreamSampleEntry( ) extends VolumetricVisualSampleEntry ('vpel') {
  VPCCConfigurationBox config;
  VPCCViewInfoBox view_info;
}

The VPCCViewInfoBox represents information for generating a view provided by rendering point cloud data associated with an atlas frame or a video frame stored in a sub-sample in a track. The VPCCViewInfoBox may represent the V-PCC view information box according to the embodiments. The VPCCViewInfoBox may contain parameters for reconstructing or rendering point cloud data according to the embodiments.

View information according to embodiments may be encapsulated or carried in a V-PCC view information sampling group. This embodiment will be described.

The 'vpvs' grouping_type for sample grouping represents the assignment of samples in a V-PCC track according to the embodiments to the view information carried in this sample group. When SampleToGroupBox with grouping_type equal to 'vpvs' is present, an accompanying SampleGroupDescriptionBox with the same grouping type may be present, and contain the ID of this group of samples.

VPCCViewInfoSampleGroupDescriptionEntry according to embodiments may have the following syntax.

aligned(8) class VPCCViewInfoSampleGroupDescriptionEntry( ) extends SampleGroupDescriptionEntry('vpvs') {
ViewInfoStruct( );
}

The view information according to the embodiments may change over time. In this case, the view information according to the embodiments may be carried in an associated timed-metadata track having a sample entry type of 'dyvi'.

When the V-PCC track includes the associated timed-metadata track having the sample entry type of 'dyvi', the view information according to the embodiments may be defined by point cloud data carried by a V-PCC track that is considered to be dynamic (that is, the view information dynamically changes over time), for example, DynamicViewInfoSampleEntry.

The associated timed-metadata track according to the embodiments may include a 'cdsc' track reference for referencing the V-PCC track carrying an atlas stream.

When the V-PCC elementary stream track according to the embodiments has an associated timed-metadata track having a sample entry type of 'dyvi', the view information according to the embodiments may be defined by point cloud data (stream) carried by a V-PCC elementary track that is considered to be dynamic (namely, the view information may dynamically change over time).

The associated timed-metadata track according to the embodiments may include a 'cdsc' track reference for referencing the V-PCC elementary stream track.

A sample entry of the associated timed-metadata track for which the V-PCC elementary stream track according to the embodiments has the sample entry type of 'dyvi' may have the following syntax.

aligned(8) class DynamicViewInfoSampleEntry extends MetaDataSampleEntry('dyvi') {
VPCCViewInfoBox init_view_info;
{ init_view_info may include view information including an initial view of point cloud data according to embodiments.

The syntax of a sample of the sample entry type 'dyvi' according to embodiments may be configured as follows.

aligned(8) DynamicViewInfoSample( ) {
VPCCViewInfoBox view_info;
}

The sample of the sample entry type 'dyvi' according to the embodiments may include dynamic view information (VPCCViewInfoBox view_info), which changes over time, according to the embodiments.

The transmission device according to the embodiments may enable a player or the like to perform spatial access or partial to a point cloud object and/or content according to a user viewport. The transmission device according to the embodiments provides the above-described view information, and the reception device performs rendering based on the view information. Accordingly, the reception device may adaptively and efficiently access and process the point cloud bitstream according to the user viewport.

FIG. 32 shows an example of syntax of parameters for reconstructing or rendering point cloud data according to embodiments.

FIG. 32 shows rendering parameters used in rendering or reconstructing point cloud data according to embodiments. The rendering parameters according to the embodiments may be information used in rendering a point of the point cloud data according to the embodiments. For example, when the point cloud data is rendered, the rendering parameters may include the size of the point, the rendering type of the point, and information about how to handle a duplicated point (e.g., whether to display the duplicated point).

Specifically, the rendering parameters may be generated and encoded by an encoder according to embodiments (e.g., the encoder 10002 of FIG. 1, the encoding device 100 of FIGS. 4 and 15, and the video encoder 18006 of FIG. 18, the video encoder 20002 and the image encoder 20003 of FIG. 20, and the video/image encoders 21007 and 21008 of FIG. 21), and be included in the atlas data 24002e of FIG. 24, or in the atlas tile group in the sample stream NAL unit of FIG. 27. They may be encapsulated by the encapsulator (e.g., the file/segment encapsulator 10003 of FIG. 1, the file/segment encapsulator 20004, 21009 of FIGS. 20 and 21) and be included in one or more tracks in the file.

When the point cloud data (or the atlas data 24002e) is encapsulated in a single track by the encapsulator (e.g., the encapsulators 10003, 20004, and 21009 of FIGS. 1 and 20, and 21) according to the embodiments, the point cloud bitstream 24000 containing the information described with reference to FIG. 32 may be contained in a sample entry, sample(s) or sub-sample(s) of the track (V3C bitstream track or V3C bitstream track). The information described with reference to FIG. 30 may be contained in the SEI message in samples or sub-samples. When encapsulated in multi-track, the data may be carried in a V3C track (e.g., the V-PCC track 28002d of FIG. 28) among multiple tracks, and the point cloud bitstream 24000 containing a the information described with reference to FIG. 31 may be included in the patch sequence data bitstream 28003d. The patch sequence data bitstream 28803d may be referred to as an atlas bitstream.

FIG. 32 shows an example of syntax of rendering parameterS according to embodiments. The rendering parameters may be referred to as, for example, RenderingParamStruct.

point_size may indicate a size of a point of point cloud data to be rendered (reconstructed) or displayed according to embodiments.

point_type may indicate a type of a point of point cloud data to be rendered (reconstructed) or displayed according to embodiments. For example, when point_type is equal to 0, the point according to the embodiments may be represented as a cuboid or a cube. When point_type is equal to 1, the point may be represented as a circle or a sphere. When point type is equal to 2, the point may be represented as one point. As another example, the point may have various types such as a regular tetrahedron.

duplicated_point may indicate how to process, when present, a plurality of points having the same x, y, and z values in the 3D space when the reception device according to the embodiments renders (reconstructs) or displays the plurality of points. For example, when duplicated_point is equal to 0, duplicated points may be ignored. When duplicated_point is equal to 1, only one point may be randomly selected and rendered (reconstructed)/displayed. In addition, when duplicated_point is equal to 2, duplicated points may be rendered/displayed based on the average value of attribute data of the duplicate points.

The point_size and point_type information according to the embodiments may be set for specific points by the producer of point cloud content according to embodiments. Accordingly, the point cloud data transmission device according to the embodiments may signal the type and size of the points, such that the reception device may render points of a type/size suitable for the content.

A V-PCC bitstream according to embodiments may contain rendering parameters according to the embodiments.

The point cloud data reception device according to the embodiments determines the size of a point of the point cloud data in rendering (or reconstructing) the point cloud data based on the point_size information.

The point cloud data reception device according to the embodiments determines the shape of a point of the point cloud data in rendering (or reconstructing) the point cloud data based on the point_type information.

In order to perform the operations of the reception device described above, the encoder of the transmission device according to the embodiments generates information such as the size of a point, a rendering type of the point, and information about how to handle duplicated points (e.g., whether to display the duplicated points), and the encapsulator of the transmission device according to the embodiments encapsulates the generated information.

In order to perform the operations of the reception device described above, the encapsulator of the transmission device according to the embodiments may generate and encapsulate information such as the size of a point, a rendering type of the point, and information about how to handle duplicated points (e.g., whether to display the duplicated points).

Hereinafter, a method of transmitting the rendering parameter information (e.g., RenderingParameterStruct) according to the embodiments in the form of an encapsulated file (e.g., ISOBMFF file) by the transmission device according to the embodiments will be described in detail below.

The rendering parameter information according to the embodiments may be carried in the form of SEI or the like in a V-PCC bitstream containing point cloud data. For example, the rendering parameter information or some or all of the parameters included in the rendering parameter information may be included in a scene object information SEI message.

For example, the rendering parameter information may be contained in PCCRenderingParamBox having the following syntax.

aligned(8) class VPCCRenderingParamBox extends FullBox('vprp',0,0) {
RenderingParamStruct( );
}

The rendering parameter information according to the embodiments may not change within a sequence of point cloud data. For example, the rendering parameter information according to the embodiments may be static information that does not change over time.

A sample entry of a V-PCC track may include VPCCRenderingParamBox according to embodiments (that is, the rendering parameter information according to the embodiments). For example, the sample entry of the V-PCC track may have the following syntax.

aligned(8) class VPCCSampleEntry( ) extends VolumetricVisualSampleEntry ('vpc1') {
VPCCConfigurationBox config;
VPCCUnitHeaderBox unit_header;
VPCCRenderingParamBox rendering_param;
}

The VPCCRenderingParamBox may include detailed rendering parameter information that may be applied in rendering the point cloud data associated with the atlas frame included in the sample in the track. The VPCCRenderingParamBox may include rendering parameter information according to embodiments.

A sample entry of a V-PCC elementary stream track according to embodiments may include the VPCCRenderingParamBox according to the embodiments (that is, the rendering parameter information according to the embodiments). For example, the sample entry of the V-PCC elementary stream track may have the following syntax.

aligned(8) class VPCCElementaryStreamSampleEntry( ) extends VolumetricVisualSampleEntry ('vpe1') {
VPCCConfigurationBox config;
VPCCRenderingParamBox rendering_param;
}

The VPCCRenderingParamBox may include rendering parameter information that may be applied in rendering an atlas frame, a video frame, and/or point cloud data stored in a sub-sample in the track. The VPCCRenderingParamBox may include the rendering parameter information according to the embodiments.

The rendering parameter information according to the embodiments may be encapsulated or carried in a V-PCC rendering parameter sampling group. This embodiment will be described.

The 'vprp' grouping_type for sample grouping represents the assignment of samples in a V-PCC track according to the embodiments to the rendering parameters carried in this sample group. When SampleToGroupBox with grouping_type equal to 'vpvs' is present, an accompanying SampleGroupDescriptionBox with the same grouping_type may be present, and contain the ID of this group of samples.

The V-PCC rendering parameter sampling group according to the embodiments may have the following syntax.

aligned(8) class VPCCRenderingParamSampleGroupDescriptionEntry( ) extends SampleGroupDescriptionEntry ('vprp') {
RenderingParamStruct( );
}

The rendering parameter information according to the embodiments may change over time. In this case, the rendering parameter information according to the embodiments may be carried in an associated timed-metadata track having a sample entry type of 'dyrp'.

When the V-PCC track includes the associated timed-metadata track having the sample entry type of 'dyrp', the rendering parameter information according to the embodiments may be defined by point cloud data carried by a V-PCC track that is considered to be dynamic (that is, the rendering parameter information dynamically changes over time), for example, DynamicRenderingParamSampleEntry.

The associated timed-metadata track according to the embodiments may include a 'cdsc' track reference for referencing the V-PCC track carrying an atlas stream.

When the V-PCC elementary stream track according to the embodiments has an associated timed-metadata track having a sample entry type of 'dyrp', the rendering parameter information according to the embodiments may be defined by point cloud data (stream) carried by a V-PCC elementary track that is considered to be dynamic (namely, the rendering parameter information may dynamically change over time).

The associated timed-metadata track according to the embodiments may include a 'cdsc' track reference for referencing the V-PCC elementary stream track.

A sample entry of the associated timed-metadata track for which the V-PCC elementary stream track according to the embodiments has the sample entry type of 'dyrp' may have the following syntax.

aligned(8) class DynamicRenderingParamSampleEntry extends MetaDataSampleEntry('dyrp') {
  VPCCRenderingParamBox init_rendering_param;
} init_rendering_param may include an initial rendering parameter of point cloud data according to embodiments.

The syntax of a sample of the sample entry type 'dyrp' according to embodiments may be configured as follows.

aligned(8) DynamicRenderingParamSample( ) {
  VPCCRenderingParamBox rendering_param;
}

The sample of the sample entry type 'dyrp' according to the embodiments may contain dynamic rendering parameter information (VPCCRenderingParamBox rendering_param) that changes over time according to embodiments. Each sample may contain rendering parameters that change over time.

The transmission device according to the embodiments may enable a player or the like to perform spatial access or partial to a point cloud object and/or content according to a user viewport. The transmission device according to the embodiments provides rendering parameters, and the reception device renders points according to the embodiments based on the rendering parameters. Accordingly, the reception device may adaptively and efficiently access and process the point cloud bitstream according to the user viewport.

Figure 33:
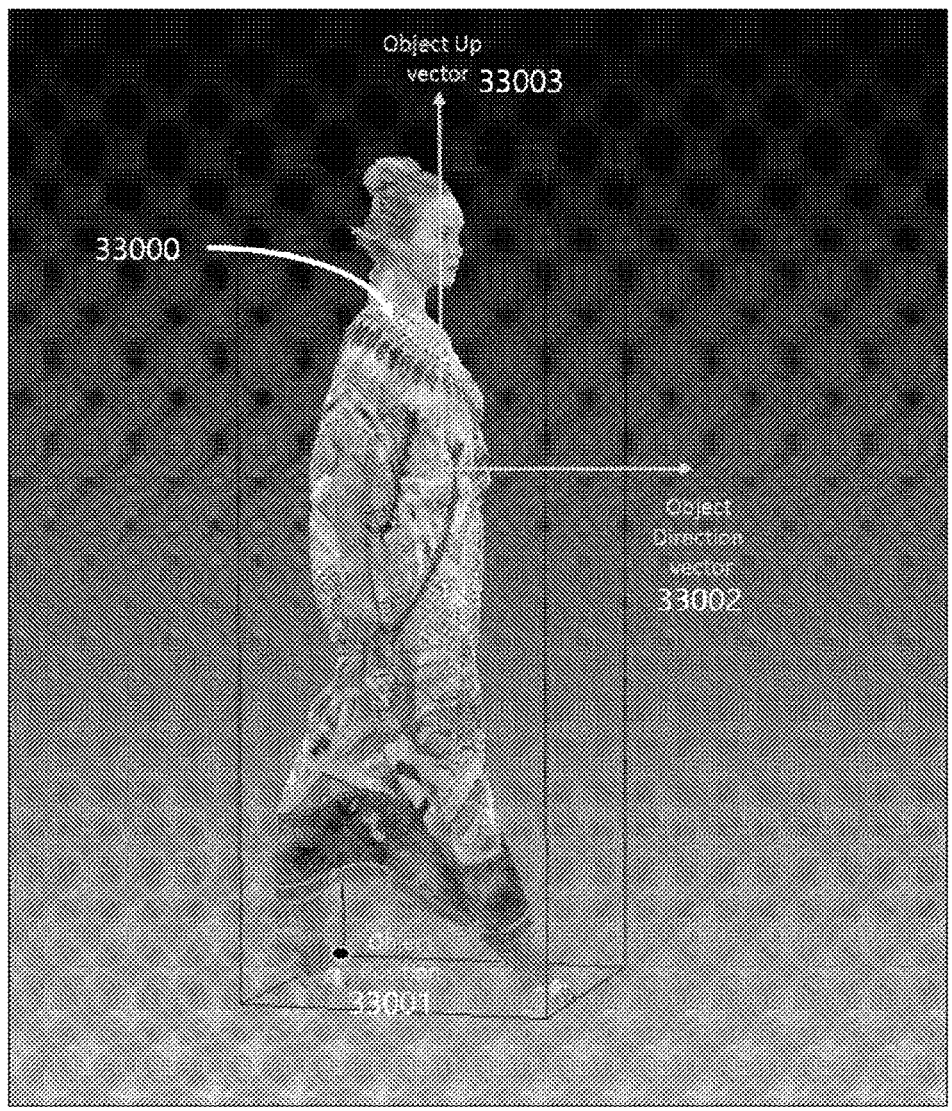
FIG. 33 illustrates the roles of parameters for reconstructing or rendering point cloud data according to embodiments.

FIG. 33 illustrates the roles of parameters for reconstructing or rendering point cloud data according to embodiments.

FIG. 33 shows an object 33000 of point cloud data, a position 33001 of the object of the point cloud data, a direction vector 3302 of the object of the point cloud data, and an up vector 33003 of the object of the point cloud data according to embodiments.

The object 33000 of point cloud data may represent the entirety of the point cloud data or one object (or a person, etc.) included in the point cloud data according to embodiments. That is, the point cloud data may be composed of one or more objects.

The object 33000 may correspond to, for example, a real object (e.g., objects in one scene), a physical object, or a conceptual object related to other characteristics. The object may be referred to as object, volumetric data, volumetric scene data, or the like.

The position 33001 of the object of the point cloud data represents a place where the object of the point cloud data according to the embodiments is located. The position 33001 of the object of the point cloud data may be a reference point for rendering or reconstructing the object by the reception device according to the embodiments. The position 33001 of the object of the point cloud data according to the embodiments may represent a reference point of a bounding box in a 3D space of the point cloud data including the object (volumetric data). The reference point may also be referred to as an anchor point. The position 33001 of the object of the point cloud data, that is, the position of the anchor point, may be represented as the coordinates on the x-axis, y-axis, and z-axis with respect to the origin of the bounding box in the 3D space.

The direction vector 33002 of the object of the point cloud data represents a direction in which the object of the point cloud data according to the embodiments faces. The direction vector 33002 of the object of the point cloud data may be a direction vector used as a reference for rendering or reconstructing the object by the reception device according to the embodiments. The direction vector 33002 of the object according to the embodiments may be referred to as a forward direction vector, a normal vector, or a forward vector.

The up vector 33003 of the object of the point cloud data represents the upward direction of the object of the point cloud data according to the embodiments. The up vector 33003 of the object of the point cloud data may be a vector used as a reference for determining the degree of rotation of the object when the reception device according to the embodiments renders or reconstructs the object. The up vector 33003 of the object of the point cloud data according to the embodiments may be orthogonal to the direction vector 33002 of the object of the point cloud data according to the embodiments. The up vector 33003 of the object according to the embodiments may be referred to as an orthogonal vector.

The point cloud data reception device according to the embodiments renders or reconstructs the object 33000 of the point cloud data at a correct position based on the data constituting the object 33000 of the point cloud data and/or the position 33001 of the object of the point cloud data.

The point cloud data reception device according to the embodiments renders or reconstructs the object 33000 of the point cloud data in a correct direction based on the data constituting the object 33000 of the point cloud data and/or the direction vector 33002 of the object of the point cloud data.

The point cloud data reception device according to the embodiments renders or reconstructs the object 33000 of the point cloud data in a correct rotation direction based on the data constituting the object 33000 of the point cloud data and/or the up vector 33003 of the object of the point cloud data.

The point cloud data transmission device according to the embodiments may transmit information indicating the position 33001 of the object of the point cloud data, information indicating the direction vector 33002 of the object of the point cloud data, and information indicating the up vector 33003 of the object of the point cloud data in metadata. Such information related to the object may be referred to as, for example, object rendering information.

Specifically, the object rendering information may be generated and encoded by an encoder according to embodiments (e.g., the encoder 10002 of FIG. 1, the encoding device 100 of FIGS. 4 and 15, and the video encoder 18006 of FIG. 18, the video encoder 20002 and the image encoder 20003 of FIG. 20, and the video/image encoders 21007 and 21008 of FIG. 21), and be included in the atlas data 24002e or the V-PCC parameter set 24002a of FIG. 24, or in the atlas tile group in the sample stream NAL unit of FIG. 27. They may be encapsulated by the encapsulator (e.g., the file/segment encapsulator 10003 of FIG. 1, the file/segment encapsulator 20004, 21009 of FIGS. 20 and 21) and be included in one or more tracks in the file.

For example, when a file according to embodiments is a single track, parameters for reconstructing or rendering point cloud data may be carried by the track. They may be included in samples or sample entries (e.g., the patch sequence data bitstream 28003d of FIG. 28, the atlas data 24002e shown in FIG. 24, or the atlas tile group in the sample stream NAL unit shown in FIG. 27) carried in the track.

For example, according to embodiments, when the file is a multi-track, the parameters for reconstructing or rendering point cloud data may be carried by the V-PCC track 28002d of FIG. 28, and may be encapsulated so as to be included in the patch sequence data bitstream 28003d. For example, the parameters for reconstructing or rendering the point cloud data may be encapsulated to be contained in the atlas data 24002e shown in FIG. 24 or the atlas tile group in the sample stream NAL unit shown in FIG. 27 in the patch sequence data bitstream 28003d of FIG. 28.

When the point cloud data (or the atlas data 24002e) is encapsulated in a single track by the encapsulator (e.g., the encapsulators 10003, 20004, and 21009 of FIGS. 1 and 20, and 21) according to the embodiments, the point cloud bitstream 24000 containing the information described with reference to FIG. 33 may be contained in a sample entry, sample(s) or sub-sample(s) of the track (V3C bitstream track or V3C bitstream track). The information described with reference to FIG. 33 may be contained in the SEI message in samples or sub-samples. When encapsulated in multi-track, the data may be carried in a V3C track (e.g., the V-PCC track 28002d of FIG. 28) among multiple tracks, and the point cloud bitstream 24000 containing a the information described with reference to FIG. 33 may be included in a patch sequence data bitstream 28003d.

In order to perform the operations of the reception device described above, the encapsulator (e.g., 10003 in FIG. 1, 20004 in FIG. 20, 21009 in FIG. 21) or the encoder (10002 in FIG. 1, 100 in FIGS. 4 and 15, 18006 in FIGS. 18, 20002 and 20003 of FIGS. 20, 21007, 21007 and 21008 of FIG. 21) of the transmission device according to the embodiments generates information (e.g., obj_pos_x, obj_pos_y, obj_pos_z of FIG. 34) indicating the position 33001 of the object of the point cloud data according to the embodiments, information indicating the direction vector 33002 of the object of the point cloud data, and information indicating the up vector 33003 of the object of the point cloud data, and the encapsulator of the transmission device according to the embodiments encapsulates the generated information.

In order to perform the operations of the reception device described above, the encapsulator (e.g., 10003 in FIG. 1, 20004 in FIG. 20, 21009 in FIG. 21) or the encoder (10002 in FIG. 1, 100 in FIGS. 4 and 15, 18006 in FIGS. 18, 20002 and 20003 of FIGS. 20, 21007, 21007 and 21008 of FIG. 21) of the transmission device according to the embodiments may generate and encapsulate the information indicating the position 33001 of the object of the point cloud data, information indicating the direction vector 33002 of the object of the point cloud data, and information indicating the up vector 33003 of the object of the point cloud data according to the embodiments.

The object rendering information may include, for example, properties useful for extraction and rendering of one or more objects. For example, object rendering information may include object identifiers (or object labeling information, etc.) for identifying the objects, information indicating whether an object is visible or not, visibility cone information, and material IDs, and collision information related to collision with other objects.

A method of transmitting the object rendering information according to the embodiments in the form of an encapsulated file (e.g., an ISOBMFF file) by the transmission device according to the embodiments will be described in detail with reference to FIG. 34.

The transmission device according to the embodiments may enable a player or the like to perform spatial access or partial to a point cloud object and/or content according to a user viewport. The transmission device according to the embodiments provides the object rendering information, and the reception device performs rendering based on the object rendering information. Accordingly, the reception device may adaptively and efficiently access and process the point cloud bitstream according to the user viewport.

FIG. 34 shows an example of syntax of parameters for reconstructing or rendering an object of point cloud data according to embodiments.

FIG. 34 shows an example of the syntax of object rendering information. The object rendering information according to the embodiments may be the object rendering information described with reference to FIG. 33. According to the embodiments, an object may be referred to as an object, volumetric data, volumetric scene data, or the like.

Parameters contained in the object rendering information shown in FIG. 34 may be contained in a V-PCC bitstream (or metadata contained in the bitstream) according to embodiments. The parameters contained in the object rendering information may include obj_id, obj_coord_type, obj_pos_x, obj_pos_y, obj_pos_z, obj_dir_x, obj_dir_y, obj_dir_z, obj_up_x, obj_up_y, obj_up_z, obj_scale_x, obj_scale_y, and/or obj_scale_z.

obj_id is an identifier for identifying an object (or volumetric data) of point cloud data according to embodiments.

obj_coord_type may indicate a coordinate system used for the reception device according to the embodiments to render an object (or volumetric data) of point cloud data. When the value of this parameter is 0, it indicates that the global coordinates are used. When the value of this parameter is 1, it indicates that view coordinates are used. Here, the view coordinates refer to the coordinates of a virtual camera that may be used to generate viewport data.

obj_pos_x, obj_pos_y, and obj_pos_z indicate x, y, and z coordinate values of the position of the bounding box (e.g., the origin, the center point, a reference point, an anchor point, etc.) of the point cloud data in the coordinate system indicated by obj_coord_type. The information of obj_pos_x, obj_pos_y, and obj_pos_z according to the embodiments represents the position of the object described with reference to FIG. 33.

obj_dir_x, obj_dir_y, and obj_dir_z indicate x, y, and z coordinate values in a 3D space for representing a direction vector (or normal vector) indicating a forward direction of the point cloud data according to the embodiments. The information of obj_dir_x, obj_dir_y, and obj_dir_z according to the embodiments represents the direction vector of the object described with reference to FIG. 33.

obj_up_x, obj_up_y, and obj_up_z indicate x, y, and z coordinate values in a 3D space for representing an up vector indicating an upward direction of the object (or point cloud data) of the point cloud data. The information of obj_up_x, obj_up_y, and obj_up_z according to the embodiments represents the up vector of the object described with reference to FIG. 33.

obj_scale_x, obj_scale_y, and obj_scale_z are scaling factors to be applied to the x, y, and z axes as information indicating the degree of enlargement or contraction of an object of point cloud data rendered or displayed according to the embodiments compared to the original point cloud data.

The up direction of a real or virtual camera according to the embodiments may be orthogonal to a front direction or a viewing direction (e.g., a view direction) of the real or virtual camera according to the embodiments.

According to embodiments, the object rendering information (e.g., ObjectRenderingInfoStruct) may be contained in the SEI message in the bitstream according to the embodiments and transmitted to the reception device. For example, the object rendering information or some or all of the parameters included in the object rendering information may be contained in a scene object information SEI message.

The object rendering information according to the embodiments may be encapsulated by the transmission device so as to be included in, for example, a V-PCC object rendering information box.

For example, the object rendering information according to the embodiments may be encapsulated according to the following syntax so as to be carried in the V-PCC object rendering information box.

aligned(8) class VPCCObjectRenderingInfoBox extends FullBox('vpoi',0,0) {
  ObjectRenderingInfoStruct( )
}

The V-PCC object rendering information box according to the embodiments includes parameters (e.g., ObjectRenderingInfoStruct) for reconstructing or rendering the object of the point cloud data.

The object rendering information according to the embodiments may not change within a sequence of the point cloud data. For example, the object rendering information according to the embodiments may be static information that does not change over time.

A sample entry of a V-PCC track may contain VPCCObjectRenderingInfoBox according to embodiments (namely, the object rendering information according to the embodiments). For example, the sample entry of the V-PCC track may have the following syntax.

aligned(8) class VPCCSampleEntry( ) extends VolumetricVisualSampleEntry ('vpcl') {
  VPCCConfigurationBox config;
  VPCCUnitHeaderBox unit_header;
  VPCCObjectRenderingInfoBox obj_rendering_info;
}

The VPCCObjectRenderingInfoBox may contain object rendering information for rendering an object related to point cloud data associated with an atlas frame contained in a sample in the track.

A sample entry of a V-PCC elementary stream track according to embodiments may include the VPCCObjectRenderingInfoBox according to the embodiments (i.e., the object rendering information according to the embodiments). the sample entry of the V-PCC elementary stream track may have the following syntax.

aligned(8) class VPCCElementaryStreamSampleEntry( ) extends VolumetricVisualSampleEntry ('vpel') {
  VPCCConfigurationBox config;
  VPCCObjectRenderingInfoBox obj_rendering_info;
}

VPCCObjectRenderingInfoBox may contain object rendering information for rendering an object associated with an atlas frame, a video frame, and/or point cloud data stored in a sub-sample within the track.

The object rendering information according to the embodiments may be encapsulated or carried in a V-PCC object rendering information sampling group. This embodiment will be described.

The 'vpoi' grouping_type for sample grouping represents the assignment of samples in a V-PCC track according to embodiments to the object rendering information carried in this sample group. When SampleToGroupBox with grouping_type equal to 'vpoi' is present, accompanying SampleGroupDescriptionBox with the same grouping_type may be present, and contain the ID of this group of the samples.

The V-PCC object rendering information sample grouping information (VPCCObjRenderingInfoSampleGroupDescriptionEntry) according to embodiments may have the following syntax.

aligned(8) class VPCCObjRenderingInfoSampleGroupDescriptionEntry( ) extends SampleGroupDescriptionEntry ('vpoi') {
  VPCCObjectRenderingInfoStruct( ):
}

The object rendering information according to the embodiments may change over time. In this case, the object rendering information according to the embodiments may be carried in an associated timed-metadata track with a sample entry type of 'dyoi'.

When the V-PCC track contains an associated timed-metadata track having a sample entry type of 'dyoi', the object rendering information according to the embodiments may be defined by point cloud data carried by a V-PCC track that is considered to be dynamic (that is, the object rendering information dynamically changes over time), for example, DynamicViewInfoSampleEntry.

The associated timed-metadata track according to the embodiments may include a 'cdsc' track reference for referencing the V-PCC track carrying an atlas stream.

When the V-PCC elementary stream track according to the embodiments has an associated timed-metadata track having a sample entry type of 'dyoi', the object rendering information according to the embodiments may be defined by point cloud data (stream) carried by a V-PCC elementary track that is considered to be dynamic (namely, the object rendering information may dynamically change over time).

The associated timed-metadata track according to the embodiments may include a 'cdsc' track reference for referencing the V-PCC elementary stream track.

A sample entry of the associated timed-metadata track for which the V-PCC elementary stream track according to the embodiments has the sample entry type of 'dyoi' may have the following syntax.

aligned(8) class DynamicObjRenderingInfoSampleEntry extends MetaDataSampleEntry('dyoi') {
  VPCCObjectRenderingInfoBox init_obj_rendering;
} init_obj_rendering may include object rendering information for rendering an initial object associated with point cloud data.

The syntax of a sample of the sample entry type 'dyoi' according to embodiments may be configured as follows.

aligned(8) DynamicObjRenderingInfoSample( ) {
  VPCCObjectRenderingInfoBox obj_rendering_info;
}

The sample of the sample entry type 'dyoi' according to the embodiments may include dynamic rendering parameter information, which changes over time, according to embodiments.

The transmission device according to the embodiments may enable a player or the like to perform spatial access or partial to a point cloud object and/or content according to a user viewport. The transmission device according to the embodiments provides the object rendering information, and the reception device renders an object according to embodiments based on the object rendering information. Accordingly, the reception device may adaptively and efficiently access and process the point cloud bitstream according to the user viewport.

Figure 35:
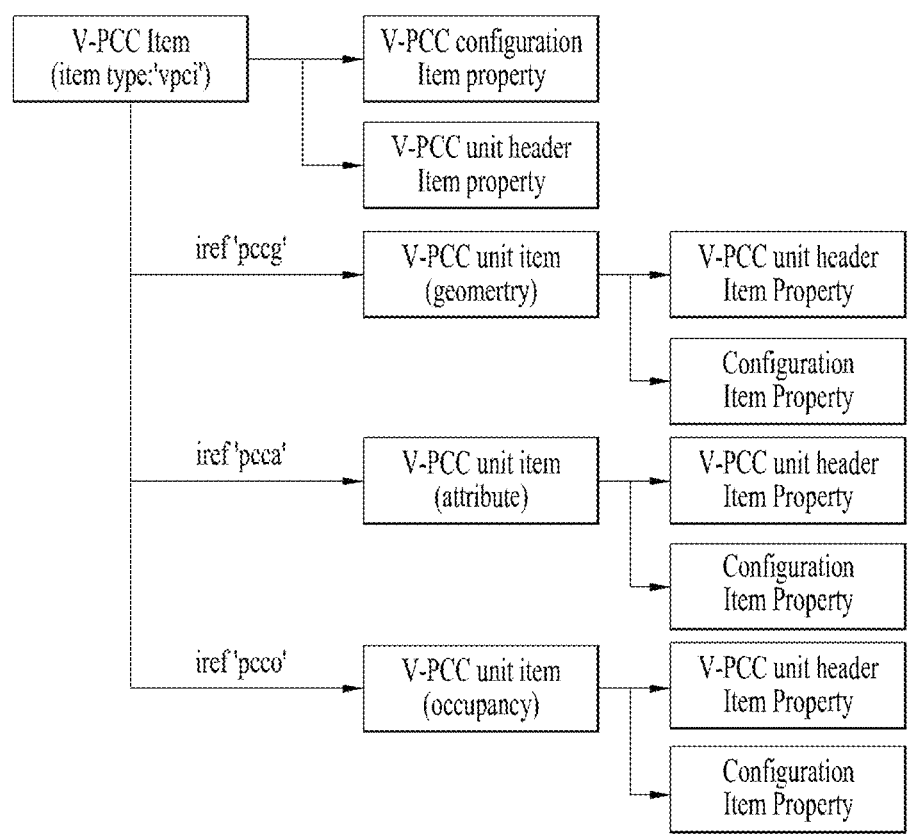
FIG. 35 illustrates an example of an operation of encapsulating point cloud data and metadata about the point cloud data according to embodiments.

FIG. 35 illustrates an example of an operation of encapsulating point cloud data and metadata about the point cloud data according to embodiments.

FIG. 35 shows an example of an encapsulated file for non-timed V-PCC data (e.g., image data) according to embodiments.

FIG. 35 may illustrate the structure of an encapsulated file in the case where the file/segment encapsulators 20004 and 21009 and/or the file/segment decapsulator 22000 according to the embodiments of FIGS. 20 to 22 deliver image data. Even when the image data is delivered, the point cloud data according to the embodiments may be encapsulated in a single item or multi-item.

On the other hand, the example of the encapsulated file shown in FIG. 28 may illustrate the structure of an encapsulated file in the case where the file/segment encapsulator 20004 and 21009 and/or the file/segment decapsulator 22000 according to the embodiments of FIGS. 20 to 22 deliver video data (in, for example, a single track or multiple tracks).

FIG. 35 shows an encapsulation structure of non-timed V-PCC data. The non-timed V-PCC data represents point cloud data that does not move over time.

The non-timed V-PCC data may be stored in a file as image items. A new handler type 4CC code 'vpcc' may be defined and stored in the HandlerBox of the MetaBox in order to indicate the presence of V-PCC items, V-PCC unit items and other V-PCC encoded content representation information.

V-PCC items including non-timed V-PCC data according to embodiments will be described.

A V-PCC item is an item which represents an independently decodable V-PCC access unit. A new item type 4CC code 'vpci' may be defined to identify V-PCC items. V-PCC items may be stored in V-PCC unit payload(s) of atlas sub-bitstream according to embodiments. If PrimaryItemBox exists, item_id in this box shall be set to indicate a V-PCC item. The V-PCC item may be referred to as a V3C item or a visual volumetric video-based coded item.

A V-PCC unit item is an item which represents V-PCC unit data. V-PCC unit items store V-PCC unit payload(s) of occupancy, geometry, and attribute video data units according to embodiments. A V-PCC unit item shall store only one V-PCC access unit related data. The V-PCC unit item may be referred to as a V3C unit item or a visual volumetric video-based coded unit item.

An item type 4CC code for a V-PCC unit item may be set depending on the codec used to encode corresponding video data units. A V-PCC unit item shall be associated with a corresponding V-PCC unit header item property and codec specific configuration item property.

V-PCC unit items are marked as hidden items, since it is not meaningful to display independently.

In order to indicate the relationship between a V-PCC item and V-PCC units, three new item reference types with 4CC codes 'pcco', 'pccg' and 'pcca' are defined. Item reference is defined "from" a V-PCC item "to" the related V-PCC unit items. The 4CC codes of item reference types are:

1) 'pcco' (or v3vo): The referenced V-PCC unit item(s) contain the occupancy video data units.

2) 'pccg' (or v3vg): The referenced V-PCC unit item(s) contain the geometry video data units.

3) 'pcca' (or v3va): The the referenced V-PCC unit item(s) contain the attribute video data units.

V-PCC related item properties will be described. Descriptive item properties are defined to carry the V-PCC parameter set information and V-PCC unit header information, respectively. The V-PCC related item properties may include, for example, a V-PCC configuration item property, a V-PCC unit header item property, a V-PCC view formation item property according to embodiments, a V-PCC rendering parameter according to embodiments, and a V-PCC object rendering information item property.

The V-PCC related item property may be referred to as a V3C related item property, and the V-PCC unit header information may be referred to as V3C unit header information.

The V-PCC configuration item property will be described.
Box type: 'vpcp'
Property type: Descriptive item property
Container: ItemPropertyContainerBox
Mandatory (per item): Yes (for a V-PCC item of type 'vpci')
Quantity (per item): One or more (for a V-PCC item of type 'vpci')

V-PCC parameter sets are stored as descriptive item properties and are associated with the V-PCC items.

The V-PCC configuration item property may be referred to as a V3C configuration item property.

The VPCC configuration property (VPCCConfigurationProperty) according to the embodiments may have the following syntax.

aligned(8) class vpcc_unitpayload_struct ( ) {
unsigned int(16) vpcc_unit_payload_size;
vpcc_unit_payload( );
}
aligned(8) class VPCCConfigurationProperty
extends ItemProperty('vpcc') {
vpcc_unit_payload_struct( )];
} vpcc_unit_payload_size indicates the size of vpcc_unit_payload( ).

The V-PCC unit header item property will be described.
Box type: 'vunt'
Property type: Descriptive item property
Container: ItemPropertyContainerBox
Mandatory (per item): Yes for a V-PCC item of type 'vpci' and for a V-PCC unit item
Quantity (per item): One The V-PCC unit header is stored as descriptive item properties and is associated with the V-PCC items and the V-PCC unit items.

The V-PCC unit header item property may be referred to as a V3C unit header item property.

aligned(8) class VPCCUnitHeaderProperty ( ) {
extends ItemFullProperty('vunt', version=0, 0) {
vpcc_unit_header( );
}

According to embodiments, view information for non-timed V-PCC data may be encapsulated and transmitted in the V-PCC view information item property.

The V-PCC view information item property according to the embodiments will be described.
Box type: 'vpvi'
Property type: Descriptive item property
Container: ItemPropertyContainerBox
Mandatory (per item): Yes, for a V-PCC item of type 'vpci' and for a V-PCC unit item
Quantity (per item): One The view information according to the embodiments may be stored as descriptive item properties and be associated with the V-PCC items and the V-PCC unit items.

The syntax of the V-PCC view information item property (VPCCViewInfoproperty) according to the embodiments may be configured as shown below. ViewInfoStruct may include the view information according to embodiments.

The V-PCC view information item property may be referred to as a V3C view information item property.

```
aligned(8) class VPCCViewInfoproperty ( ) {
extends ItemFullProperty('vpvi', version=0, 0) {
ViewInfoStruct( );
}
```

Rendering parameters according to embodiments for non-timed V-PCC data may be encapsulated and transmitted in the V-PCC rendering parameter item property.

The V-PCC rendering parameter item property according to the embodiments will be described.

Box type: 'vprp'

Property type: Descriptive item property

Container: ItemPropertyContainerBox

R Mandatory (per item): Yes, for a V-PCC item of type 'vpci' and for a V-PCC unit item Quantity (per item): One The rendering parameter according to the embodiments may be stored as descriptive item properties and be associated with the V-PCC items and the V-PCC unit items.

The syntax of the V-PCC rendering parameter item property (VPCCRenderingParamsproperty) according to the embodiments may be configured as shown below. RenderingParamStruct may contain a rendering parameter according to embodiments.

The V-PCC rendering parameter item property may be referred to as a V3C rendering parameter item property.

```
aligned(8) class VPCCRenderingParamsproperty ( ) {
extends ItemFullProperty('vprp', version=0, 0) {
RenderingParamStruct( );
}
```

According to embodiments, object rendering information for non-timed V-PCC data may be encapsulated and transmitted in the V-PCC object rendering information item property.

The V-PCC object rendering information item property according to the embodiments will be described.

Box type: 'vpri'

Property type: Descriptive item property

Container: ItemPropertyContainerBox

Mandatory (per item): Yes, for a V-PCC item of type 'vpci' and for a V-PCC unit item Quantity (per item): One The object rendering information according to the embodiments may be stored as descriptive item properties and be associated with the V-PCC items and the V-PCC unit items.

The syntax of the V-PCC object rendering information item property (VPCCObjRenderingInfoproperty) according to the embodiments may be configured as shown below. VPCCObjRenderingInfoproperty may contain the object rendering information according to the embodiments.

The V-PCC object rendering information item property may be referred to as a V3C object rendering information item property.

```
aligned(8) class VPCCObjRenderingInfoproperty ( ) {
extends ItemFullProperty('vpri', version=0, 0) {
ObjectRenderingInfoStruct( );
}
```

The point cloud data and metadata for the point cloud data according to the embodiments may be configured to encapsulate a service of the point cloud data based on the method described with reference to FIGS. 30 to 35 to configure a V-PCC bitstream and store a file.

According to embodiments, by performing encapsulation as described with reference to FIGS. 25 to 35, the transmission device according to the embodiments may transmit, in the bitstream, the metadata about processing data and performing rendering in a V-PCC bitstream.

The transmission device according to the embodiments may allow a player or the like to perform spatial or partial access to a point cloud object and/or point cloud content according to a user viewport. According to the embodiments, the transmission apparatus may provide the above-described view information, and the reception apparatus may perform rendering based on the view information. Accordingly, the reception apparatus may adaptively and efficiently access and process the point cloud bitstream according to a user viewport.

The point cloud data transmission device according to the embodiments provides a bounding box for partial access and/or spatial access to point cloud content (e.g. V-PCC content) and signaling information therefor. Accordingly, the point cloud data reception device according to the embodiments may access point cloud content in variously ways in consideration of the player or user environment.

The point cloud data transmission device according to the embodiments may provide 3D region information about V-PCC content for supporting spatial access of the V-PCC content according to a user viewport and metadata related to a 2D region in a video or atlas frame associated therewith.

The point cloud data transmission device according to the embodiments (e.g., the point cloud pre-processor 20001 of FIG. 20, the point cloud pre-processor of FIG. 21, etc.) may generate 3D region information about a point cloud in a point cloud bitstream, and signaling information related to a 2D region in a video or atlas frame associated therewith.

The 3D region information about the point cloud and the signaling information related to the 2D region in a video or atlas frame associated therewith may include, for example, the view information according to the embodiments shown in FIGS. 30 and 31, rendering parameters according to the embodiments shown in FIG. 32, and/or the object rendering information according to the embodiments shown in FIGS. 33 and 34.

The point cloud data reception device according to the embodiments may receive and/or parse the 3D region information about the point cloud and the signaling information related to the 2D region in a video or atlas frame associated therewith in a file (e.g., ISOBMFF file).

The point cloud data reception device according to the embodiments may efficiently accesses the point cloud data content (e.g., points, objects, etc. of the point cloud data) according to the embodiments based on the information in the file. In addition, the point cloud data reception device according to the embodiments may provide point cloud content in consideration of a user environment, based on an image item, 3D region information about a point cloud associated with the image item, and 2D region related information in a video or atlas frame associated therewith in a file (e.g., a file containing the view information according to the embodiments, the rendering parameters according to the embodiments shown in FIG. 32, and/or the object rendering information according to the embodiments shown in FIGS. 33 and 34, and the like).

Figure 36:
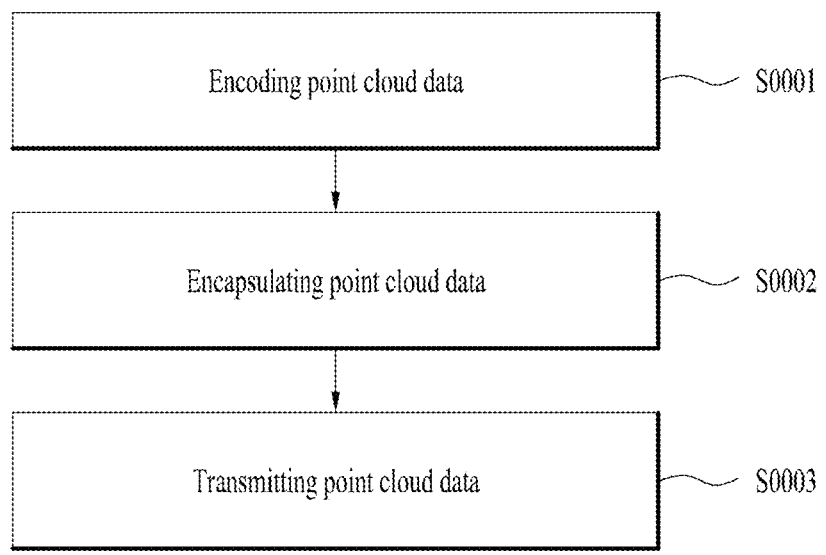
FIG. 36 illustrates a point cloud data transmission method and/or a data processing method for transmitting point cloud data according to embodiments.

FIG. 36 illustrates a point cloud data transmission method and/or a data processing method for transmitting point cloud data according to embodiments.

The point cloud data transmission method according to the embodiments includes encoding point cloud data (S0001), encapsulating the point cloud data (S0002), and/or transmitting a bitstream containing the point cloud data and/or metadata about the point cloud data (S0003).

In the operation S0001 of encoding the point cloud data, the point cloud data according to the embodiments is encoded. For example, in the encoding operation S0001, the operation of the point cloud video encoder 10002 of FIG. 1, the encoding operation described with reference to FIG. 3 and/or FIG. 4, and some or all of the operations of the encoding device 100 according to the embodiments of FIG. 15, the operation of the video encoder 18006 according to the embodiments of FIG. 18, the video encoding 20002 and/or the image encoding 20003 of FIG. 20, and the video encoding 21007 and/or the image encoding 21008 of FIG. 21 may be performed.

In the operation S0002 of encapsulating the point cloud data, the encoded point cloud data according to the embodiments is encapsulated. For example, in the encapsulating operation S0002, the point cloud data according to the embodiments may be encapsulated into a file of a predetermined format (e.g., ISOBMFF format). The encapsulating operation S0002 represents the operation of the file/segment encapsulation module 10003 of FIG. 1, the operation of the file/segment encapsulator 20004 of FIG. 20, and the operation of the file/segment encapsulator 21009 of FIG. 21. The encapsulating operation S0002 may represent, for example, the operation of encapsulating the point cloud data according to the embodiments in the format of a file shown in FIG. 28.

In the encapsulating operation S0002 according to the embodiments, metadata about rendering and/or reconstruction of the point cloud data may also be encapsulated into a single file. For example, in the encapsulating operation S0002, view information, rendering parameters, and/or object rendering information according to embodiments may be encapsulated according to a specific file format (e.g., ISOBMFF file format) based on the method described with reference to FIGS. 30 to 35.

In the operation S0003 of transmitting the point cloud data, the encapsulated point cloud data (or non-encapsulated point cloud data, etc.) according to the embodiments is transmitted. In the operation S0003 of transmitting the point cloud data, a bitstream containing the encapsulated point cloud data and/or metadata about the point cloud data according to the embodiments in the form of a file (or bitstream) to the reception device according to the embodiments.

Figure 37:
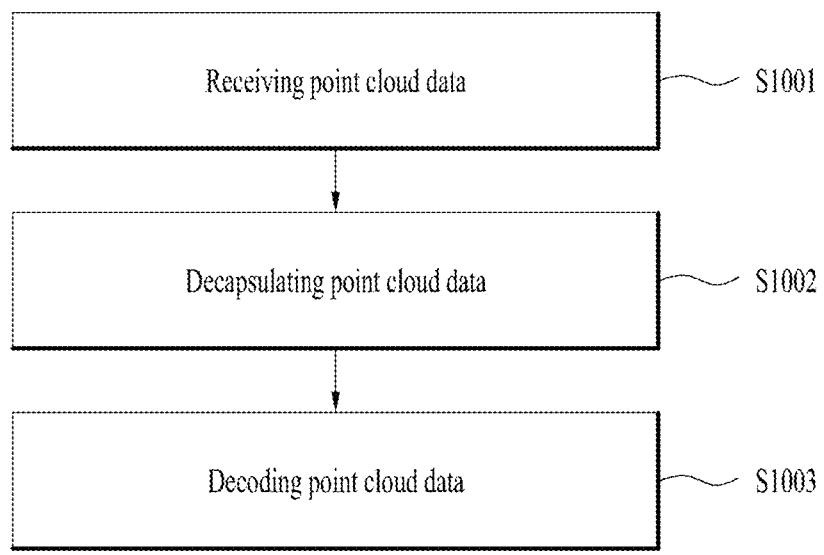
FIG. 37 illustrates a point cloud data reception method and/or a data processing method for receiving point cloud data according to embodiments.

FIG. 37 illustrates a point cloud data reception method and/or a data processing method for receiving point cloud data according to embodiments.

The point cloud data reception method according to the embodiments includes receiving point cloud data (S1001), decapsulating the point cloud data (S1002), and/or decoding the point cloud data (S1003).

In the operation S1001 of receiving the point cloud data, the point cloud data reception device according to the embodiments receives the point cloud data. The point cloud data reception device according to the embodiments may receive a bitstream or file (e.g., an ISOBMFF file, etc.) containing the point cloud data and/or metadata about the point cloud data.

For example, in the operation S1001 of receiving the point cloud data, the operation of the receiver 10006 of FIG. 1, the operation of the receiver of FIG. 19, the operation of the video-based point cloud player receiving a file in FIG. 20, and the delivery operation of FIG. 22 may be performed.

The point cloud data may be received in a bitstream format. The bitstream may contain, for example, one or more files. The file may be, for example, a file encapsulated based on ISOBMFF. For example, the bitstream (or file) received by the reception device may be the V-PCC bitstream shown in FIGS. 24 to 27, or may be an ISOBMFF-based encapsulated file composed of one or more tracks and one or more samples corresponding to each track as shown in FIGS. 28 to 29.

The metadata is signaling information about the point cloud data according to the embodiments. The metadata may include information necessary for rendering and/or reconstruction of the point cloud data according to the embodiments. For example, the metadata may contain the information and/or parameters described with reference to FIGS. 30 to 35.

In the operation S1002 of decapsulating the point cloud data, the received point cloud data (e.g., bitstream, ISOBMFF file, etc.) according to the embodiments is decapsulated. For example, in the decapsulating operation S1002, the received ISOBMFF file may be converted or decompressed into a bitstream as shown in FIGS. 24 to 27. In the decapsulating operation S1002, the operation of the file/segment decapsulation module 10007 of FIG. 1, the operation of the file/segment decapsulator 20005 of FIG. 20, and/or the file/segment decapsulator 22000 of FIG. 22 may be performed.

In the operation S1002 of decoding the point cloud data, the decapsulated point cloud data is decoded. In the operation S1002 of decoding the point cloud data, the point cloud data may be decoded by reconstructing the point cloud data. In the operation S1002 of decoding the point cloud data, the decapsulated point cloud data according to the embodiments is rendered, decoded, and/or reconstructed. For example, in the decoding operation S1003, the operations of the point cloud video decoder 10008 and/or the renderer 10009 according to the embodiments of FIG. 1, some or all of the operations of the V-PCC decoding processes 16000 to 16008 according to the embodiments of FIG. 16, some or all of the operations of the decoding device 200 of FIG. 17, some or all of the operations of the video decoder 19001, the metadata decoder 19002, the geometry reconstructor 19003, the smoother 19004, the texture reconstructor 19005, the color smoother and/or the point cloud renderer of FIG. 19, and some or all of the operations of the video decoder 20006 of FIG. 20 and the video decoder 22001 and the image decoder 22002 of FIG. 21.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "I" and "," should be interpreted as indicating "and/or." For instance, the expression "A/B" may mean "A and/or B." Further, "A, B" may mean "A and/or B." Further, "AB/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE FOR DISCLOSURE

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

What is claimed is:

1. A method for transmitting point cloud data, the method comprising:
encoding point cloud data including volumetric data as a bitstream;
encapsulating the encoded point cloud data and metadata for the encoded point cloud data into a file according to an ISO base media file format(ISOBMFF),
wherein the metadata includes object information of one or more objects presented in the volumetric data, and the object information includes an object identifier representing an object and object direction information for the object represented by the object identifier, wherein the metadata further includes information representing a shape of a point of the point cloud data and information representing a size of the point, wherein the shape of the point includes a circle shape, wherein the metadata further includes information representing an x component, a y component and a z component of an origin position of a bounding box for the object, wherein the metadata further includes information representing an x component, a y component and a z component of a position of a camera related to a viewport, and wherein the metadata further includes information representing horizontal and vertical ranges for a Field of View (FoV); and transmitting the bitstream.

2. The method of claim 1, wherein the metadata further includes information representing an x component, a y component and a z component for a direction of the camera related to a viewport, and wherein the object information is included in Supplemental Enhancement Information (SEI) message that is contained in a NAL_unit of the bitstream.

3. The method of claim 2, wherein the metadata includes information for the volumetric data, the information for the volumetric data includes position related information used for reconstructing the volumetric data and direction related information applied for the volumetric data, the direction related information includes information representing a forward direction of the volumetric data, and information representing an upper direction for the volumetric data.

4. A method for receiving point cloud data, the method comprising:

receiving a file of an ISO base media file format (ISOBMFF);

decapsulating the file into a bitstream including point cloud data and metadata for the point cloud data; and decoding the point cloud data in the bitstream based on the metadata; and reconstructing volumetric data of the decoded point cloud data based on the metadata, wherein the metadata includes object information of one or more objects presented in the volumetric data, and the object information includes an object identifier representing an object and object direction information for the object represented by the object identifier, wherein the metadata further includes information representing a shape of a point of the point cloud data and information representing a size of the point, wherein the shape of the point includes a circle shape, wherein the metadata further includes information representing an x component, a y component and a z component of an origin position of a bounding box for the object, wherein the metadata further includes information representing an x component, a y component and a z component of a position of a camera related to a viewport, and wherein the metadata further includes information representing horizontal and vertical ranges for a Field of View (FoV).

5. The method of claim 4, wherein the metadata further includes information representing an x component, a y component and a z component for a direction of the camera related to a viewport, and wherein the object information is included in Supplemental Enhancement Information (SEI) message that is contained in a NAL_unit of the bitstream.

6. The method of claim 5, wherein the metadata includes information for the volumetric data, the information for the volumetric data includes position related information used for reconstructing the volumetric data and direction related information applied for the volumetric data, the direction related information includes information representing a forward direction of the volumetric data, and information representing an upper direction for the volumetric data.

7. An apparatus for receiving point cloud data, the apparatus comprising:

a receiver configured to receive a file of an ISO base media file format (ISOBMFF);

a decapsulator configured to decapsulate the file into a bitstream including point cloud data and metadata for the point cloud data; and a decoder configured to decode the point cloud data in the bitstream based on the metadata; and a processor configured to reconstruct volumetric data of the decoded point cloud data based on the metadata, wherein the metadata includes object information of one or more objects presented in the volumetric data, and the object information includes an object identifier representing an object and object direction information for the object represented by the object identifier, wherein the metadata further includes information representing a shape of a point of the point cloud data and information representing a size of the point, wherein the shape of the point includes a circle shape, wherein the metadata further includes information representing an x component, a y component and a z component of an origin position of a bounding box for the object, and wherein the metadata further includes information representing an x component, a y component and a z component of an origin position of a bounding box for the object, wherein the metadata further includes information representing an x component, a y component and a z component of a position of a camera related to a viewport, and wherein the metadata further includes information representing horizontal and vertical ranges for a Field of View (FoV).

8. The apparatus of claim 7, wherein the metadata further includes information representing an x component, a y component and a z component for a direction of the camera related to a viewport, and wherein the object information is included in Supplemental Enhancement Information (SEI) message that is contained in a NAL unit of the bitstream.

9. The apparatus of claim 8, wherein the metadata includes information for the volumetric data, the information for the volumetric data includes position related information used for reconstructing the volumetric data and direction related information applied for the volumetric data, the direction related information includes information representing a forward direction of the volumetric data, and information representing an upper direction for the volumetric data.

* * * * *